United States Patent
Sander et al.

(10) Patent No.: US 8,983,093 B2
(45) Date of Patent: Mar. 17, 2015

(54) ELECTRONIC DEVICE CIRCUITRY FOR COMMUNICATING WITH ACCESSORIES

(75) Inventors: Wendell B. Sander, Los Gatos, CA (US); Jeffrey Terlizzi, San Francisco, CA (US); Douglas M. Farrar, Los Altos, CA (US); Timothy Johnson, San Jose, CA (US); Brian Sander, San Jose, CA (US); Brian J. Conner, San Jose, CA (US); Jesse L. Dorogusker, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1530 days.

(21) Appl. No.: 12/203,886

(22) Filed: Sep. 3, 2008

(65) Prior Publication Data

US 2009/0180643 A1    Jul. 16, 2009

Related U.S. Application Data

(60) Provisional application No. 61/020,988, filed on Jan. 14, 2008.

(51) Int. Cl.
*H04R 3/00*   (2006.01)
*H04M 1/725*  (2006.01)
(Continued)

(52) U.S. Cl.
CPC ........ *H04M 1/6058* (2013.01); *H04M 1/72527* (2013.01); *H04M 1/05* (2013.01); *H04M 1/72558* (2013.01)
USPC ............ 381/113; 381/111; 367/137; 367/135

(58) Field of Classification Search
USPC ............. 381/111, 113, 74, 77, 79; 455/569.1, 455/575.1, 575.2; 379/419, 420, 387.01, 379/388.01; 367/135–138
See application file for complete search history.

(56) References Cited

U.S. PATENT DOCUMENTS

| 3,648,249 A | 3/1972 | Goldsberry |
|---|---|---|
| 3,746,991 A | 7/1973 | Gautney |

(Continued)

FOREIGN PATENT DOCUMENTS

| CN | 1471284 | 1/2004 |
|---|---|---|
| CN | 1720763 | 1/2006 |

(Continued)

OTHER PUBLICATIONS

Stiehl et al, U.S. Appl. No. 12/203,872, filed Sep. 3, 2008.

(Continued)

*Primary Examiner* — Xu Mei
(74) *Attorney, Agent, or Firm* — Treyz Law Group; G. Victor Treyz; Chih-Yun Wu

(57) ABSTRACT

Electronic devices and accessories such as headsets for electronic devices are provided. A microphone may be included in an accessory to capture sound for an associated electronic device. Buttons and other user interfaces may be included in the accessories. An accessory may have an audio plug that connects to a mating audio jack in an electronic device, thereby establishing a wired communications link between the accessory and the electronic device. The electronic device may include power supply circuitry for applying bias voltages to the accessory. The bias voltages may bias a microphone and may adjust settings in the accessory such as settings related to operating modes. User input information may be conveyed between the accessory and the electronic device using ultrasonic tone transmission. The electronic device may also gather input from the accessory using a voltage detector coupled to lines in the communications path.

7 Claims, 40 Drawing Sheets

(51) Int. Cl.
*H04M 1/05* (2006.01)
*H04M 1/60* (2006.01)

(56) References Cited

U.S. PATENT DOCUMENTS

| | | | |
|---|---|---|---|
| 4,338,846 | A | 7/1982 | Pogoda |
| 4,998,091 | A | 3/1991 | Rezmer |
| 5,345,510 | A | 9/1994 | Singhi |
| 5,388,496 | A | 2/1995 | Miller |
| RE35,536 | E | 6/1997 | Irissou et al. |
| 6,251,077 | B1 | 6/2001 | Mo |
| 6,397,087 | B1 | 5/2002 | Kim et al. |
| 6,426,697 | B1 | 7/2002 | Capowski |
| 6,639,989 | B1 | 10/2003 | Zacharov et al. |
| 6,668,161 | B2 | 12/2003 | Boros et al. |
| 6,745,014 | B1 | 6/2004 | Seibert et al. |
| 6,798,889 | B1 | 9/2004 | Dicker et al. |
| 6,988,905 | B2 | 1/2006 | Corey et al. |
| 6,999,584 | B1* | 2/2006 | Bogard ............ 379/428.01 |
| 7,110,799 | B1 | 9/2006 | Willins et al. |
| 7,349,546 | B2 | 3/2008 | Ganton |
| 7,623,667 | B2* | 11/2009 | Sander et al. ............ 381/74 |
| 7,627,128 | B2* | 12/2009 | Sander et al. ............ 381/74 |
| 7,769,187 | B1* | 8/2010 | Farrar et al. ............ 381/74 |
| 7,983,722 | B2 | 7/2011 | Lowles |
| 8,194,890 | B2 | 6/2012 | Konanka et al. |
| 2001/0008499 | A1* | 7/2001 | Ko ................................ 367/2 |
| 2001/0053228 | A1 | 12/2001 | Jones |
| 2002/0032047 | A1 | 3/2002 | Ingbir |
| 2003/0083114 | A1 | 5/2003 | Lavin et al. |
| 2003/0210800 | A1 | 11/2003 | Yamada et al. |
| 2004/0203975 | A1 | 10/2004 | Chen et al. |
| 2005/0128097 | A1 | 6/2005 | Piccolo |
| 2005/0190306 | A1 | 9/2005 | Lee |
| 2005/0201568 | A1 | 9/2005 | Goyal |
| 2005/0249360 | A1 | 11/2005 | Adcock |
| 2006/0009868 | A1 | 1/2006 | Park |
| 2006/0223581 | A1 | 10/2006 | Jacobs |
| 2007/0004472 | A1 | 1/2007 | Gitzinger |
| 2007/0178947 | A1* | 8/2007 | Kim ......................... 455/575.2 |
| 2007/0225049 | A1 | 9/2007 | Andrada |
| 2008/0032753 | A1 | 2/2008 | Nho |
| 2008/0039072 | A1 | 2/2008 | Bloebaum |
| 2008/0164994 | A1 | 7/2008 | Johnson et al. |
| 2008/0280653 | A1 | 11/2008 | Ma et al. |
| 2012/0140957 | A1 | 6/2012 | Poulsen et al. |

FOREIGN PATENT DOCUMENTS

| | | |
|---|---|---|
| CN | 1727131 | 2/2006 |
| CN | 1866311 | 11/2006 |
| EP | 1 976 246 | 10/2008 |
| TW | 439366 | 6/2001 |
| TW | I245551 | 12/2005 |
| TW | M306440 | 2/2007 |
| WO | 9957937 A1 | 11/1999 |
| WO | 03056790 A1 | 7/2003 |
| WO | 2008085929 A2 | 7/2008 |

OTHER PUBLICATIONS

Wendell et al, U.S. Appl. No. 12/203,877, filed Sep. 3, 2008.
Wendell et al, U.S. Appl. No. 12/203,879, filed Sep. 3, 2008.
Wendell et al, U.S. Appl. No. 12/203,880, filed Sep. 3, 2008.
Wendell et al, U.S. Appl. No. 12/203,881, filed Sep. 3, 2008.
Wendell et al, U.S. Appl. No. 12/203,883, filed Sep. 3, 2008.
Wendell et al, U.S. Appl. No. 12/203,876, filed Sep. 3, 2008.
Wendell et al, U.S. Appl. No. 12/203,873, filed Sep. 3, 2008.
Lin et al, U.S. Appl. No. 12/203,866, filed Sep. 3, 2008.
"TRS connector" Wikipedia, [online], retrieved Jul. 28, 2008, <http://en.wikipedia.org/wiki/TRS_connector>.

* cited by examiner

| HEADSET TYPE | LATCH | SWA | SWB1 | SWB2 | MODE |
|---|---|---|---|---|---|
| SPEAKERS WITH MIC (ACTIVE MIC) | HIGH | OFF | ON | ON | TONE MODE |
| SPEAKERS WITH MIC (INACTIVE MIC) | LOW | ON | OFF | OFF | RESISTANCE DETECTION MODE |
| SPEAKERS WITHOUT MIC | LOW | ON | OFF | OFF | RESISTANCE DETECTION MODE |
| SPEAKERS WITHOUT MIC | HIGH | OFF | ON | ON | TONE MODE |

FIG. 29

| PARAMETER | TYPICAL VALUE |
|---|---|
| BUTTON FREQUENCY 1 | 134 KHZ |
| BUTTON FREQUENCY 2 | 170 KHZ |
| BUTTON FREQUENCY 3 | 205 KHZ |
| BUTTON FREQUENCY 4 | 240 KHZ |
| CALIBRATION FREQUENCY | 275 KHZ |
| BUTTON RELEASE FREQUENCY | 99 KHZ |

FIG. 33

| Application | Control Buttons | User Gestures | | | |
|---|---|---|---|---|---|
| | | Click | Press & Hold | Double Click | Double click - Press & Hold |
| Media Player Application | + | Volume up | Volume up ramp | x | x |
| | Center | Play / Pause | * | Next track, Next chapter, Next photo | x |
| | - | Volume down | Volume down ramp | x | x |
| Radio Application | + | Volume up | Volume up ramp | x | x |
| | Center | Mute / Un-mute | Tag | Next Preset | x |
| | - | Volume down | Volume down ramp | x | x |
| Voice Memo Record Application | + | x | x | x | x |
| | Center | Pause / Resume | x | x | Launch app & Start / End Record |
| | - | x | x | x | x |
| Voice Memo Playback Application | + | Volume up | Volume up ramp | x | x |
| | Center | Play / Pause | x | Next Chapter | x |
| | - | Volume down | Volume down ramp | x | x |
| Exercise Application | + | Volume up | Volume up ramp | x | x |
| | Center | Voice Feedback | PowerSong | x | x |
| | - | Volume down | Volume down ramp | x | x |

FIG. 38

| music | click | click & hold | double click | click + click & hold | triple click |
|---|---|---|---|---|---|
| + | volume up | volume ramp up | - | - | - |
| center | play/pause | cycle playlist | next track, chapter | track announcement | previous track, chapter |
| - | volume down | volume ramp down | - | - | - |

FIG. 39

ELECTRONIC DEVICE CIRCUITRY FOR COMMUNICATING WITH ACCESSORIES

This application claims the benefit of provisional patent application No. 61/020,988, filed Jan. 14, 2008, which is hereby incorporated by reference herein in its entirety.

BACKGROUND

This invention relates to electronic devices and accessories for electronic devices.

Electronic devices such as computers, media players, and cellular telephones typically contain audio jacks. Accessories such as headsets have mating plugs. A user who desires to use a headset with an electronic device may connect the headset to the electronic device by inserting the headset plug into the mating audio jack on the electronic device. Miniature size (3.5 mm) phone jacks and plugs are commonly used electronic devices such as notebook computers and media players, because audio connectors such as these are relatively compact.

Stereo audio connectors typically have three contacts. The outermost end of an audio plug is typically referred to as the tip. The innermost portion of the plug is typically referred to as the sleeve. A ring contact lies between the tip and the sleeve. When using this terminology, stereo audio connectors such as these are sometimes referred to as tip-ring-sleeve (TRS) connectors. The sleeve can serve as ground. The tip contact can be used in conjunction with the sleeve to handle a left audio channel and the ring contact can be used in conjunction with the sleeve to handle the right channel of audio.

In devices such as cellular telephones, it is often necessary to convey microphone signals from the headset to the cellular telephone. In arrangements in which it is desired to handle both stereo audio signals and microphone signals, an audio connector typically contains an additional ring terminal. Audio connectors such as these have a tip, two rings, and a sleeve and are therefore sometimes referred to as four-contact connectors or TRRS connectors. When a four-contact connector is used, the sleeve or one of the rings may serve as ground. The tip contact and the outermost ring contact may be used in conjunction with the ground to carry audio for the left and right headset speaker audio channels. The remaining contact (e.g., the sleeve contact) may be used in conjunction with the ground to carry microphone signals.

In a typical microphone-enabled headset, a bias voltage is applied to the microphone from the electronic device over the microphone line. The microphone in the headset generates a microphone signal when sound is received from the user (i.e., when a user speaks during a telephone call). Microphone amplifier circuitry and analog-to-digital converter circuitry in the cellular telephone can convert microphone signals from the headset into digital signals for subsequent processing.

Some users may wish to operate their cellular telephones or other electronic devices remotely. To accommodate this need, some modern microphone-enabled headsets feature a button. When the button is pressed by the user, the microphone line is shorted to ground. Monitoring circuitry in a cellular telephone to which the headset is connected can detect the momentary grounding of the microphone line and can take appropriate action. In a typical scenario, a button press might be used be used to answer an incoming telephone or might be used skip tracks during playback of a media file.

Conventional button arrangements such as these offer limited functionality and may introduce undesirable clicking noises if the button is actuated during normal use of the microphone.

It would therefore be desirable to be able to provide improved arrangements for supporting interactions between electronic devices and accessories such as headsets.

SUMMARY

Electronic devices and accessories for electronic devices are provided. The electronic devices may be computers, handheld computing devices such as smart cellular telephones or media players, or any other suitable computing equipment. These devices typically generate audio signals. The audio signals may be used to drive speakers in accessories such as headsets and other equipment capable of presenting sound to a user.

Some electronic devices support operations that involve gathering sound input with a microphone. Accessories with microphones may be used to supply microphone signals to electronic devices with audio input capabilities. For example, accessories with microphones may be used to supply voice signals to a cellular telephone in connection with cellular telephone calls or may be used to supply audio when an audio clip is being recorded by a voice memo application on a device. Speakers may be used to play media files, sound from telephone call, or other suitable audio information.

It may be desirable to gather user input with a user input interface that is part of an accessory (i.e., a stand-alone accessory or an adapter). With this type of arrangement, buttons, a touch pad, a touch screen, or other user input interface equipment may be used at the accessory to gather user input. Resistively encoded buttons may be used to gather user input. An impedance detector may be used in the accessory to determine which of the resistively encoded buttons has been pressed. Button activity may also be monitored directly by the electronic device using voltage detection circuitry. The accessory may have an ultrasonic tone generator that conveys ultrasonic tones in response to user input activity such as button press activity. The electronic device may have a tone detector that monitors the user input by receiving and processing the ultrasonic tones. The user input may be used to adjust the functions of the electronic device such as media playback functions, cellular telephone operations, and other suitable functions.

If desired, user input can be conveyed from the accessory to the electronic device as ultrasonic tones using a microphone line and ground line that are also being used to convey audio information. For example, in an accessory with buttons, information on button actuation events can be transmitted as ultrasonic signals at the same time that analog microphone signals are conveyed from the accessory to a corresponding amplifier in the electronic device.

Ultrasonic tones are not audible to humans, so they can be carried over the microphone and ground path without resulting in audible microphone interference. This allows a user to convey button actuation activity to the electronic device at the same time that the user carries on a telephone call using the microphone in the accessory. Microphone signals corresponding to the user's voice may be conveyed to the electronic device, while simultaneously conveying button press data to the electronic device. Both analog microphone signals and ultrasonic button actuation data may be transmitted from the accessory to the electronic device simultaneously. The ultrasonic signals will not be audible as audio signals and therefore will not interfere with other audio signals such as music or voice signals.

The buttons that are used to produce the ultrasonic signals may be resistively-encoded buttons that provide button press data to a tone generator. The tone generator may, in turn, transmit corresponding ultrasonic tones to the electronic device. These buttons need not short the microphone and ground lines together. As a result, the microphone and ground lines can be left undisturbed by shorting events during button presses. This helps allow a user to make button presses at the same time that the user is carrying on a telephone call. In this type of configuration, button presses are used to control the tone generator and will not short the microphone and ground lines together. Shorting events will therefore not interrupt a telephone call. The ultrasonic tones that are produced by the tone generator in response to the button presses can be conveyed over the microphone and ground lines during the telephone call, but will not be audible to the user because they fall outside the range of human hearing.

Further features of the invention, its nature and various advantages will be more apparent from the accompanying drawings and the following detailed description of the preferred embodiments.

BRIEF DESCRIPTION OF THE DRAWINGS

FIG. 29 is a table showing illustrative states in which an illustrative set of switches may be placed by control circuitry in various accessories during different modes of operation in accordance with embodiments of the present invention.

FIG. 33 is an illustrative table showing tone frequencies that may be used in a tone-based scheme for supporting communications between an accessory such as a headset and an electronic device in accordance with an embodiment of the present invention.

FIG. 38 is a chart showing illustrative actions that may be taken in an electronic device in response to user input such as user input supplied to an accessory that is connected to the electronic device in accordance with embodiments of the present invention.

FIG. 39 is a chart showing additional illustrative actions that may be taken in an electronic device in response to user input such as user input supplied to an accessory that is connected to the electronic device in accordance with embodiments of the present invention.

DETAILED DESCRIPTION

Figure 1:
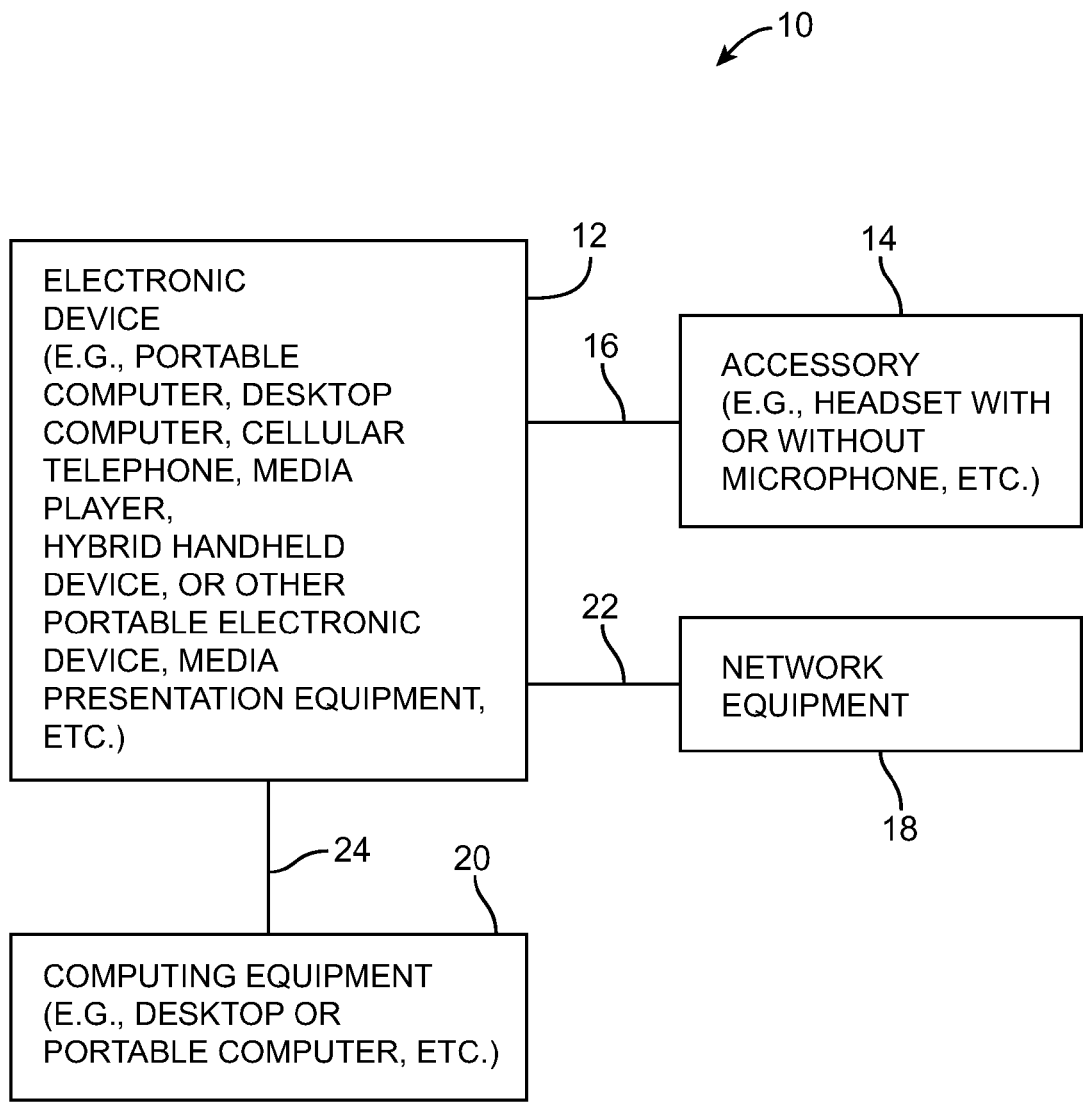
FIG. 1 is a schematic diagram of an illustrative electronic device in communication with an accessory such as a headset and other external equipment in a system in accordance with an embodiment of the present invention.

The present invention relates generally to electronic devices and accessories for electronic devices.

The electronic devices may be, for example, devices such as desktop computers or portable electronic devices such as laptop computers or small portable computers of the type that are sometimes referred to as ultraportables. The electronic devices may also be somewhat smaller portable electronic devices such as wrist-watch devices, pendant devices, and other wearable and miniature devices. If desired, the electronic devices may include wireless capabilities.

The electronic devices may be handheld electronic devices such as cellular telephones, media players with wireless communications capabilities, handheld computers (also sometimes called personal digital assistants), remote controllers, global positioning system (GPS) devices, and handheld gaming devices. The electronic devices may also be hybrid devices that combine the functionality of multiple conventional devices. Examples of hybrid electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

An example of an accessory that may be used with an electronic device is a headset. A headset typically includes a pair of speakers that a user can use to play audio from the electronic device. The accessory may have a user control interface such as one or more buttons. When a user supplies input, the input may be conveyed to the electronic device. As an example, when the user presses a button on the accessory, a corresponding signal may be provided to the electronic device to direct the electronic device to take an appropriate action. Because the button is located on the headset rather than on the electronic device, a user may place the electronic device at a remote location such as on a table or in a pocket, while controlling the device using conveniently located headset buttons.

If the electronic device is a media player and is in the process of playing a song or other media file for the user, the electronic device may be directed to pause the currently playing media file when the user presses a button. As another example, if the electronic device is a cellular telephone with media player capabilities and the user is listening to a song when an incoming telephone call is received, actuation of the button by the user may direct the electronic device to answer the incoming telephone call. Actions such as these may be taken, for example, while the media player or cellular telephone is stowed within a user's pocket.

Accessories such as headsets are typically connected to electronic devices using audio plugs (male audio connectors) and mating audio jacks (female audio connectors). Audio connectors such as these may be provided in a variety of form factors. Most commonly, audio connectors take the form of 3.5 mm (⅛") miniature plugs and jacks. Other sizes are also sometimes used such as 2.5 mm subminiature connectors and ¼ inch connectors. In the context of accessories such as headsets, these audio connectors and their associated cables are generally used to carry analog signals such as audio signals for speakers and microphone signals. Digital connectors such as universal serial bus (USB) and Firewire® (IEEE 1394) connectors may also be used by electronic devices to connect to external equipment such as headsets, but it is generally preferred to connect headsets to electronic devices using standard audio connectors such as the 3.5 mm audio connector. Digital connectors such as USB connectors and IEEE 1394 connectors are primarily of use where large volumes of digital data need to be transferred with external equipment such as when connecting to a peripheral device such as a printer. Optical connectors, which may be integrated with digital and analog connectors, may be used to convey data between an electronic device and an associated accessory, particularly in environments that carry high bandwidth traffic such as video traffic. If desired, audio connectors may include optical communications structures to support this type of traffic.

An illustrative system in accordance with an embodiment of the present invention is shown in FIG. 1. As shown in FIG. 1, system 10 may include an electronic device such as electronic device 12 and an accessory such as accessory 14. A path such as path 16 may be used to connect electronic device 12 and accessory 14. In a typical arrangement, path 16 includes one or more audio connectors such as 3.5 mm plugs and jacks or audio connectors of other suitable sizes. Conductive lines in path 16 may be used to convey signals over path 16. There may, in general, be any suitable number of lines in path 16. For example, there may be two, three, four, five, or more than five separate lines. These lines may be part of one or more cables. Cables may include solid wire, stranded wire, shielding, single ground structures, multi-ground structures, twisted pair structures, or any other suitable cabling structures. Extension cord and adapter arrangements may be used as part of path 16 if desired. In an adapter arrangement, some of the features of accessory 14 such as user interface and communications functions may be provided in the form of an adapter accessory with which an auxiliary accessory such as a headset may be connected to device 12.

Accessory 14 may be any suitable device that works in conjunction with electronic device 12. Examples of accessories include audio devices such as audio devices that contain or work with one or more speakers. Speakers in accessory 14 may be provided as an earphone or a headset or may be provided as a set of stand-alone powered or unpowered speakers (e.g., desktop speakers). Accessory 14 may, if desired, include audio-visual (AV) equipment such as a receiver, amplifier, television or other display, etc. Devices such as these may use path 16 to receive audio signals from device 12. The audio signals may, for example, be provided in the form of analog audio signals that need only be amplified or passed to speakers to be heard by the user of device 12. An optional microphone in accessory 14 may pass analog microphone signals to device 12. Buttons or other user interface devices may be used to gather user input for device 12. The use of these and other suitable accessories in system 10 is merely illustrative. In general, any suitable accessories may be used in system 10 if desired.

Electronic device 12 may be a desktop or portable computer, a portable electronic device such as a handheld electronic device that has wireless capabilities, equipment such as a television or audio receiver, or any other suitable electronic equipment. Electronic device 12 may be provided in the form of stand-alone equipment (e.g., a handheld device that is carried in the pocket of a user) or may be provided as an embedded system. Examples of systems in which device 12 may be embedded include automobiles, boats, airplanes, homes, security systems, media distribution systems for commercial and home applications, display equipment (e.g., computer monitors and televisions), etc.

Device 12 may communicate with network equipment such as equipment 18 over path 22. Path 22 may be, for example, a cellular telephone wireless path. Equipment 18 may be, for example, a cellular telephone network. Device 12 and network equipment 18 may communicate over path 22 when it is desired to connect device 12 to a cellular telephone network (e.g., to handle voice telephone calls to transfer data over cellular telephone links, etc.).

Device 12 may also communicate with equipment such as computing equipment 20 over path 24. Path 24 may be a wired or wireless path. Computing equipment 20 may be a computer, a set-top box, audio-visual equipment such as a receiver, a disc player or other media player, a game console, a network extender box, or any other suitable equipment.

In a typical scenario, device 12 may be, as an example, a handheld device that has media player and cellular telephone capabilities. Accessory 14 may be a headset with a microphone and a user input interface such as a button-based interface for gathering user input. Path 16 may be a four or five conductor audio cable that is connected to devices 12 and 14 using 3.5 mm audio jacks and plugs (as an example). Computing equipment 20 may be a computer with which device 12 communicates (e.g., to synchronize a list of contacts, media files, etc.).

While paths such as path 24 may be based on commonly available digital connectors such as USB or IEEE 1394 connectors, it may be advantageous to use standard audio connectors such as a 3.5 mm audio connector to connect device 12 to accessory 14. Connectors such as these are in wide use for handling audio signals. As a result, many users have a collection of headsets and other accessories that use 3.5 mm audio connectors. The use of audio connectors such as these may therefore be helpful to users who would like to connect their existing audio equipment to device 12. Consider, as an example, a user of a media player device. Media players are well known devices for playing media files such as audio files and video files that contain an audio track. Many owners of media players own one or more headsets that have audio plugs that are compatible with standard audio jacks. It would therefore be helpful to users such as these to provide device 12 with such a compatible audio jack, notwithstanding the availability of additional ports such as USB and IEEE 1394 high speed digital data ports for communicating with external devices such as computing equipment 20.

Figure 2:
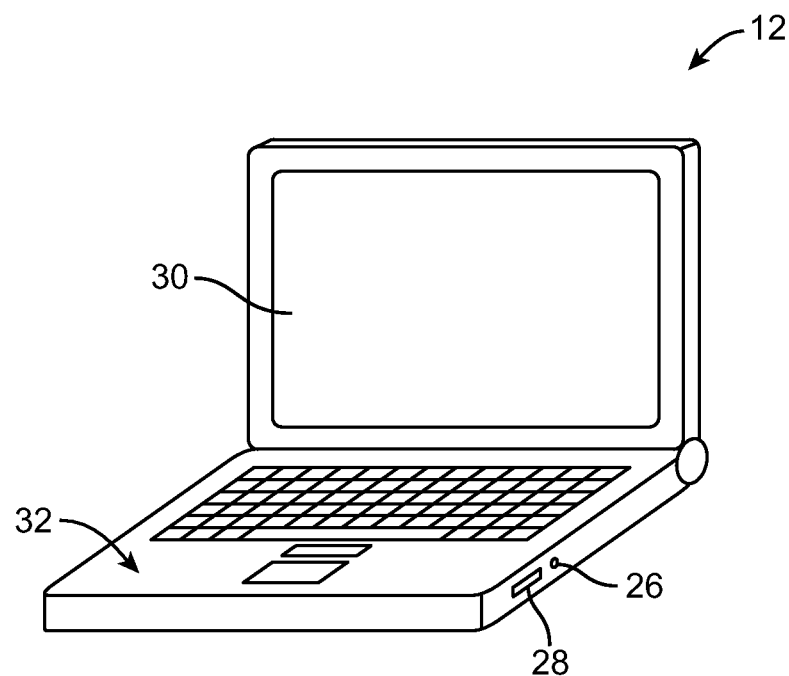
FIG. 2 is a perspective view of an illustrative electronic device such as a portable computer with an audio connector that mates with accessories such as headsets in accordance with an embodiment of the present invention.
Figure 3:
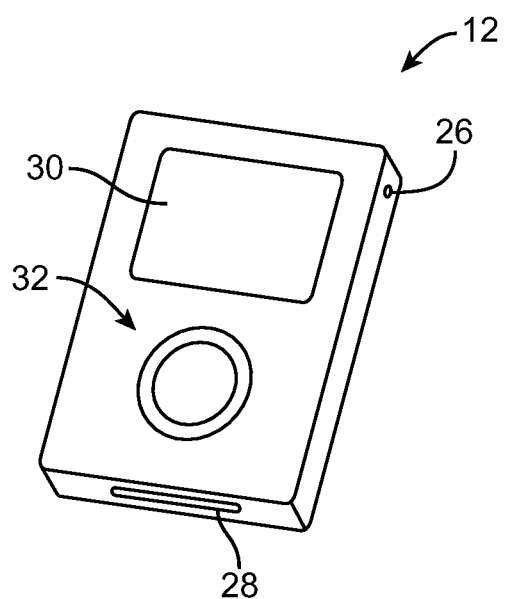
FIG. 3 is a perspective view of an illustrative handheld electronic device such as a media player, cellular telephone, or hybrid device showing how the handheld electronic device may have an audio connector that mates with accessories such as headsets in accordance with an embodiment of the present invention.

Illustrative examples are shown in FIGS. 2 and 3. In the example of FIG. 2, device 12 is a portable computer. Portable computer 12 of FIG. 2 has a display such as display 30 and user input equipment such as touch pad and keys 32. As shown in FIG. 2, device 12 may have an audio jack such as jack 26 for receiving a mating audio plug. Device 12 may also have digital ports such as serial and parallel digital data ports (i.e., port 28).

In the example of FIG. 3, device 12 is shown as having a screen such as screen 30 and a user input device such as user interface device 32. Device 32 may be, for example, a click wheel, a touch pad, keys, switches, or other suitable buttons, a touch screen, etc. Screen 30 may be, for example, a touch screen that covers a large fraction of the front face of device 12. Audio jack 26 may be provided to allow a user to connect a headset or other accessory to device 12. Additional connectors such as connector 28 may also be provided. Connector 28 may be a 30-pin connector, a USB port, etc.

If desired, connectors such as audio connector 26 in FIGS. 2 and 3 may be the sole input-output connector on a given device 12. Additional connectors may also be provided (e.g., one, two, three, or more than three additional connectors). Such additional connectors may be suitable for handling audio, digital signals, etc.

Figure 4:
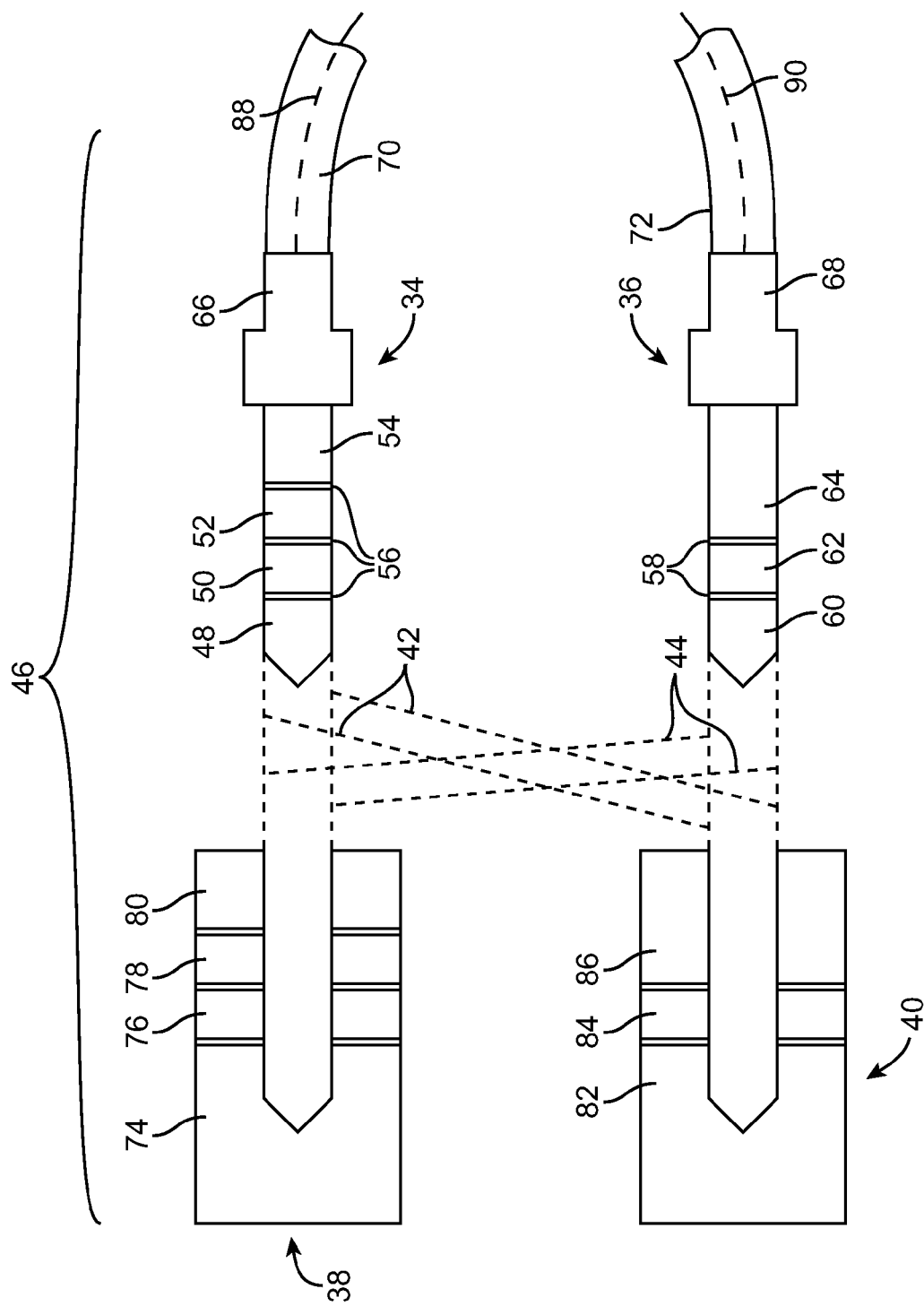
FIG. 4 is a cross-sectional side view of illustrative three-contact and four-contact audio connectors that may be used in accordance with embodiments of the present invention.

Illustrative audio connectors that may be used to interconnect device 12 and accessory 14 are shown in FIG. 4. As shown in FIG. 4, audio connectors 46 may include audio plugs such as plugs 34 and 36 that mate with corresponding audio jacks such as audio jacks 38 and 40. Connectors 46 may be used at any suitable location or locations within path 16 (FIG. 1). For example, audio jacks such as jacks 38 and 40 can be formed within the housing of device 12, as shown in the examples of FIGS. 2 and 3 and plugs such as plugs 34 and 36 can be formed on the end of a cable that is associated with a headset or other accessory 14. As shown in FIG. 4, cable 70 may be connected to audio plug 34 via strain-relief plug structure 66 and cable 72 may be connected to audio plug 36 via strain-relief plug structure 68. Structures such as structures 66 and 68 may be formed with an external insulator such as plastic (as an example).

Audio plug 34 is an example of a four-contact plug. A four-contact plug has four conductive regions that mate with four corresponding conductive regions in a four-contact jack such as jack 38. As shown in FIG. 4, these regions may include a tip region such as region 48, ring regions such as rings 50 and 52, and a sleeve region such as region 54. These regions surround the cylindrical surface of plug 34 and are separated by insulating regions 56. When plug 34 is inserted in mating jack 38, tip region 48 may make electrical contact with jack tip contact 74, rings 50 and 52 may mate with ring regions 76 and 78, and sleeve 54 may make contact with sleeve terminal 80. In a typical configuration, there are four wires in cable 70, each of which is electrically connected to a respective contact. Ring 52 may serve as ground. Tip 48 and ring 52 may be used together to handle a left audio channel (e.g., signals for a left-hand speaker in a headset). Ring 50 and ring 52 may be used for right channel audio. In accessories that contain microphones, ring 52 and sleeve 54 may be used to carry microphone audio signals from the accessory to electronic device 12. Because this type of wiring scheme is commonly used in other devices, contacts such as contact 54 and the associated line in cable 70 (i.e., one of lines 88) are sometimes referred to as the microphone contact and microphone line, even when no microphone is present in accessory 14. Plugs and accessories with this configuration have tip, outer ring, inner ring, and sleeve contacts that are respectively associated with left audio, right audio, ground, and microphone signals. If desired, plugs and jacks with other signal assignment schemes may be used. For example, sleeve 80 may be used for ground and ring 52 may be used as a microphone contact, etc.

Plug 36 of FIG. 4 is an example of a three-contact audio connector. Tip 60 mates with region 82 in jack 40. Ring 62 on plug 36 mates with ring region 84 in jack 40. Sleeve region 64 electrically connects to region 86 in jack 40 when plug 36 is inserted in jack 40. Regions 60, 62, and 64 are separated by regions 58. There is generally no microphone line in wires 90, because tip 60 and ring 62 are used for left and right speaker signals.

As indicated by dashed lines 42, it is physically possible to insert a four-connector plug such as plug 34 into a three-connector jack such as jack 40, although doing so will short ring 52 of plug 34 to sleeve 54 of plug 34, thereby preventing normal use of microphone contact 54 and the associated microphone line in lines 88 of cable 70. Similarly, as indicated by dashed lines 44, it is possible to physically insert a three-contact plug such as plug 36 into a four-contact jack such as jack 38, although this will short regions 78 and 80 and will therefore not allow these regions to operate independently. If desired, audio connectors may be used that have more than four contacts or that have fewer than three contacts. For clarity, however, aspects of the invention will sometimes be described in the context of examples based on three-contact and four-contact audio connectors.

The FIG. 4 examples are merely illustrative audio connectors that may be used to interconnect device 12 and accessory 14. In general, audio connectors such as audio connectors 46 may be formed from any suitable plugs (male connectors) and any suitable jacks (female connectors) or any other suitable mating connectors. Moreover, connectors 46 may be placed at any suitable locations along path 16. With a typical arrangement, a jack is mounted within device 12 and a mating plug is connected to accessory 14 by a cable. This is, however, merely illustrative. A jack may be mounted in accessory 14 and a plug may be connected to device 12 via a cable. As another example, jacks may be used in both device 12 and accessory 14 and a double-ended cable (i.e., a cable with male connectors on either end) may be used to connect device 12 with accessory 14. Adapters may also be used. For example, an adapter may be plugged into device 12 (e.g., using a digital port). The adapter, which may be considered to be a type of accessory 14, may be provided with a jack into which a plug from a headset or other equipment may be inserted to complete path 16. In this type of scenario, the adapter may contain circuitry for performing functions that would otherwise be performed by buttons and circuitry on the headset.

Figure 5:
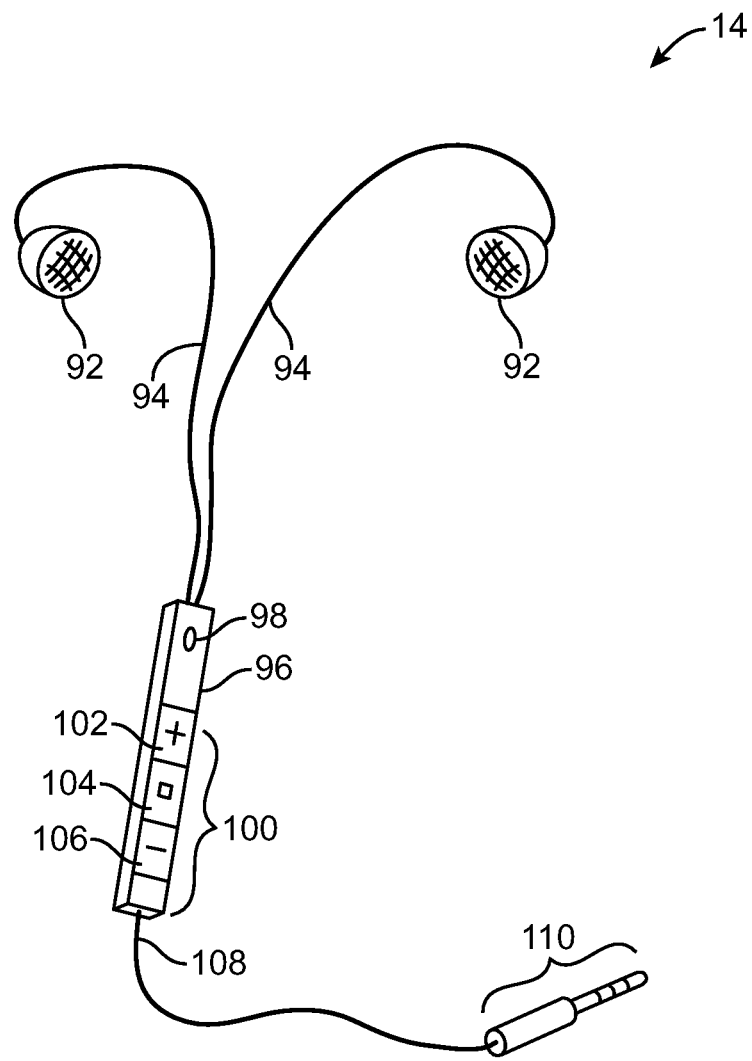
FIG. 5 is a perspective view of an illustrative accessory such as a headset that may be provided with a user input interface such as input-output circuitry containing multiple user-selectable buttons in accordance with an embodiment of the present invention.

An illustrative accessory is shown in FIG. 5. Accessory 14 of FIG. 5 is a headset with a microphone. Speakers 92 may be provided in the form of over-the-ear speakers, ear plugs, or ear buds (as examples). Dual-conductor wires such as wires 94 may be used to connect speakers 92 to user interface main unit 96. Unit 96 may include a microphone 98. In some applications, microphone 98 may not be needed and may therefore be omitted from accessory 14 to lower cost. In other applications, such as cellular telephone application, voice recording applications, etc., microphone 98 may be used to gather audio signals (e.g., from the sound of a user's voice).

Unit 96 may include user input devices such as user input interface 100. In the FIG. 5 example, unit 96 includes three buttons. If desired, more buttons, fewer buttons, or non-button user input devices may be included in accessory 14. Moreover, it is not necessary for these devices to be mounted to the same unit as microphone 98. The FIG. 5 arrangement is merely illustrative. If desired, unit 96 may be connected within one of the branch paths 94, rather than at the junction between path 108 and paths 94. This may help position a microphone within unit 96 closer to the mouth of a user, so that voice signals can be captured accurately. An illustrative headset with buttons and a microphone that may be located in this way and that may be used as an accessory 14 for electronic device 12 is described in commonly-assigned concurrently-filed patent application Ser. No. 12/203,866 and being entitled "Accessory Controller for Electronic Devices" (Wey-Jiun Lin et al.), which is hereby incorporated by reference herein in its entirety. An example of another multi-button headset on which accessory 14 may be based is described in commonly-assigned concurrently-filed patent application Ser. No. 12/203,872 and being entitled "In Cable Micro Input Devices" (Kurt Stiehl et al.), which is hereby incorporated by reference herein in its entirety.

In an illustrative three-button arrangement, a first of the three buttons such as button 102 may be pressed by a user when it is desired to advance among tracks being played back by a music application or may be used to increase a volume setting. A second of the three buttons, such as button 104 may be pressed when it is desired to stop music playback, answer an incoming cellular telephone call made to device 12 from a remote caller, or when it is desired to make a menu selection. A third of the three buttons such as button 106 may be selected when it is desired to move to an earlier track or when it is desired to lower a volume setting. Multiple clicks, click and hold operations, and other user input patterns may also be used. The up/down volume, forward/reverse track, and "answer call" examples described in connection with FIG. 5 are merely illustrative. In general, the action that is taken in response to a given command may be adjusted by a system designer through modification of the software in device 12.

As shown in FIG. 5, a cable such as cable 108 may be integrated into accessory 14. At its far end, cable 108 may be provided with a connector such as audio connector 110. In the FIG. 5 example, accessory 14 has two speakers 92 and a microphone (microphone 98). Connector 110 may therefore be of the four-contact variety. In accessories in which microphone 98 or one of the speakers is omitted, signals can be carried over a three-contact connector. If desired, connectors with additional contacts may also be used (e.g., to carry auxiliary power, to carry control signals, etc.). Audio connectors with optical cores can be used to carry optical signals in addition to analog electrical signals. If desired, microphone 98 may be connected at a location along one of the wires leading to speakers 92, as this may help position microphone 98 adjacent to the mouth of a user.

Accessory 14 may be provided with circuitry that helps convey signals from user input interface 100 to device 12 over path 16. In general, any suitable communications format may be used to convey signals (e.g., analog, digital, mixed arrangements based on both analog and digital formats, optical, electrical, etc.). These signals may be conveyed on any suitable lines in path 16. To avoid the need to provide extra conductive lines in path 16 and to ensure that accessory 14 is as compatible as possible with standard audio jacks, it may be advantageous to convey signals over existing lines (e.g., speaker, microphone, and ground). In particular, it may be advantageous to use the microphone and ground lines (e.g., the lines connected to contacts such as sleeve 54 and ring contact 52 in audio plug 34 of FIG. 4) to convey signals such as user input signals and control signals between accessory 14 and electronic device 12.

With one suitable communications arrangement, buttons such as buttons 102, 104, and 106 may be encoded using different resistances. When a user presses a given button, device 12 can measure the resistance of user input interface 100 over the microphone and ground lines and can thereby determine which button was pressed. With another suitable arrangement, a button may be provided that shorts the microphone and ground wires in cable 108 together when pressed. Electronic device 12 can detect this type of momentary short. With yet another suitable arrangement, button presses within interface 100 may be converted to ultrasonic tones that are conveyed over the microphone and ground line. Electronic device 12 can detect and process the ultrasonic tones.

If desired, electronic device 12 can support communications using two or more of these approaches. Different approaches may be used, for example, to support both legacy hardware and new hardware, to support different types of software applications, to support reduced power operation in certain device operating modes, etc.

Ultrasonic tones lie above hearing range for human hearing (generally considered to be about 20,000 Hz). In a typical arrangement, the ultrasonic tones might fall within the range of 75 kHz to 300 kHz (as an example). Ultrasonic tones at frequencies of less than 75 kHz may be used, but may require more accurate circuitry to filter from normal microphone audio signals. Ultrasonic tones above 300 kHz may become susceptible to noise, because the conductors in many headset cables are not design to handle high-frequency signals. The cables can be provided with shielding and other structures that allow high speed signaling to be supported, or, more typically, lower tone frequencies may be used.

Ultrasonic tones may be formed using any suitable oscillating waveform such as a sine wave, saw (triangle) wave, square wave, etc. An advantage of saw and sine waves is that these waveforms contain a narrower range of harmonics than, for example, square waves. As a result, ultrasonic tones based on sine or saw waves may exhibit relatively narrow bandwidth. This may simplify detection and reduce the likelihood of audio interference.

Ultrasonic tones will not be audible to human hearing and therefore represent a form of out-of-band transmission. Arrangements that rely on ultrasonic tones in this way can avoid undesirable audible pops and clicks that might otherwise be associated with a button arrangement that momentarily shorts the microphone line and ground line together upon depression of a button and thereby momentarily disrupts normal operation of the microphone signal path.

In configurations in which the microphone and ground are shorted together upon button actuation events, it will generally not be possible to transmit audio information such as microphone signals while the microphone and ground line are shorted. An advantage of using devices that do not short the microphone and ground lines together such as devices that use ultrasonic tones to convey button actuation information (and that may therefore omit shorting switches between the microphone and ground lines) is that this allows audio information such as microphone signals to be transmitted in a continuous uninterrupted fashion. Even if a user is currently carrying on a telephone conversation, the user may press buttons that are ultrasonically encoded without interrupting the telephone conversation. Each time a button is pressed, the button press event results in the transmission of a corresponding ultrasonic tone, but does not short the microphone and ground lines. The other party to the user's telephone conversation will therefore be able to hear the user's voice without interruption. The microphone and ground lines can be used to convey microphone signals, while the user is able to control the operation of the user's device without concern about disturbing the conversation.

The ability to simultaneously make button presses and to carry on uninterrupted conversation is generally not present in conventional devices that rely on momentarily shorting of the microphone line to ground. This is because the shorting operation in conventional devices blocks transmission of microphone signals, whereas the ultrasonic tones that are used to represent button press events fall out of the human hearing range and can therefore be simultaneously transmitted with microphone signals without being audible to a user.

Circuitry may be provided within accessory 14 (e.g., within main unit 96) to handle operations associated with communicating between accessory 14 and device 12. For example, circuitry may be provided in accessory 14 to transmit ultrasonic tones and to receive signals from device 12. If desired, this circuitry may be provided in an accessory that takes the form of an adapter.

Figure 6:
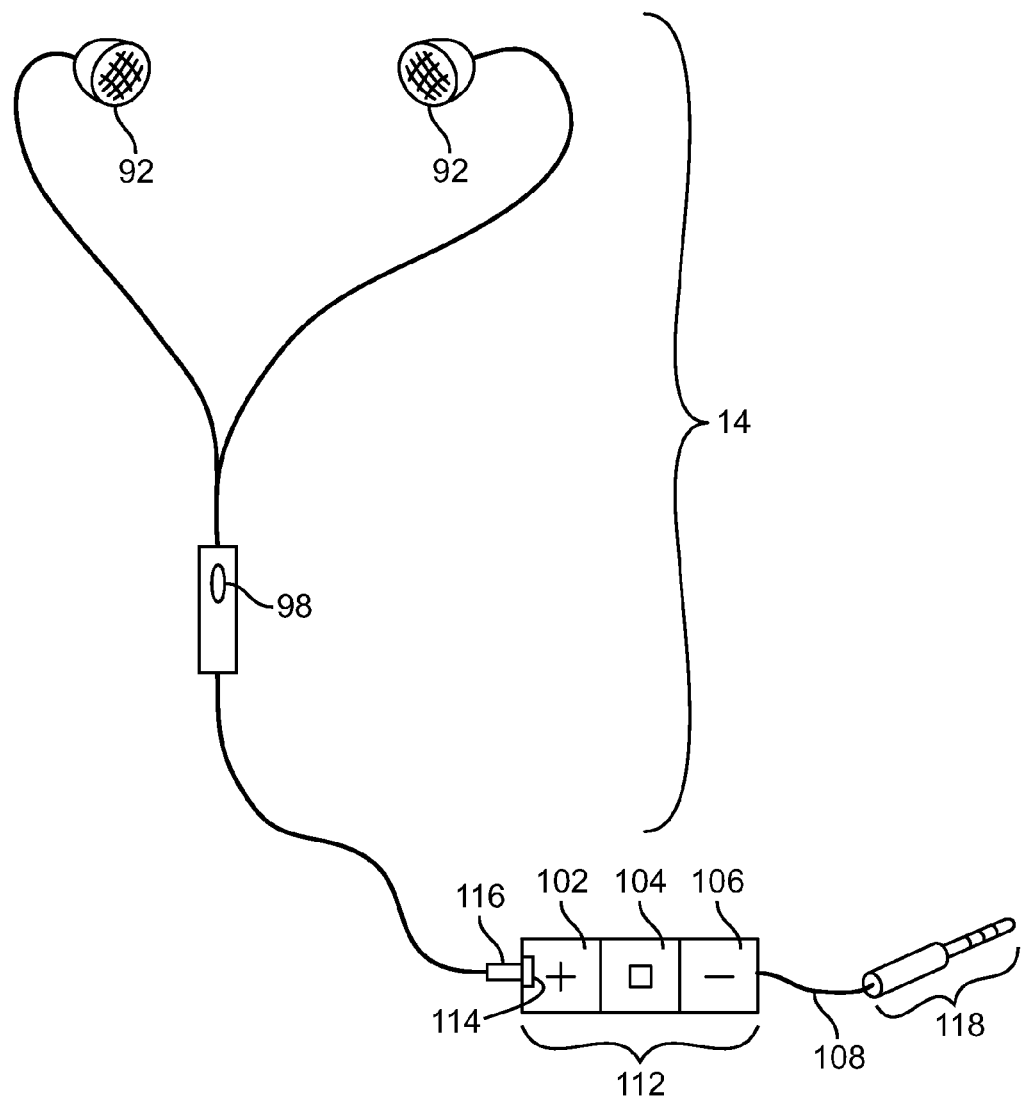
FIG. 6 is perspective view of an illustrative accessory such as a headset that has been connected to an adapter accessory having an input interface such as an interface with multiple user-selectable buttons in accordance with an embodiment of the present invention.

An illustrative arrangement that is based on an adapter is shown in FIG. 6. As shown in FIG. 6, headset 14 may have an audio plug 116 that plugs into a mating audio jack 114 on adapter 112 (itself a type of accessory 14). Plug 116 and jack 114 may be audio connectors such as audio connectors 46 of FIG. 4. Adapter 112 may include electrical paths that pass audio signals from device 12 to speakers in headset 14 and that pass microphone signals from microphone 98 to device 12. Adapter 112 may also include the circuitry that handles communications with device 12 over path 16 that would otherwise be included within an accessory such as accessory 14 of FIG. 5. It is therefore not necessary for headset 14 in the FIG. 6 arrangement to include this circuitry. In the FIG. 6 example, headset 14 includes speakers 92 and microphone 98, but need not include any buttons, because buttons 102, 104, and 106 are included on accessory 112. Accessory 112 may have a cable such as cable 108 with an audio connector 118 for plugging into a mating audio jack on device 12. Adapter-type arrangements such as the arrangement of FIG. 6 allow a user to add button functionality to an accessory such as a headset that does not include buttons. This may be particularly advantageous if a user already owns several different styles of buttonless headset, yet desires to use buttons such as buttons 102, 104, and 106 to control electronic device 12 remotely. If desired, accessory 112 may be provided with a microphone.

Electronic device 12 and accessory 14 may communicate over paths such as path 16 using any suitable techniques. For example, device 12 may present one or more direct current (DC) voltages on suitable lines in path 16 (e.g., across the microphone and ground line pair). These DC voltages may bias any microphone that is present in accessory 14 and may serve as control signals. In turn, accessory 14 may communicate with device 12 using ultrasonic tones. Accessory 14 may also have resistively encoded buttons or other controls. In this type of arrangement, device 12 can bias the resistive network associated with the resistively encoded buttons and can sense the resulting voltage. Information on button activity can also be conveyed from accessory 14 to device 12 using a switch that momentarily shorts the microphone and ground lines in path 16 to each other. Shorts in accessory 14 lead to a detectable zero-voltage condition across these lines that can be detected by device 12.

Arrangements such as these allow device 12 to discover which type of accessory 14 is attached to device 12 and allow user inputs to be conveyed from accessory 14 to device 12 during normal operation. If desired, other communications techniques may be used. For example, device 12 and accessory 14 may communicate using a bidirectional high-speed digital link. The link may be compliant with standard protocols such as the USB protocol (as an example). Digital data can also be conveyed using other buses (e.g., an RS-232 bus, a High-Definition Multimedia Interface (HDMI) bus, other parallel and serial buses, etc. If desired, device 12 may be provided with an ultrasonic transmitter so that device 12 may transmit ultrasonic tones to a mating ultrasonic receiver in accessory 14. Accessory 14 may be provided with power supply circuitry that supplies various DC voltages to device 12 as a form of communication. Resistance coding may be used in device 12 (e.g., to allow accessory 14 to determine what type of device 12 is in communication with accessory 14). These arrangements, other suitable arrangements, and combinations of such arrangements may be used to support communications over path 16.

In environments in which both device 12 and accessory 14 are able to transmit information over path 16, handshaking schemes may be used. Handshaking may be used upon device power-up, when an accessory is plugged into device 12, whenever accessory 14 transmits user input to device 12, or at any other suitable time. Handshakes may take the form of confirmatory signals that indicate that devices are operating properly or that echo transmitted data to confirm signal integrity. Bidirectional exchanges of handshake-type information may also be used to identify equipment and to implement security features. For example, whenever an accessory is connected to device 12, device 12 may query the attached accessory to determine the type of accessory that is in use and to verify that the accessory is authorized (e.g., with an appropriate security code or other identifier).

Support for extensive communications capabilities typically involves additional cost and complexity, so a designer of electronic devices such as device 12 and accessories such as accessory 14 may need to make tradeoffs. For some applications, it may be desirable to forego extensive bidirectional communications support in the interests of reducing weight, cost, complexity, and power consumption requirements. For other applications, issues such as security and data integrity may be more important. In environments such as these, the inclusion of more extensive communications circuitry in device 12 and accessory 14 may be justified.

Figure 7:
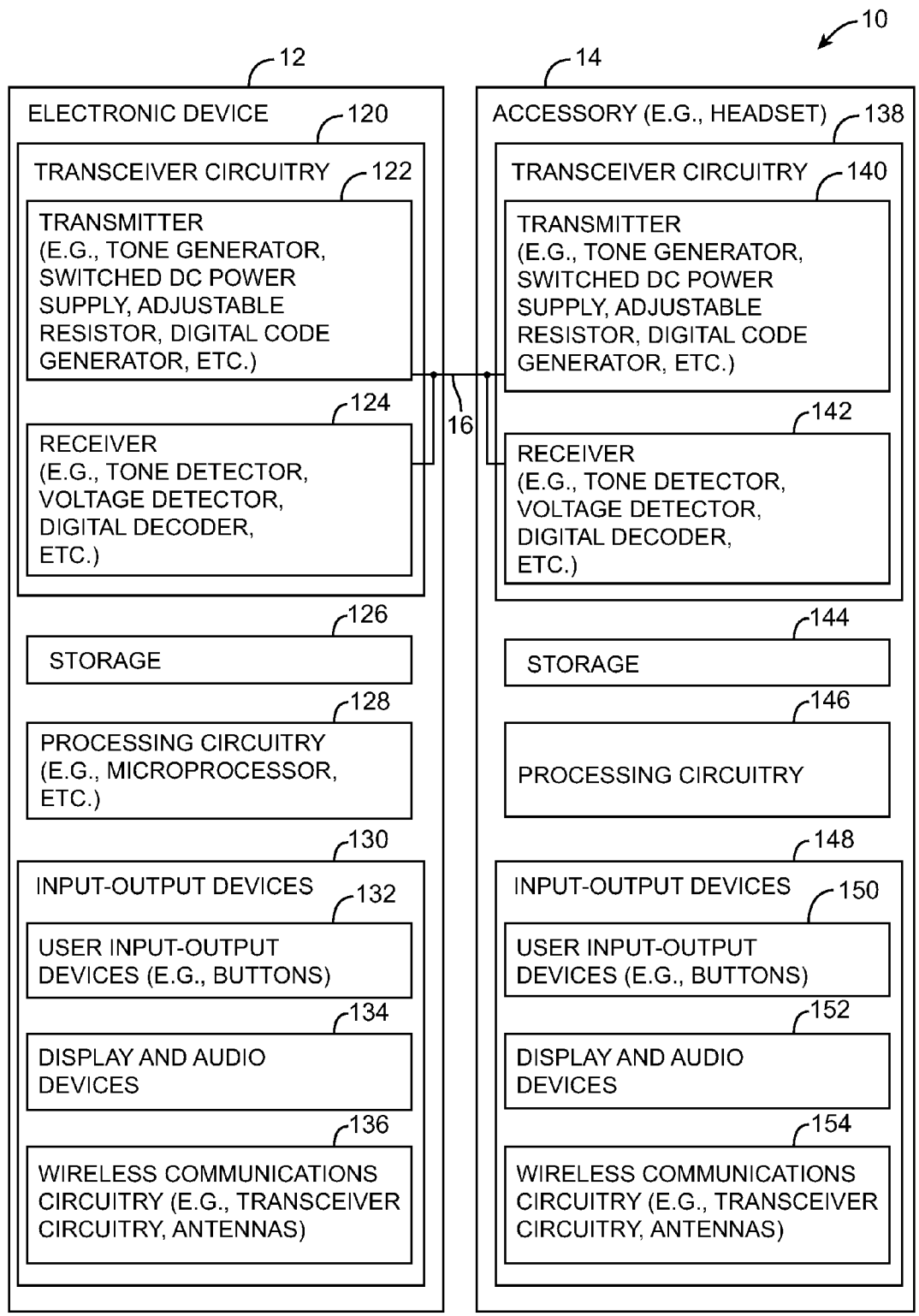
FIG. 7 is a schematic diagram showing illustrative circuitry that may be used in an electronic device and an associated accessory in accordance with embodiments of the present invention.

A generalized diagram of an illustrative electronic device 12 and accessory 14 is shown in FIG. 7. In the FIG. 7 example, device 12 and accessory 14 are shown as possibly including numerous components for supporting communications and processing functions. If desired, some of these components may be omitted, thereby reducing device cost and complexity. The inclusion of these components in the schematic diagram of FIG. 7 is merely illustrative.

Device 12 may be, for example, a computer or handheld electronic device that supports cellular telephone and data functions, global positioning system capabilities, and local wireless communications capabilities (e.g., IEEE 802.11 and Bluetooth®) and that supports handheld computing device functions such as internet browsing, email and calendar functions, games, music player functionality, etc. Accessory 14 may be, for example, a headset with or without a microphone, a set of stand-alone speakers, audio-visual equipment, an adapter (e.g., an adapter such as adapter 112 of FIG. 6), an external controller (e.g., a keypad), or any other suitable device that may be connected to device 12. Path 16 may include audio connectors such as connectors 46 of FIG. 4 or other suitable connectors.

As shown in FIG. 7, device 12 and accessory 14 may include storage 126 and 144. Storage 126 and 144 may include one or more different types of storage such as hard disk drive storage, nonvolatile memory (e.g., flash memory or other electrically-programmable-read-only memory), volatile memory (e.g., static or dynamic random-access-memory), etc.

Processing circuitry 128 and 146 may be used to control the operation of device 12 and accessory 14. Processing circuitry 128 and 146 may be based on processors such as microprocessors and other suitable integrated circuits. These circuits may include application-specific integrated circuits, audio codecs, video codecs, amplifiers, communications interfaces, power management units, power supply circuits, circuits that control the operation of wireless circuitry, radio-frequency amplifiers, digital signal processors, analog-to-digital converters, digital-to-analog converters, or any other suitable circuitry.

With one suitable arrangement, processing circuitry 128 and 146 and storage 126 and 144 are used to run software on device 12 and accessory 14. The complexity of the applications that are implemented depends on the needs of the designer of system 10. For example, the software may support complex functionality such as internet browsing applications, voice-over-internet-protocol (VOIP) telephone call applications, email applications, media playback applications, operating system functions, and less complex functionality such as the functionality involved in encoding button presses as ultrasonic tones. To support communications over path 16 and to support communications with external equipment such as equipment 18 and 20 of FIG. 1, processing circuitry 128 and 146 and storage 126 and 144 may be used in implementing suitable communications protocols. Communications protocols that may be implemented using processing circuitry 128 and 146 and storage 126 and 144 include internet protocols, wireless local area network protocols (e.g., IEEE 802.11 protocols—sometimes referred to as Wi-Fi®), protocols for other short-range wireless communications links such as the Bluetooth® protocol, protocols for handling 3G communications services (e.g., using wide band code division multiple access techniques), 2G cellular telephone communications protocols, serial and parallel bus protocols, etc. In a typical arrangement, more complex functions such as wireless functions are implemented exclusively or primarily on device 12 rather than accessory 14, but accessory 14 may also be provided with some or all of these capabilities if desired.

Input-output devices 130 and 148 may be used to allow data to be supplied to device 12 and accessory 14 and may be used to allow data to be provided from device 12 and accessory 14 to external destinations. Input-output devices 130 and 148 can include devices such as non-touch displays and touch displays (e.g., based on capacitive touch or resistive touch technologies as examples). Visual information may also be displayed using light-emitting diodes and other lights. Input-output devices 130 and 148 may include one or more buttons. Buttons and button-like devices may include keys, keypads, momentary switches, sliding actuators, rocker switches, click wheels, scrolling controllers, knobs, joysticks, D-pads (direction pads), touch pads, touch sliders, touch buttons, and other suitable user-actuated control interfaces. Input-output devices 130 and 148 may also include microphones, speakers, digital and analog input-output port connectors and associated circuits, cameras, etc. Wireless circuitry in input-output devices 130 and 148 may be used to receive and/or transmit wireless signals.

As shown schematically in FIG. 7, input-output devices 130 may sometimes be categorized as including user input-output devices 132 and 150, display and audio devices 134 and 152, and wireless communications circuitry 136 and 154. A user may, for example, enter user input by supplying commands through user input devices 132 and 150. Display and audio devices 134 and 152 may be used to present visual and sound output to the user. These categories need not be mutually exclusive. For example, a user may supply input using a touch screen that is being used to supply visual output data.

As indicated in FIG. 7, wireless communications circuitry 136 and 154 may include antennas and associated radio-frequency transceiver circuitry. For example, wireless communications circuitry 136 and 154 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

The antenna structures and wireless communications devices of devices 12 and accessory 14 may support communications over any suitable wireless communications bands. For example, wireless communications circuitry 136 and 154 may be used to cover communications frequency bands such as cellular telephone voice and data bands at 850 MHz, 900 MHz, 1800 MHz, 1900 MHz, and 2100 MHz (as examples). Wireless communications circuitry 136 and 154 may also be used to handle the Wi-Fi® (IEEE 802.11) bands at 2.4 GHz and 5.0 GHz (also sometimes referred to as wireless local area network or WLAN bands), the Bluetooth® band at 2.4 GHz, and the global positioning system (GPS) band at 1575 MHz.

Although both device 12 and accessory 14 are depicted as containing wireless communications circuitry in the FIG. 7 example, there are situations in which it may be desirable to omit such capabilities from device 12 and/or accessory 14. For example, it may be desired to power accessory 14 solely with a low-capacity battery or solely with power received through path 16 from device 12. In situations such as these, the use of extensive wireless communications circuitry may result in undesirably large amounts of power consumption. For low-power applications and situations in which low cost and weight are of primary concern, it may therefore be desirable to limit accessory 14 to low-power consumption wireless circuitry (e.g., infrared communications) or to omit wireless circuitry from accessory 14. Moreover, not all devices 12 may require the use of extensive wireless communications capabilities. A hybrid cellular telephone and media player device may benefit from wireless capabilities, but a highly portable media player may not require wireless capabilities and such capabilities may be omitted to conserve cost and weight if desired.

Transceiver circuitry 120 and 138 may be used to support communications between electronic device 12 and accessory 14 over path 16. In general, both device 12 and accessory 14 may include transmitters and receivers. For example, device 12 may include a transmitter that produces signal information that is received by receiver 142 in accessory 14. Similarly, accessory 14 may have a transmitter 140 that produces data that is received by receiver 124 in device 12. If desired, transmitters 122 and 140 may include similar circuitry. For example, both transmitter 122 and transmitter 140 may include ultrasonic tone generation circuitry (as an example). Receivers 124 and 142 may each have corresponding tone detection circuitry. Transmitters 122 and 140 may also each have DC power supply circuitry for creating various bias voltages, digital communications circuitry for transmitting digital data, or other suitable transmitter circuitry, whereas receivers 124 and 142 may have corresponding receiver circuitry such as voltage detector circuitry, digital receivers, etc. Symmetric configurations such as these may allow comparable amounts of information to be passed in both directions over link 16, which may be useful when accessory 14 needs to present extensive information to the user through input-output devices 148 or when extensive handshaking operations are desired (e.g., to support advanced security functionality).

It is not, however, generally necessary for both device 12 and accessory 14 to have identical transmitter and receiver circuitry. Device 12 may, for example, be larger than accessory 14 and may have available on-board power in the form of a rechargeable battery, whereas accessory 14 may be unpowered (and receiving power only from device 12) or may have only a small battery (for use alone or in combination with power received from device 12). In situations such as these, it may be desirable to provide device 12 and accessory 14 with different communications circuitry.

As an example, transmitter 122 in device 12 may include adjustable DC power supply circuitry. By placing different DC voltages on the lines of path 16 at different times, device 12 can communicate relatively modest amounts of data to accessory 14. This data may include, for example, data that instructs accessory 14 to power its microphone (if available) or to respond with an acknowledgement signal. A voltage detector and associated circuitry in receiver 138 of accessory 14 may process the DC bias voltages that are received from device 12. In this type of scenario, transmitter 140 in accessory 14 may include an ultrasonic tone generator that supplies acknowledgement signals and user input data (e.g., button press data) to device 12. A tone detector in receiver 124 may decode the tone signals for device 12.

Applications running on the processing circuitry of device 12 may use the decoded user input data as control signals. As an example, a cellular telephone application may interpret the user input as commands to answer or hang up a cellular telephone call, a media playback application may interpret the user input as commands to skip a track, to pause, play, fast-forward, or rewind a media file, etc. Still other applications may interpret user button-press data or other user input as commands for making menu selection, etc.

Figure 8:
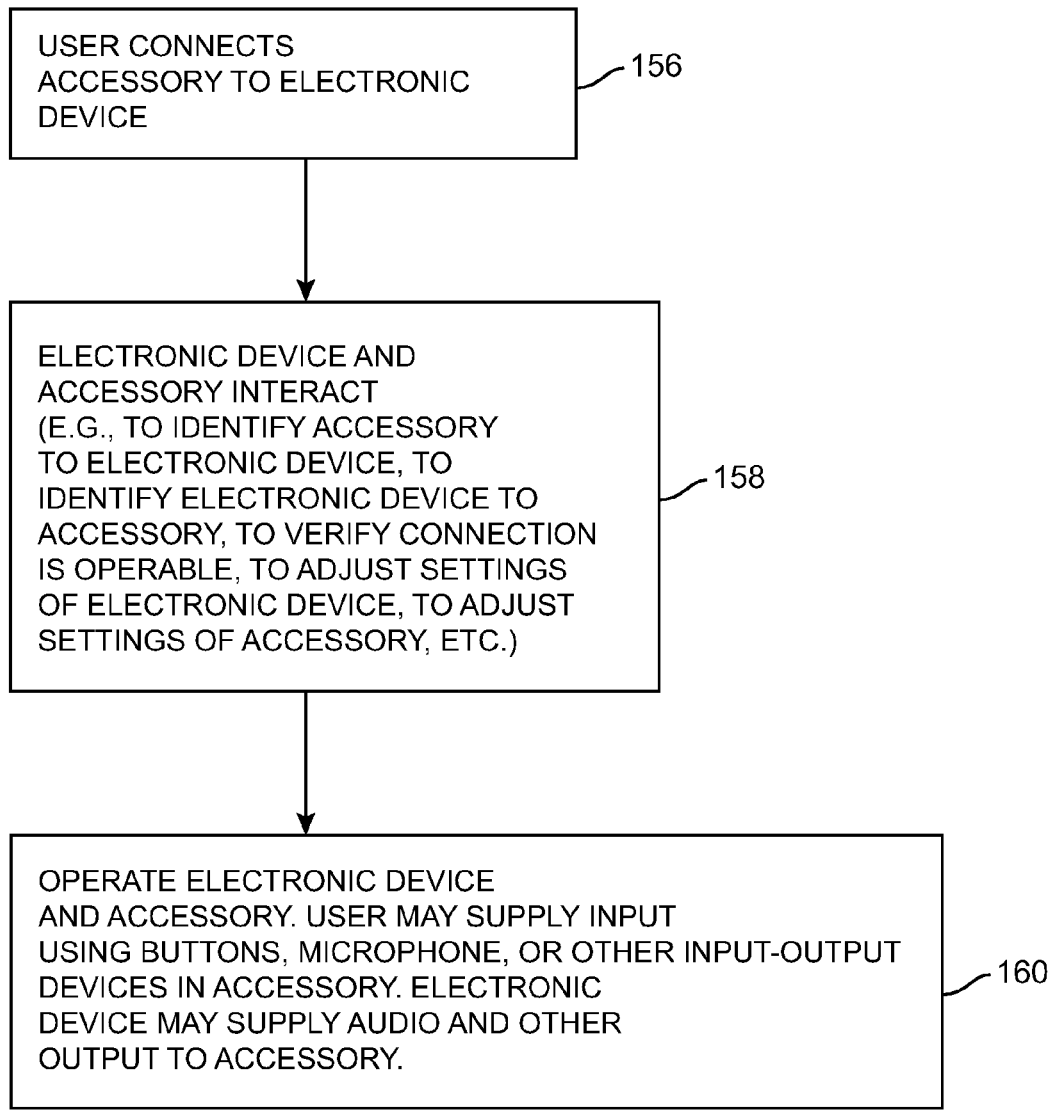
FIG. 8 is a flow chart of illustrative steps involved in using an electronic device and accessory in accordance with an embodiment of the present invention.

Illustrative steps involved in using electronic device 12 and accessory 14 are shown in FIG. 8. At step 156, a user may connect accessory 14 to device 12. For example, a user may insert a male audio connector such as one of the audio plugs of FIG. 4 into a mating female connector in device 12 such as one of the audio jacks in FIG. 4. (If an adapter such as adapter 112 of FIG. 6 is being used, the user plugs adapter 112 into device 12 and plugs accessory 14 into adapter 112.) The process of attaching accessory 14 to device 12 involves creating a wired path (e.g., path 16) in which contacts in the audio connector of the accessory mate with corresponding contacts in the audio connector of the device and thereby connect the conductive lines of path 16 between device 12 and accessory 14.

Once device 12 and accessory 14 have been electrically interconnected in this way, the electronic device and the accessory may interact at step 158. In general, the interactions of step 158 may include transmission and reception by device 12 and accessory 14 of any suitable signals (e.g., using the transceiver circuitry 120 and 138 of FIG. 7). In one suitable arrangement, device 12 supplies various DC bias voltages to accessory 14 over the microphone line and the ground line. In response accessory may transmit an ultrasonic acknowledgement tone. If desired, information on the identity of the accessory 14 (e.g., its type, serial number, part number, associated user identity, or other suitable information) may be conveyed to device 12 by encoding information in ultrasonic tones. The point in the biasing process at which an ultrasonic tone is conveyed to device 12 may also be used as an indicator of accessory identity information or other suitable information. If desired, device 12 and accessory 14 may be prevented from operating together until suitable handshaking or security authentication criteria have been satisfied.

Device 12 may, in response to information received from accessory 14, or in response to the needs of an application running on device 12, make bias voltage adjustments after accessory 14 has been identified or proper operation confirmed. Such bias voltage adjustments may, for example, be used to place accessory 14 and device 12 in one or more desired modes of operation. These modes may include, for example, a tone mode in which user input is conveyed using ultrasonic tones and a resistance detection mode in which user input is conveyed using a resistively encoded button actuation arrangement.

Once device 12 has completed all desired start-up operations (e.g., accessory discovery, confirmation operations, authentication, etc.), processing may proceed to step 160. During the operations of step 160, a user may operate device 12 and accessory 14 in a normal user mode of operation. At this time, the user may supply input to accessory 14 using input-output devices 148. As an example, the user may press or otherwise actuate a button or other switch, the user may press an appropriate portion of a touch screen or touch-sensitive button, the user may actuate a joystick, or may make any other user input. This user input may be transmitted to device 12 and received by transceiver circuitry 120. At the same time, if accessory 14 has a microphone, sound input may be gathered and conveyed to device 12 over path 16 (e.g., over the microphone and ground lines). A corresponding microphone amplifier in processing circuitry 128 may be used to receive this audio signal. Device 12 may also supply output to the user. For example, device 12 may play audio signals through speakers in accessory 14 using speaker lines (and the associated ground line) in path 16. Other output (e.g., video, status information, etc.) may also be conveyed to the user and presented using input-output devices 148.

During the operations of step 160, the mode of operation of device 12 and accessory 14 may change. For example, if a user switches between using a telephone application (in which a microphone is required to capture the user's voice) to a media playback operation (in which the microphone is not used), device 12 and accessory 14 may switch from a tone mode (in which user input is conveyed as ultrasonic tones from accessory 14 to device 12) to a resistance detection mode (in which device 12 monitors the resistance of a resistor network associated with buttons on accessory 14 to determine which buttons are pressed). There may be advantages to using one mode over the other. For example, one mode of operation (e.g., the resistance detection mode) may consume less power or may be compatible with a wider range of accessories 14. Mode adjustments may be made when different applications are launched on device 12, when a given application exercises a different set of features, or at any other suitable time. In some situations, different operating modes may be invoked when a user removes an accessory of one type and connects an accessory of a different type.

If desired, each different type of device 12 may be configured to operate properly with only a particular corresponding type of accessory. More generally, it can be advantageous to allow various devices and accessories to operate with one another. In environments such as these, the functionality that is available to the user may vary depending on which capabilities are available in the device and accessory.

Figure 9:
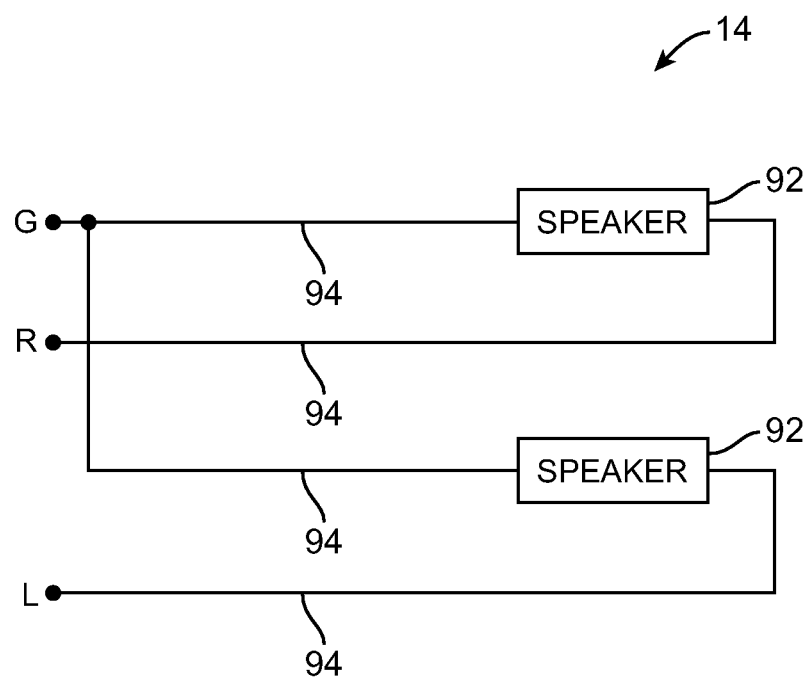
FIG. 9 is a circuit diagram of an illustrative accessory such as a headset having two speakers in accordance with an embodiment of the present invention.

A basic accessory is shown in FIG. 9. In the example of FIG. 9, accessory 14 has two speakers 92. Accessory 14 of FIG. 9 may be, for example, a stereo headset of a set of accessory speakers. Conductive lines 94 may be used to connect speakers 92 to left and right terminals L and R and ground terminal G. These terminals may be associated with appropriate contacts in a plug such as plug 36 of FIG. 4. Because the illustrative accessory of FIG. 9 does not contain a microphone or buttons, the user of this accessory is only able to receive audio and is not able to supply audio or button press information.

Figure 10:
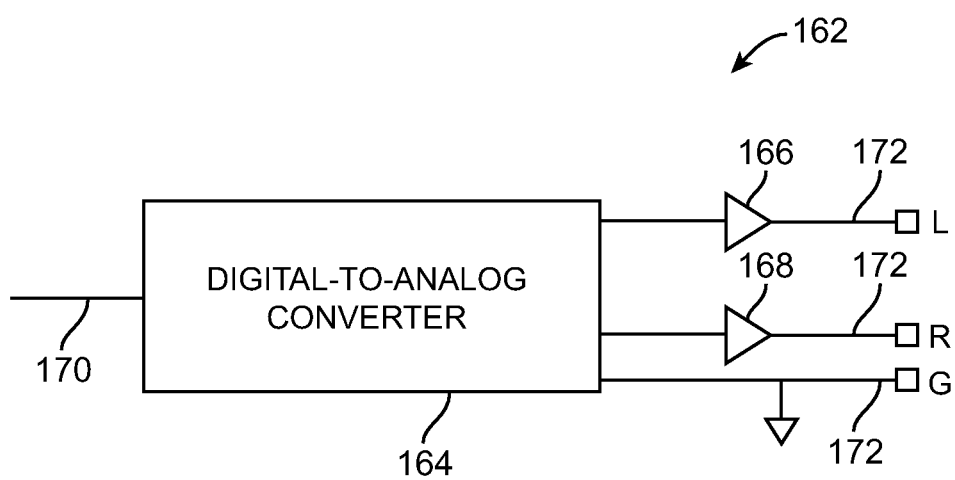
FIG. 10 is a circuit diagram showing illustrative circuitry that may be used to drive audio signals from an electronic device onto associated speaker paths in an accessory such as a headset in accordance with an embodiment of the present invention.

Corresponding circuitry 162 that may be used in device 12 to supply audio signals to speakers 92 of accessory 14 of FIG. 9 is shown in FIG. 10. As shown in FIG. 10, circuitry 162, which may be part of processing circuitry 128 of FIG. 7, may have digital-to-analog converter 164 and amplifiers 166 and 168. Digital-to-analog converter circuitry 164 may receive digital input from a processor using digital input 170 and may supply corresponding analog audio signals to terminals L, R, and G using amplifiers 166 and 168 and lines 172. Terminals L, R, and G may be associated with contacts in an audio connector as described in connection with FIG. 4.

Circuitry such as circuitry 162 may be used in device 12 whenever it is desired to provide speakers in accessory 14 with audio signals. In complex devices 12, additional circuitry may be used (e.g., to gather microphone signals and user input signals corresponding to button actuation events from an appropriate accessory 14). In simpler devices 12, some or all of this additional circuitry may be omitted.

Figure 11:
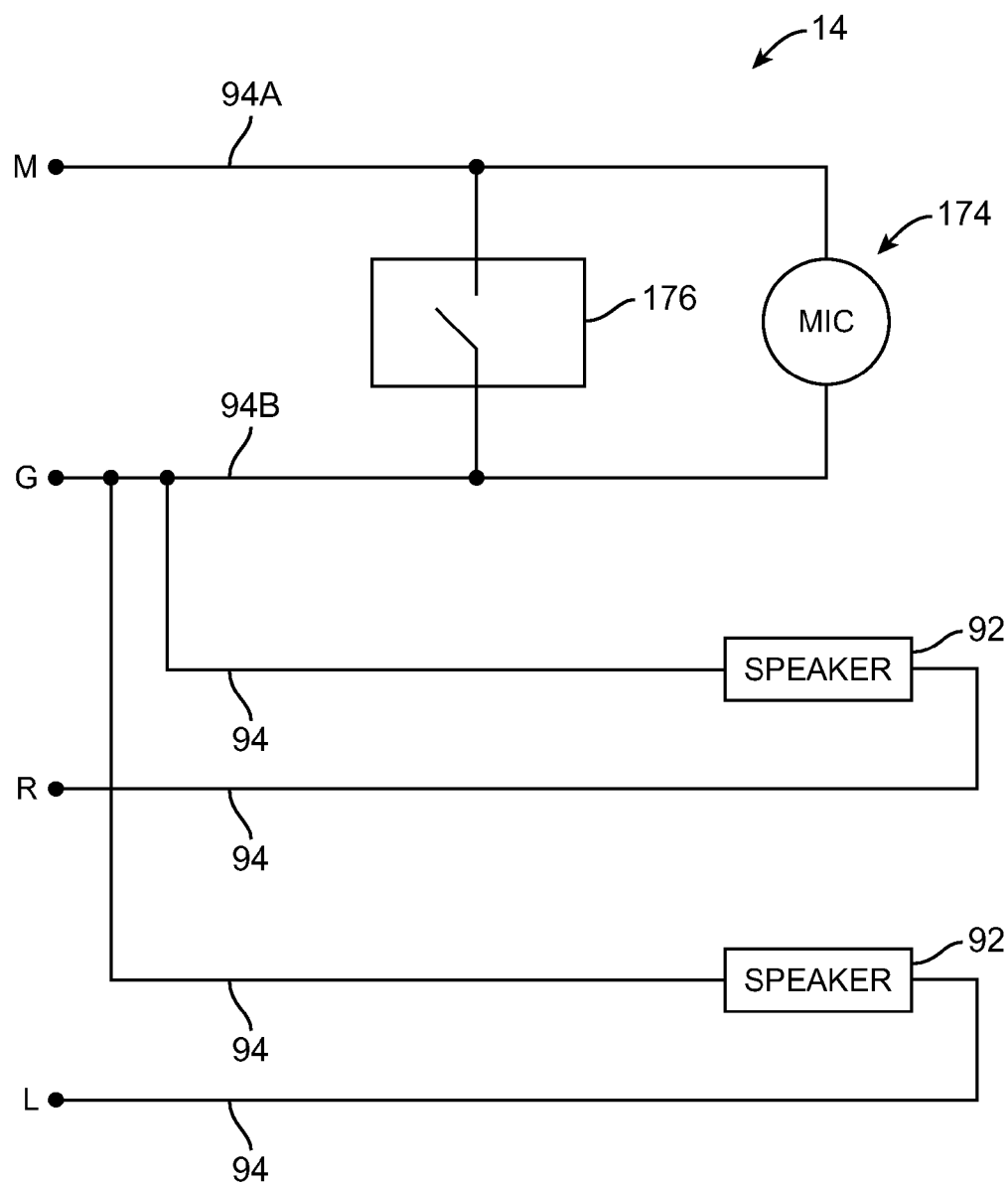
FIG. 11 is a circuit diagram of an illustrative accessory such as a headset having two speakers, a microphone, and a switch associated with a button in accordance with an embodiment of the present invention.

FIG. 11 is a circuit diagram of an illustrative configuration for accessory 14 that includes a microphone. As shown in FIG. 11, lines 94 may be used to connect terminals M, G, R, and L to speakers 92, microphone 174, and switch 176. Switch 176 may be associated with a user-actuated button. Line 94A is connected to microphone terminal M and may therefore sometimes be referred to as a microphone line. Line 94B is connected to ground terminal G and may be referred to as a ground line. With the arrangement of FIG. 11, audio signals may be driven onto the left speaker using the L and G terminals and may be driven onto the right speaker using the R and G terminals. Microphone signals (e.g., the user's voice or other audio input) may be conveyed to terminals M and G from microphone 174 using lines 94A and 94B. When a user actuates switch 176, lines 94A and 94B may be momentarily electrically connected to each other. This creates a low-impedance path from terminal M to terminal G that bypasses microphone 174. If microphone 174 is in use during the button actuation event, a click or pop may arise on the microphone line due to current surges associated with the momentary short. The presence of the momentary short may be detected using circuitry in device 12, which may then take appropriate action.

Figure 12:
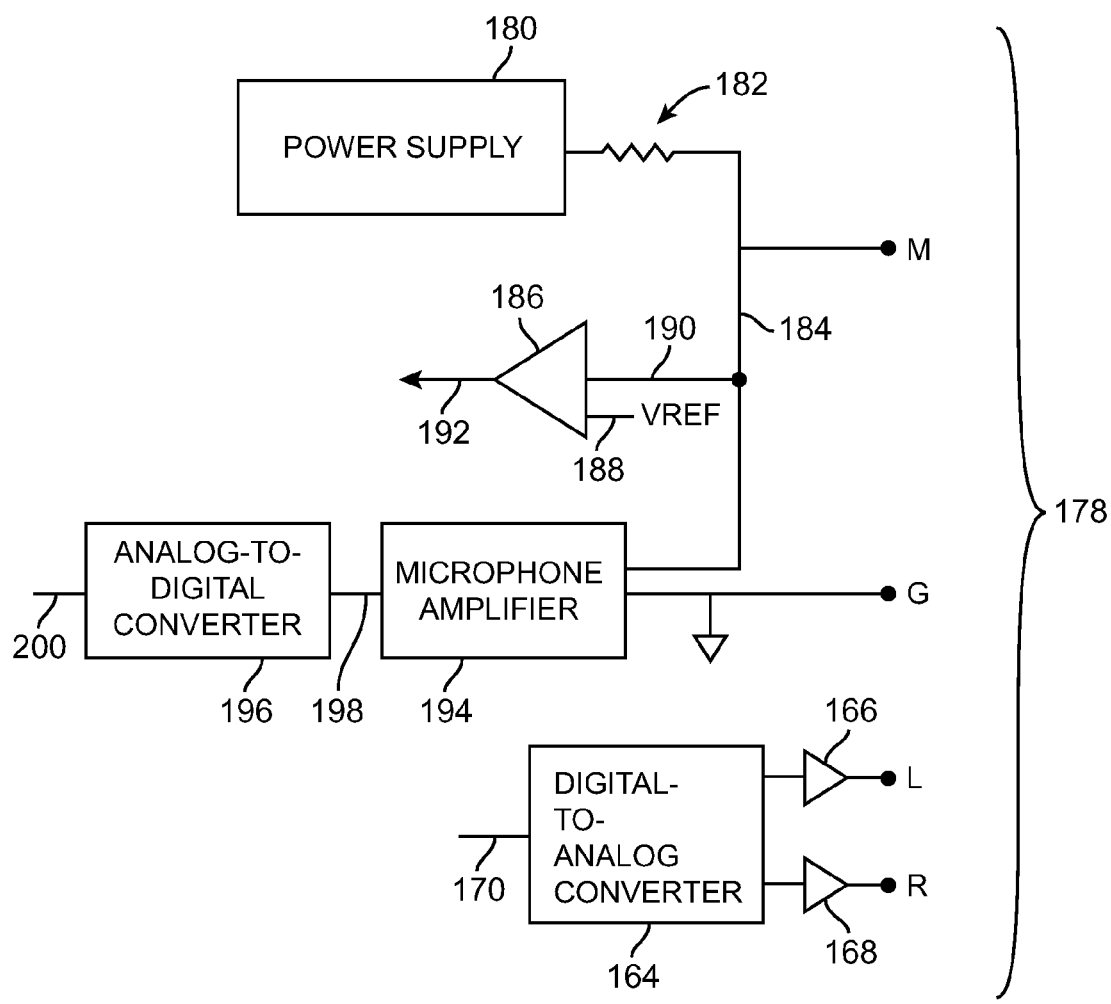
FIG. 12 is a circuit diagram showing illustrative circuitry that may be used to handle microphone signals and control signals received from an accessory such as the headset of FIG. 11 and that may be used to drive audio signals onto associated speaker paths in the accessory in accordance with an embodiment of the present invention.

Illustrative circuitry 178 that may be used in device 12 when interfacing with an accessory of the type shown in FIG. 11 is shown in FIG. 12. Circuitry 178 may be, for example, part of processing circuitry 128 of FIG. 7. As shown in FIG. 12, circuitry 178 may include a power supply 180. Power supply 180 may be a fixed or adjustable power supply and may impose a bias voltage on line 184 via resistor 182 (which may serves as a microphone signal load resistor). This bias voltage may be placed across the microphone terminal M and ground terminal G, thereby biasing microphone line 94A relative to ground line 94B in a corresponding accessory such as accessory 14 of FIG. 11. When a user shorts lines 94A and 94B in an accessory such as accessory 14 of FIG. 11, the M and G terminals in circuitry 178 will likewise be shorted together. The lack of any appreciable voltage drop across terminals M and G can be detected using comparator 186. Comparator 186 may have a first input such as input 190 that is connected to microphone terminal M in circuitry 178 via line 184 and may have a second input such as input 188 that receives a reference voltage VREF (e.g., 200 mV). Whenever the difference in voltage between the M and G terminals falls below VREF, comparator 186 may adjust its output voltage on output 192 (e.g., by taking a logic low signal on output 192 to a logic high signal or vice versa). This change in the output of comparator 186 may be processed by downstream processing circuitry in device 12 (e.g., to instruct device 12 to take an appropriate action in an applicable software application).

Microphone amplifier 194 in circuitry 178 of FIG. 12 may be used to amplify microphone signals in normal operation (i.e., when switch 176 of FIG. 11 is not closed). These signals may be received over path 16 from accessory 14 using the amplified microphone terminal M and ground terminal G. A corresponding amplified microphone audio signal may be supplied to analog-to-digital converter 196 over path 198. Analog-to-digital converter 196 may digitize the analog microphone signal. A corresponding digitized version of the microphone signal may be supplied on output path 200 for subsequent processing (e.g., for wireless transmission to a remote location as part of a cellular telephone call, etc.). Digital-to-analog converter 164 may be used to convert digital audio signals to analog audio signals that are driven onto left and right speaker terminals L and R by amplifiers 166 and 168. If desired, the components of circuitry 178 may be integrated onto one or more integrated circuits. For example, microphone amplifier 194 may be provided as part of the same integrated circuit as analog-to-digital converter 196 (as an example). As another example, digital-to-analog converter 164 and analog-to-digital converter 196 may be supplied as part of the same integrated circuit. Other configurations may also be used (e.g., in which all of circuitry 178 is included on a single chip).

Figure 13:
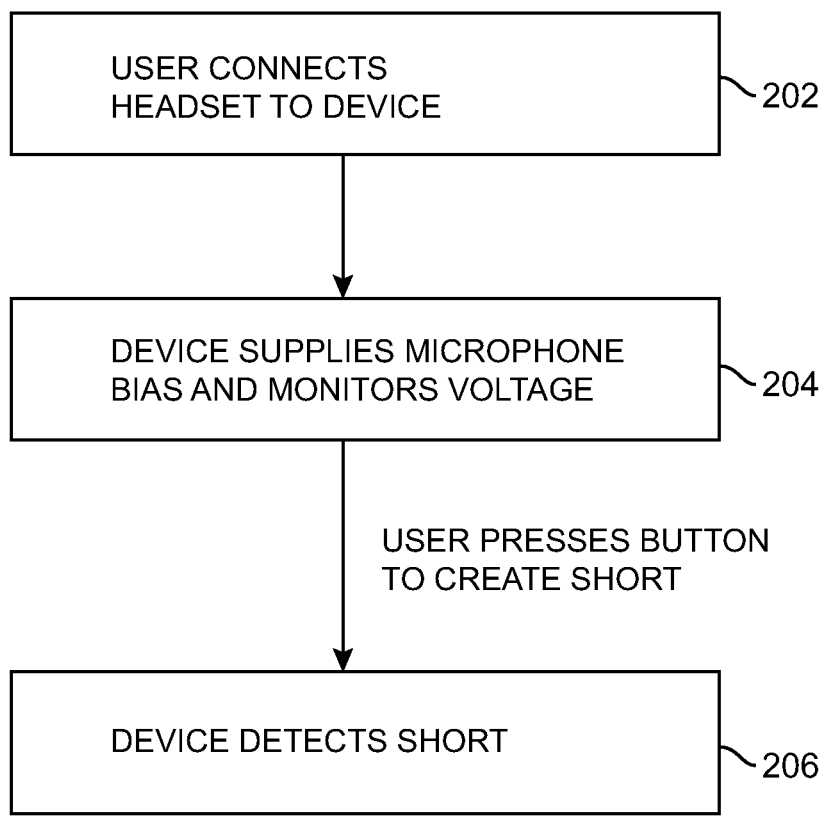
FIG. 13 is a flow chart of illustrative steps involved in using an electronic device and accessory such as a headset with a microphone and associated button in accordance with an embodiment of the present invention.

A flow chart of illustrative operations involved in processing user input gathered using a button such as button 176 in an accessory of the type shown in FIG. 11 is shown in FIG. 13. At step 202, a user may connect the headset or other accessory to device 12. At step 204, when contact is made between the mating terminals of the female and male portions of the audio connector, electronic device 12 may bias microphone line 94A in accessory 14. For example, microphone line 94A may be raise to a voltage of 2.7 volts above ground line 94B. This bias may supply microphone 174 with power and may make it possible for device 12 to detect shorts between lines 94A and 94B that result from actuation of button 176.

When a user actuates button 176, terminals M and G in device circuitry such as circuitry 178 of FIG. 12 are shorted together. When this change is detected (at step 206), the state of output 192 is adjusted by comparator 186. Because the output of comparator 186 is reflective of the occurrence of a button actuation event, processing circuitry in device 12 can conclude that button 176 has been pressed and may take appropriate action.

If desired, more than one user-actuated button may be provided in accessory 14. To distinguish between actuation events that involve different buttons, each button may generate a different resulting signal. The different signals may be different digital codes, different analog signals, etc. At device 12, the signals that are generated by a given button actuation event may be processed to determine which button was pressed (and for how long). Device 12 may then take appropriate action.

With one suitable arrangement, buttons (or other user input interface devices) may use a resistive-encoding scheme. With this type of arrangement, actuation of different buttons results in different resistance values within an appropriate portion of the circuitry of accessory 14. As an example, consider the arrangement of FIG. 14. In the FIG. 14 example, accessory 14 has speakers 92, but no microphone (as an example). Buttons in accessory 14 control corresponding switches. For example, a first button may control switch 176 and second, third, and fourth buttons may control respective switches 210. The buttons may have a mechanical lock-out feature that allows only a single button or other suitable number of buttons to be pressed simultaneously or device 12 may analyze simultaneous button presses based on known rules (e.g., by accepting only the button that is pressed first, by associating particular actions with particular combinations of button presses, etc.). In a typical arrangement, only a single button is pressed at a time.

When a button is actuated, the configuration of the resistor network formed by resistors 208 changes. As a result, the resistance between terminals M and G (or other suitable audio connector terminals in accessory 14) changes. The resulting resistance between terminals M and G can be measured and acted upon by device 12.

Figure 14:
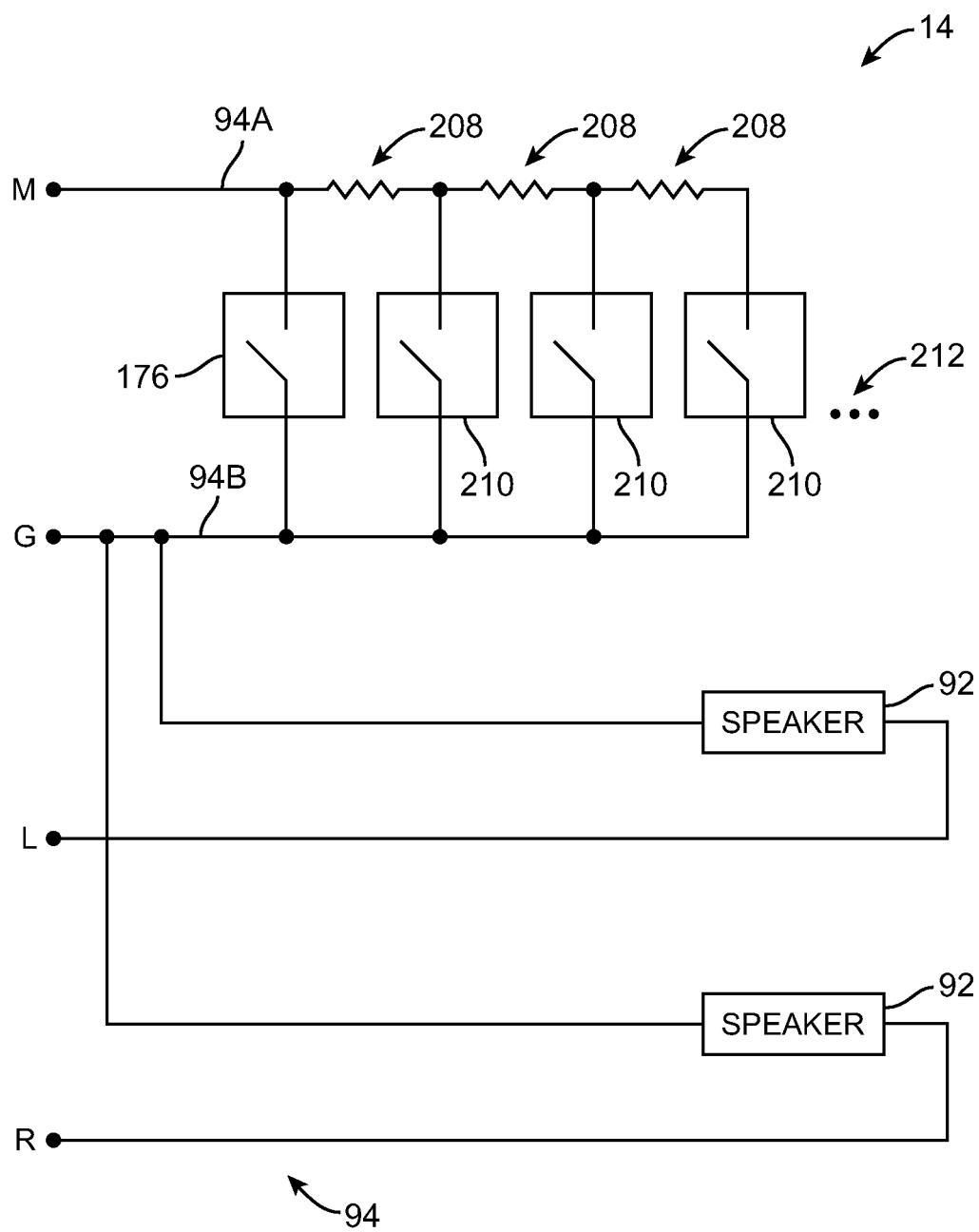
FIG. 14 is a circuit diagram of an illustrative accessory such as headset that may have one or more buttons or other user interface equipment for producing encoded resistance values that are processed by an associated electronic device that has resistance detection capabilities in accordance with an embodiment of the present invention.

Schemes of the type shown in FIG. 14 in which buttons are associated with various resistors are said to use resistance encoding. With resistively encoded button arrangements, device 12 can determine which buttons are actuated by analyzing the resistance across terminals M and G. If, for example, the leftmost switch 210 in FIG. 14 is closed, the leftmost resistor 208 will be switched into place. If the middle switch 210 is closed, the leftmost and middle resistors 208 will be switched into place. Closing the rightmost switch 210 will switch all three of the FIG. 14 resistors into place. Resistors 208 may all have the same resistance or may have different resistances, provided that the resulting resistor network allows device 12 to discriminate between different button presses.

In the FIG. 14 example, button 176 is of the "shorting" variety described in connection with FIG. 11. This type of button may be included in the resistive network formed by resistors 208 if desired. Device 12 can discriminate between actuation of button 176 and actuation of buttons 210, because only actuation of button 176 will result in a short circuit between terminals M and G. Button 176 is optional. Moreover, any suitable number of resistively encoded buttons such as buttons 210 may be provided if desired. The example of FIG. 14 includes three buttons, but, as indicated by dots 212, more than three resistively encoded buttons may be included in accessory 14 if desired. Arrangements with fewer resistively encoded buttons may also be used.

Figure 15:
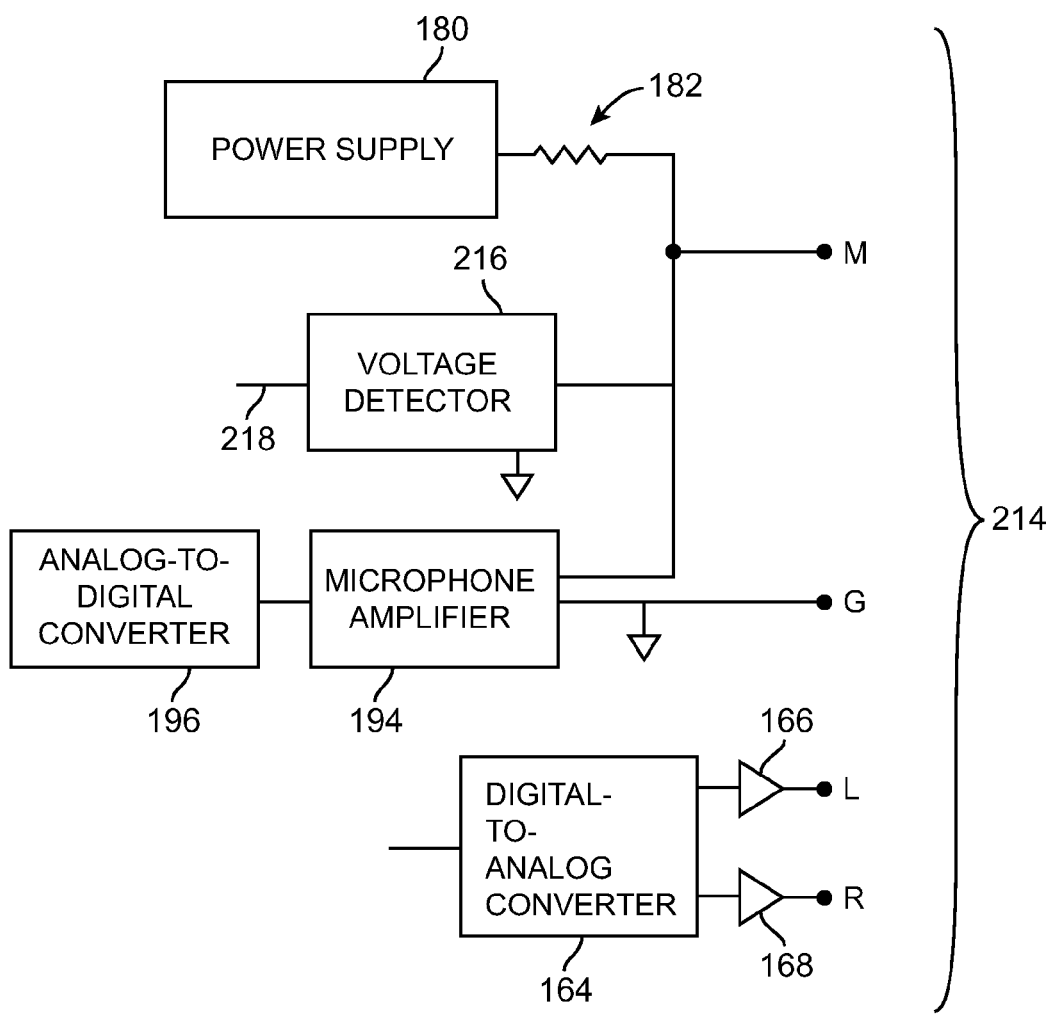
FIG. 15 is a circuit diagram of illustrative circuitry that may be used in an electronic device to provide audio signals to speakers in an accessory such as a headset and that may be used to implement resistance detection capabilities for decoding resistively encoded user input such as button actuation events made using buttons in an accessory of the type shown in FIG. 14 in accordance with an embodiment of the present invention.

When accessory 14 has resistively encoded switches, device 12 may be provided with circuitry such as circuitry 214 of FIG. 15. When it is desired to determine which resistively encoded switch has been actuated by a user, circuitry 214 may use power supply 180 to supply a known bias voltage across terminals M and G. The bias voltage may, for example, be supplied through resistor 182. The known bias voltage across the M and G terminals in device 12 results in a known voltage drop between lines 94A and 94B in FIG. 14. In this type of arrangement, the resistance of resistor 182 and the resistance of the components between lines 94A and 94B form a voltage divider. The voltage drop across terminals M and G in circuitry 214 of FIG. 15 will change depending on the resistance produced between lines 94A and 94B by buttons 210 and their associated resistors.

Voltage detector 216 may monitor the resulting voltage on terminal M relative to ground terminal G and may produce corresponding digital output signals on output 218 for processing by processing circuitry on device 12. When the voltage drop across the M and G terminals is high, device 12 can conclude that no buttons have been depressed. When the voltage drop measured by voltage detector 216 is zero or close to zero, device 12 may conclude that switch 176 has been pressed (if such a switch is used). Intermediate values of voltage can be correlated with particular switch actuation patterns in resistively encoded switches 210.

Figure 16:
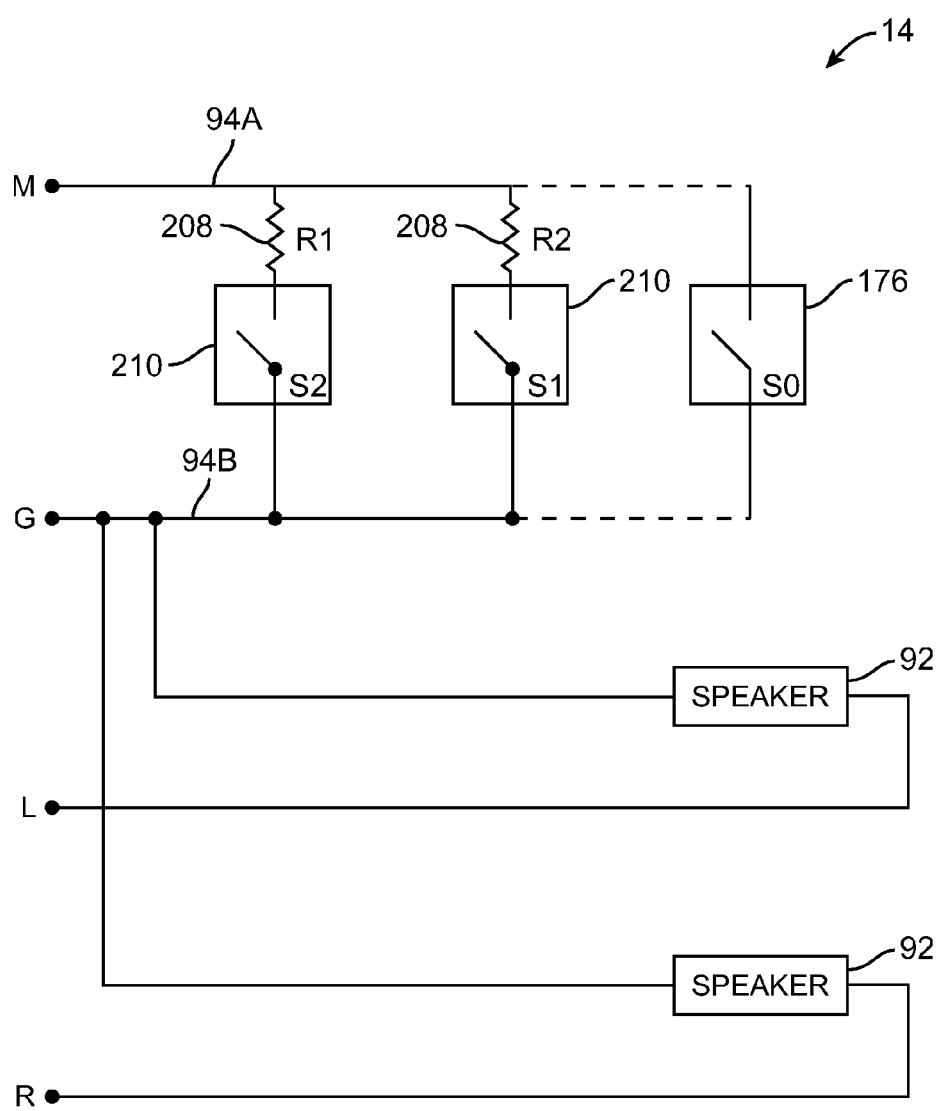
FIG. 16 is a circuit diagram of an illustrative accessory such as a headset having resistively encoded buttons and an optional button that shorts two contacts in a four-contact audio connector together when the optional button is actuated in accordance with an embodiment of the present invention.

In the FIG. 14 arrangement, resistors 208 are connected along line 94A and each switch 210 is connected along this resistive ladder at a respective tap point. This is merely an illustrative example of a suitable resistor network that may be used for resistively encoding switches in accessory 14. Another illustrative arrangement is shown in FIG. 16. In the FIG. 16 example, each resistively encoded switch 210 has a respective series-connected resistor 208. The resistance values of resistors 208 in arrangements of the type shown in FIG. 16 are preferably each different, allowing discrimination between switches. If the user presses the first switch, the resistance between lines 94A and 94B will be resistance R1, if the user presses the second switch, the resistance will be equal to R2, and if the user presses the third switch, the resistance will be R3. An optional shorting switch such as switch 176 may be connected in parallel with resistively encoded switches 210 if desired. The resistance value resulting from user actuation of desired switches 210 in accessory 14 of FIG. 16 may be measured using any suitable resistance measuring circuitry such as the biasing power supply and voltage detector circuits of FIG. 15.

Figure 17:
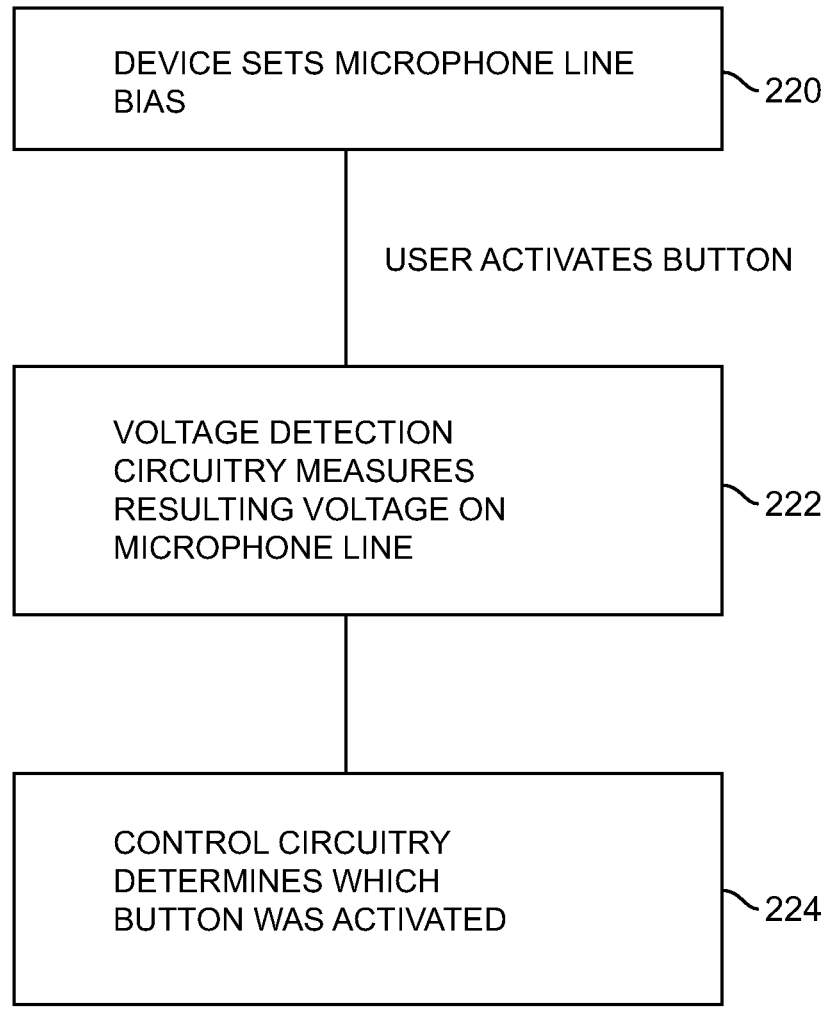
FIG. 17 is a flow chart of illustrative steps involved in decoding resistively encoded button actuation events or other user control events supplied by a user with an accessory such as a headset in accordance with an embodiment of the present invention.

A flow chart of illustrative steps involved in using circuitry of the type shown in FIG. 15 to determine which of multiple resistively encoded switches in an accessory such as accessory 14 of FIG. 14 or accessory 14 of FIG. 16 has been pressed is shown in FIG. 17. At step 220, the resistive network associated with the buttons in accessory 14 may be biased using an appropriate bias voltage. The bias voltage may, for example, be generated by power supply 180 in device 12, as described in connection with FIG. 15.

When a user presses a button in the user input interface portion of accessory 14, the resistance bridging a given pair of lines in path 16 such as the microphone and ground lines is altered. In circuits such as circuit 214 of FIG. 15, the bridging resistance between lines 94A and 94B in the accessory forms a voltage divider in combination with the resistance of resistor 182. The fraction of the bias voltage supplied by power supply 180 that falls across terminals M and G in circuit 214 is therefore determined according to Ohm's law and can be measured using voltage detector 216 (step 222). A corresponding digital signal that identifies which button was pressed may be supplied on output line 218 (step 224). Simultaneous button presses can result in different detectable resistances (e.g., intermediate resistance values). Device 12 may respond accordingly (e.g., by taking an appropriate action in response to the set of buttons that is pressed, by ignoring multiple simultaneous button presses, etc.).

Figure 18:
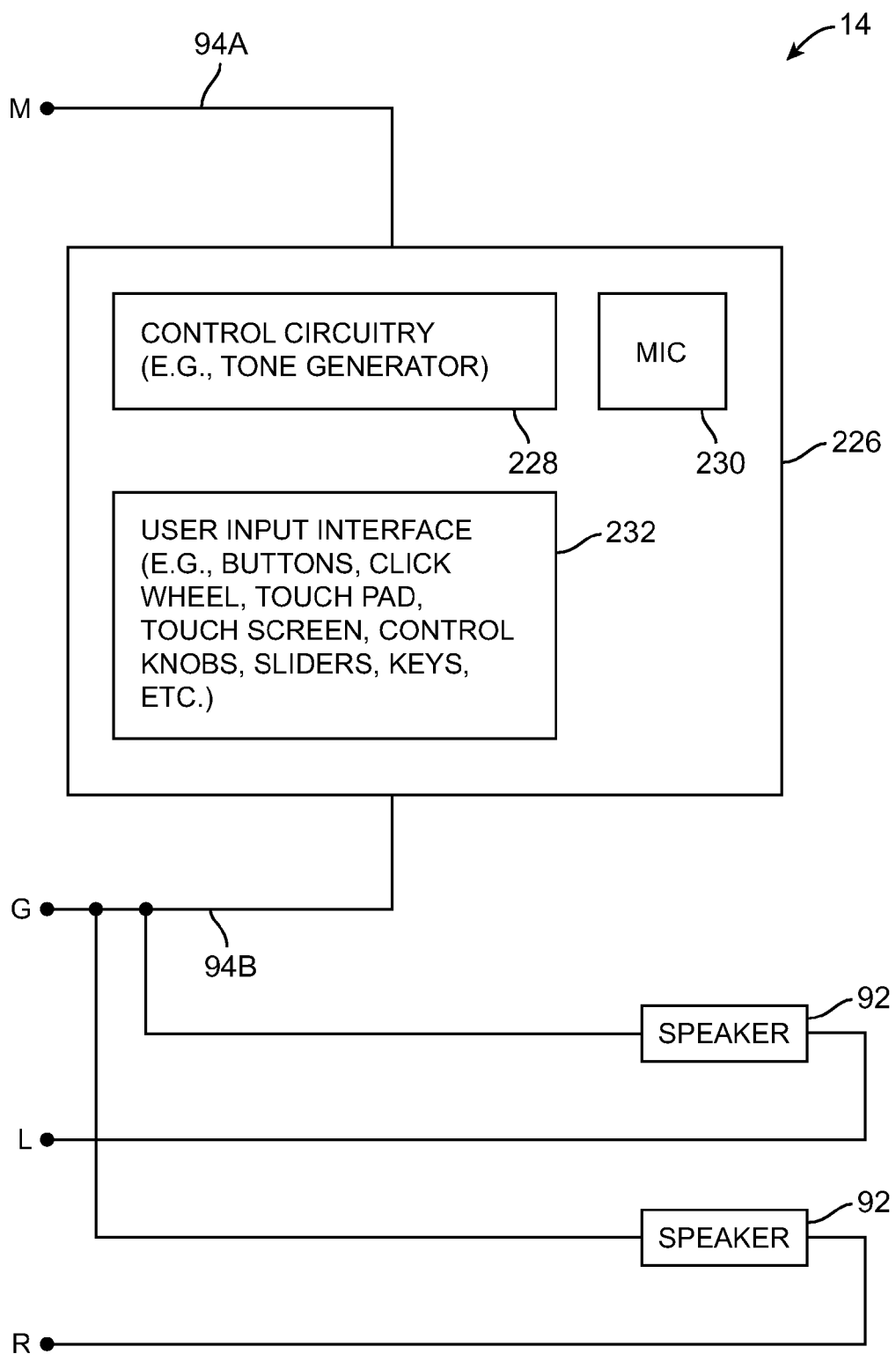
FIG. 18 is a circuit diagram of an illustrative accessory such as a headset in which a user interface gathers user input and in which control circuitry such as tone-generator-based control circuitry assists in conveying the user input to a corresponding electronic device in accordance with an embodiment of the present invention.

The embodiments of accessory 14 illustrated in FIGS. 9, 11, 14, and 16 are merely illustrative. For example, features of these different accessory arrangements may be combined in other topologies if desired. A circuit diagram of a generalized accessory 14 that may be used in system 10 is shown in FIG. 18. In the example of FIG. 18, accessory 14 has been provided with a four-contact audio connector such as jack 34 of FIG. 4, having terminals M, G, L, and R. This is, however, merely illustrative. Accessory 14 may be provided with any suitable connector.

As shown in FIG. 18, accessory 14 may have speakers 92. There may, in general, be no speakers 92, one speaker 92, two speakers 92, or any other suitable number of speakers in a given accessory. Accessories such as headsets typically include two speakers, so accessory 14 is sometimes described herein as including two speakers as an example.

Accessory 14 may also have circuitry 226. Circuitry 226 may include one or more optional microphones such as microphone 230 or other audio transducer equipment. Microphone 230 may be implemented using any suitable powered or unpowered microphone technology. For example, microphone 230 may be an electret microphone or a microphone formed using microelectromechanical systems (MEMS) technology. Microphone 230 may also be based on other suitable arrangements (e.g., dynamic microphones, condenser microphones, piezoelectric microphones, etc.).

User input interface 232 may be used to gather input from a user. In a typical arrangement, user input interface 232 may include buttons. This is, however, merely illustrative. User input interface 232 may include a touch screen, a touch pad, a touch-sensitive button, buttons that make up a portion of a keypad, a joystick, a camera, a proximity sensor, a temperature sensor, an accelerometer, an ambient light sensor, or any other suitable device for gathering input (e.g., input gathered from a user that is associated with a user interaction with accessory 14).

Control circuitry 228 may be used in processing the user input that has been gathered and may be used in transmitting the user input to device 12 over path 16. If, as an example, user input interface 232 includes a touch screen sensor, control circuitry 228 may be used to determine the location on the sensor that has been touched by a user. Control circuitry 228 may then transmit corresponding information to device 12 that indicates the nature of the user's input. As another example, user input interface 232 may include an array of buttons. When a user presses a given button, control circuitry 228 may be used to determine which button has been pressed. Control circuitry 228 may communicate this information to device 12, so that device 12 may take appropriate actions.

With one suitable arrangement, control circuitry 228 may include ultrasonic tone generator circuitry that may be used to transmit user input information to device 12 in the form of ultrasonic tones. This is, however, merely illustrative. Any suitable format may be used for transmitting information on user input to device 12. Moreover, circuitry 226 may, if desired, include circuits of the types described in connection with FIGS. 11, 14, and 16 in which button activity is conveyed to device 12 by momentarily shorting the microphone and ground lines or by using resistively encoded buttons (as examples). In accessories that contain multiple different types of button configurations such as these, device 12 and accessory 14 may switch between different modes of operation depending, for example, on which applications or application features are being exercised by device 12 at a given point in time. Different modes of operation may also be applicable when particular accessories or particular devices are used. For example, in one mode of operation, an electronic device may monitor the microphone and ground lines in accessory 14 directly to attempt to detect events corresponding to actuation of button 176 or buttons 210, whereas in another mode of operation, the electronic device may use an internal tone detector to determine whether the accessory is attempting to transmit user input in the form of ultrasonic tones.

If desired, the buttons or other user interface used in accessory 14 may avoid the use of buttons that momentarily short the microphone and ground lines together. Instead, buttons may, for example, be used to control an ultrasonic tone generator that sends button press information to an electronic device over the microphone and ground lines in the form of ultrasonic pulses. With this type of scheme, button press events will not momentarily short the microphone and ground lines together, so pops, clicks, and dead time that might be associated with switches of the type that short the microphone and ground lines together may be avoided. This allows continuous uninterrupted use of the microphone and ground lines (e.g., for carrying on a telephone call while button presses are being made). The use of ultrasonic tones may also help avoid interference with telephone calls, because ultrasonic tones on the microphone line will fall outside the range of human hearing and will therefore not be audible to users. Multiple buttons can be represented by using more than one ultrasonic tone. User interface 232 may therefore contain one button, two buttons, three buttons, or more than three buttons.

Figure 19:
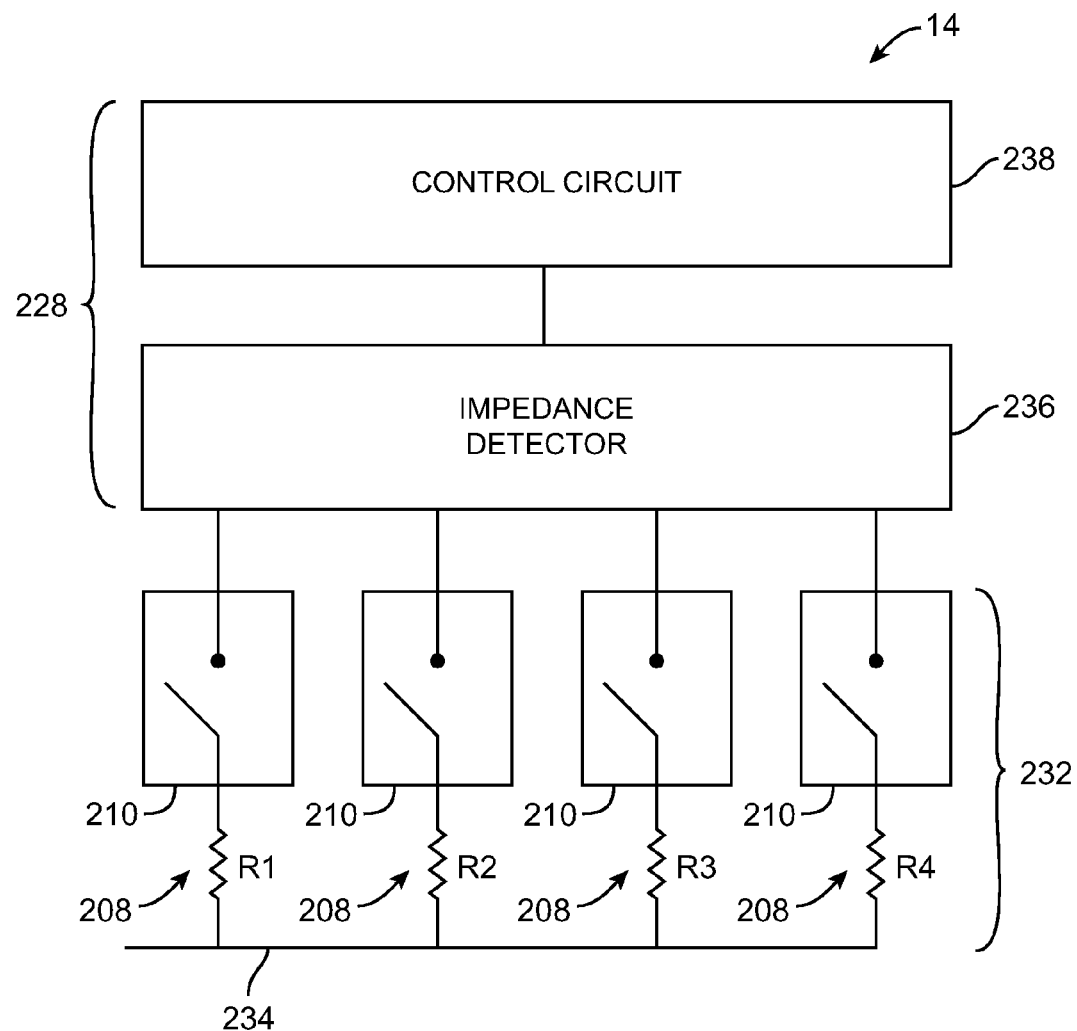
FIG. 19 is a circuit diagram of an illustrative user input device such as a set of resistively encoded button switches or other controls and associated processing circuitry such as an impedance detector that may be used in an accessory such as a headset in accordance with an embodiment of the present invention.

FIG. 19 shows an illustrative arrangement for an accessory such as accessory 14 showing how circuitry 228 may include impedance detector 236 and associated control circuit 238. In this type of arrangement, user input interface 232 may include any suitable resistively encoded components. As shown in FIG. 19, for example, user input interface 232 may include an array of resistively encoded buttons 210. Using the illustrative resistive network topology of FIG. 19, each of resistors 208 may have a different resistance value. Impedance detector 236 may be connected to buttons 210 and the resistor network formed by resistors 208. When a user actuates a given one of switches 210, impedance detector 236 may detect the resulting resistance (i.e., R1, R2, R3, or R4 in this example) between impedance detector 236 and line 234 (e.g., the ground line or the microphone line as examples). Impedance detector 236 may then inform control circuit 238 of the identity of the switch that has been actuated by the user. Control circuit 238 may transmit this information to device 12 (e.g., using transmitter 140 of FIG. 7). If a user presses more than one button simultaneously, the resulting resistance detected by impedance detector 236 may be an intermediate resistance value such as R1*R2/(R1+R2) if the "R1" and "R2" buttons are pressed. Device 12 may respond to simultaneous button presses such as these by taking an appropriate action in response to the particular set of buttons that is pressed, by ignoring multiple simultaneous button presses, etc.

Figure 20:
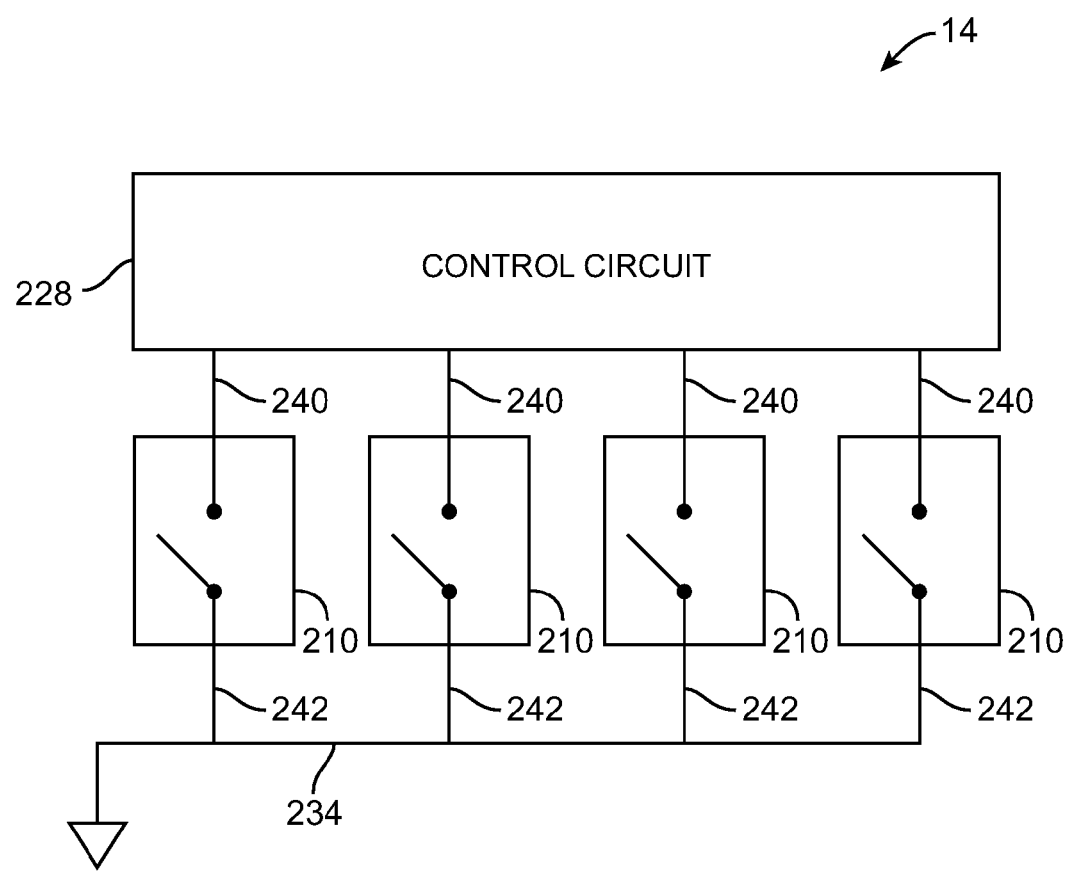
FIG. 20 is a circuit diagram of illustrative input interface and control circuitry that may be used to process user input in an accessory such as a headset in accordance with an embodiment of the present invention.

In arrangements in which accessory 14 includes control circuitry such as control circuit 238, it is not necessary to use resistance encoding for buttons 210. An arrangement in which control circuitry 228 has been implemented without the resistors 208 of FIG. 19 is shown in FIG. 20. In arrangements of the type shown in FIG. 20, each switch 210 has two terminals. Each terminal 240 is connected to control circuit 228 and each terminal 242 is connected to a suitable circuit node (e.g., line 234, which may be, for example, a line that has been biased to a particular voltage such as a microphone line or ground line). When one of switches 210 is closed, control circuit 228 can detect which of the terminals 240 has been electrically connected to line 234. In response, control circuit 228 can transmit information to device 12 indicative of which switch has been selected (e.g., using a tone generator or other transmitter circuitry such as transmitter 140 of FIG. 7). If multiple buttons are pressed simultaneously, device 12 may take an appropriate action such as a particular action associated with the combination of buttons that have been pressed. Device 12 may also be configured to ignore simultaneous button press events.

Figure 21:
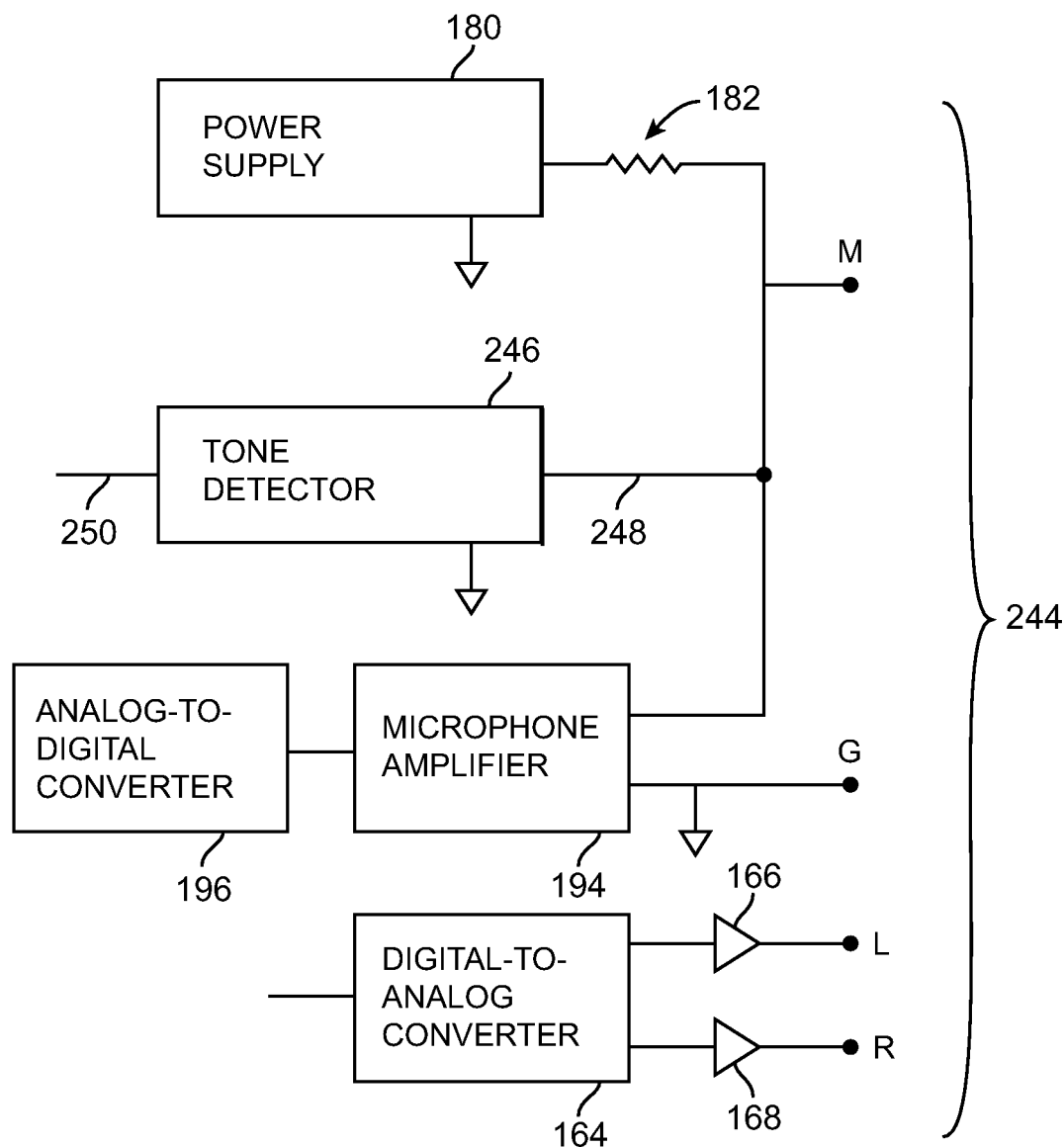
FIG. 21 is a circuit diagram of illustrative circuitry that may be used in an electronic device in receiving and processing control signals such as tone-based-control signals from a headset or other accessory in accordance with an embodiment of the present invention.

Illustrative circuitry 244 that may be used in device 12 to interface with an accessory that contains a tone generator is shown in FIG. 21. There may be one or more circuits such as circuitry 244 in a given electronic device. For example, a laptop with two such circuits may be provided to allow two users to listen to media, each having their own separate volume control.

As shown in FIG. 21, circuitry 244 may include a power supply 180 for biasing microphone line M through resistor 182 in relation to ground line G. Power supply 180 may be an adjustable voltage supply that device 12 uses to bias the microphone line in accessory 14 to one or more different levels. Accessory 14 may, if desired, include circuitry that is responsive to the different bias voltages (e.g., to place accessory 14 into different modes, to direct accessory 14 to send an acknowledgement signal, or to cause accessory to take other suitable actions in response to the received bias from power supply 180).

Tone detector 246 may be coupled to microphone terminal M, as shown in FIG. 21. When accessory 14 transmits ultrasonic tones over path 16, tone detector 246 may receive those tones on input 248. After processing (e.g., to identify the nature of the incoming tone signal), tone detector 250 may generate a suitable output on output 250. Output 250 may, for example, be used to provide digital signals to downstream processing circuitry so that device 12 can identify which buttons have been pressed and can identify what other tone-based information has been received from accessory 14.

Figure 22:
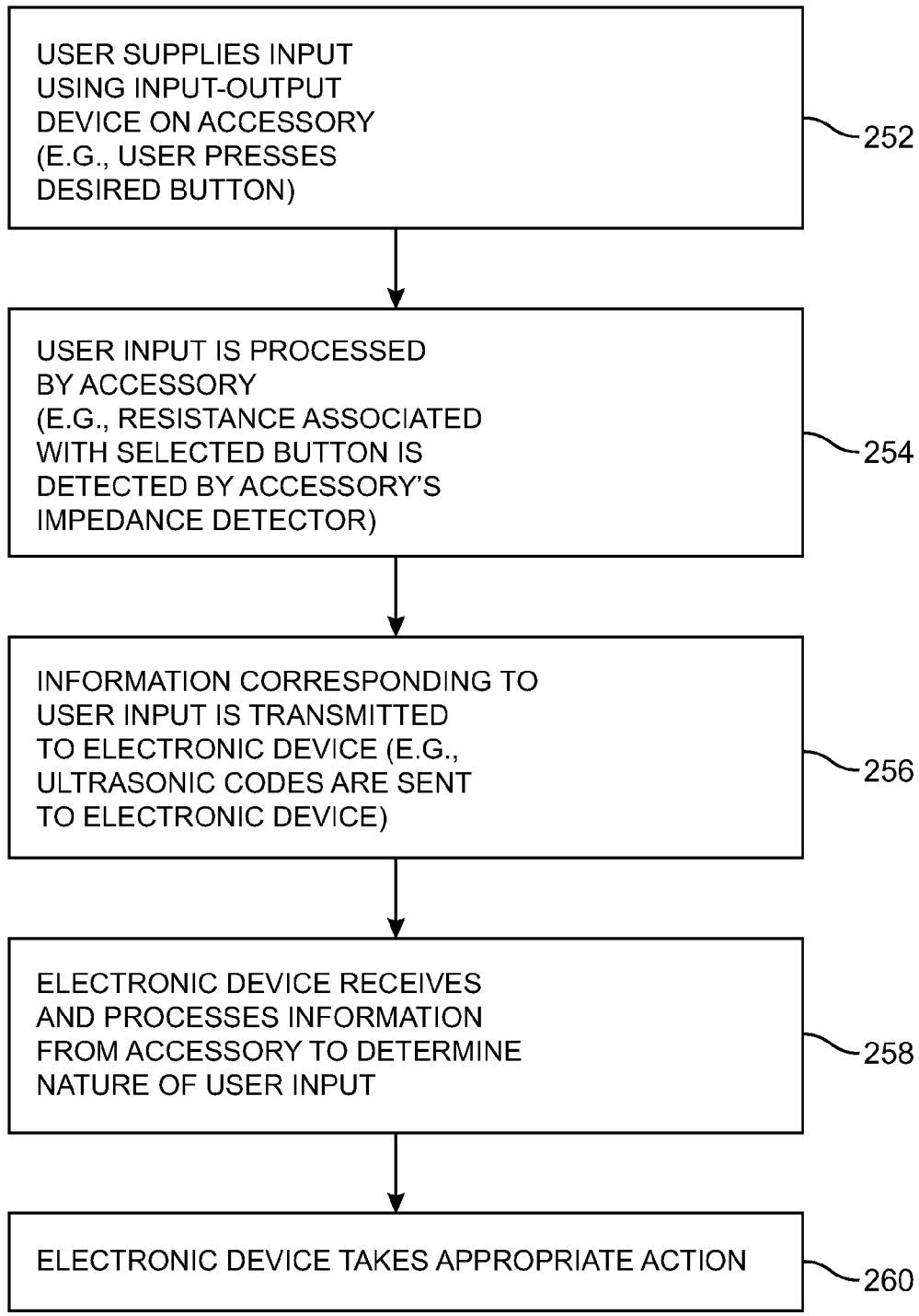
FIG. 22 is a flow chart of illustrative steps involved in using an electronic device and accessory that communicate with one another using tone-based signaling or other suitable communications techniques in accordance with an embodiment of the present invention.

Illustrative steps involved in using circuitry such as circuitry 244 of FIG. 21 in device 12 to communicate with accessory 14 (e.g., an accessory of the type shown in FIG. 18) are shown in FIG. 22.

At step 252, a user may supply input to accessory 14 using user input interface 232. The user may, for example, actuate a switch or other user interface device to supply accessory 14 with user input.

Circuitry 228 in accessory 14 may process the user input (step 254). For example, circuitry 228 may use an impedance detector or other suitable circuit to identify which button was pressed in a resistively encoded button array (as an example).

At step 256, a tone generator or other suitable control circuitry 228 may be used to transmit the user input to device 12 over path 16.

At step 258, electronic device 12 may use tone detector 246 to receive the transmitted tone information. This information may be processed to identify the user input. For example, incoming tones may be processed to recover user button press data or other user input that is indicative of a user's desire to control device 12. In response, device 12 may take appropriate action (step 260). For example, if the user is playing back a media file with device 12 and device 12 receives a user input indicative of user actuation of stop button 104 (FIG. 5), device 12 can stop the playback of the media file.

Figure 23:
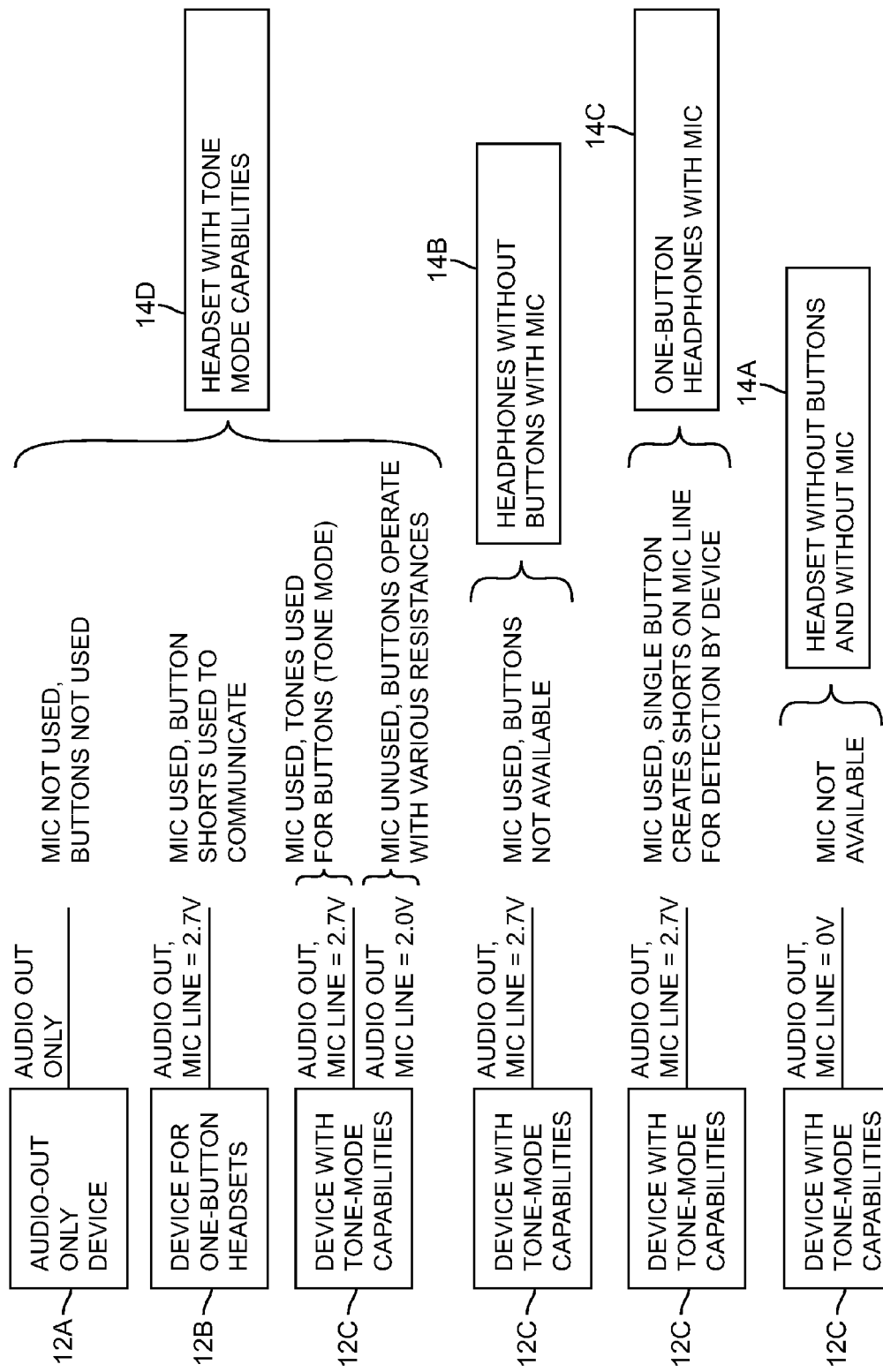
FIG. 23 is a diagram showing how different types of accessories may be used with different types of electronic devices in accordance with embodiments of the present invention.

The diagram of FIG. 23 indicates how various different electronic devices 12 can operate in conjunction with various different accessories 14. In the FIG. 23 example, there are three electronic devices.

Electronic device 12A may have circuitry such as circuitry 162 of FIG. 10 to drive speakers such as the speakers described in connection with accessory 14 of FIG. 9, but does not include circuitry for handling microphone signals or button presses.

Electronic device 12B may have circuitry such as circuitry 178 of FIG. 12 for detecting momentary shorts between a microphone terminal and a ground terminal, as described in connection with accessory 14 of FIG. 11, but does not have circuitry for processing ultrasonic tones.

Electronic device 12C may have circuitry such as circuitry 244 of FIG. 21 to detect tones and, if desired, may have additional circuitry such as voltage detector 216 of FIG. 15 for detecting resistances associated with resistively encoded buttons and circuitry such as comparator 186 of FIG. 12 for detecting momentary shorts between a microphone and ground line.

Accessories such as accessories 14A, 14B, 14C, and 14D may be plugged into devices such as devices 12A, 12B, and 12C. The functionality of the resulting combined system (i.e., a given one of the electronic devices and a given one of the accessories) depends on which system is considered.

Consider, as an example, a scenario in which headset 14A is plugged into device 12C. Headset 14A does not have buttons or a microphone and may have the functionality of accessory 14 of FIG. 9. When connected to device 12C, device 12C will not be able to receive or process incoming tones and will not be able to detect electrical shorts. Nevertheless, device 12C will be able to drive audio onto the speakers of accessory 14A, through audio connectors 46.

As another example, consider accessory 14B. Accessory 14B may be, for example, a headset such as headset 14 of FIG. 9 with a microphone of the type shown in FIG. 11. When connected to device 12C, the microphone in accessory 14B can supply audio signals that are processed by a corresponding microphone amplifier in device 12C, but because no buttons are available on accessory 14B, device 12C will not, in this scenario, be able to process or respond to button presses.

Accessory 14C may be, for example, a one-button accessory such as accessory 14 of FIG. 11. Device 12C may have a comparator such as comparator 186 that is able to detect when button 176 of accessory 14C is depressed. Audio may be driven onto the speakers of accessory 14C and microphone input from microphone 174 may be processed by microphone amplifier 194 of FIG. 12.

The remaining scenarios illustrated in FIG. 23 involve accessory 14D. Accessory 14D may be, for example, an accessory of the type described in connection with FIG. 18. As described in connection with FIG. 18, accessory 14D may have user input interface 232. User input interface 232 may include speakers 92, a button such as button 176 that bridges the microphone and ground lines in accessory 14D, resistively encoded buttons, a microphone, and an ultrasonic tone generator.

When connected to a relatively simple device such as audio-out-only electronic device 12A, the speakers in accessory 14D may be used, but the buttons and microphone will be unavailable.

When connected to device 12B, the microphone in accessory 14D may be used and button presses made using button 176 may be processed. If device 12B has voltage detector circuitry such as voltage detector 216 of FIG. 15, device 12B may be able to directly detect actuation of various resistively encoded buttons. If device 12B does not have voltage detector circuitry, but only has tone detection circuitry, device 12B will not be able to directly detect actuation of resistively encoded buttons but can detect ultrasonic tones (i.e., ultrasonic tones generated in response to user input).

When an accessory such as accessory 14D is connected to an electronic device such as electronic device 12C, both the device and accessory are able to fully exercise a variety of functions. In particular, because device 12C has audio driver circuitry and microphone amplifier circuitry, device 12C will be able to drive audio signals onto speakers in accessory 14D and will be able to receive incoming microphone signals. Momentary shorts between the microphone line and ground line that result from actuation of buttons such as button 176 (FIG. 11) in accessory 14D may be detected by device 12C using a comparator such as comparator 186 of FIG. 12 (which may be part of a voltage detection circuit such as voltage detector 216 of FIG. 15). Actuation of resistively encoded buttons may be detected by directly detecting resistance changes between the microphone and ground lines in accessory 14D (e.g., using a voltage detector such as voltage detector 216 of FIG. 15) or may be detected by receiving and processing ultrasonic tones that accessory 14D transmits to device 12C in response to button actuation events.

If desired, the microphone may be omitted from accessory 14D. When an accessory of this type is connected to a device such as audio-out-only electronic device 12A, the speakers in accessory 14D may be used, but the buttons will be unavailable. There is no microphone present, so no microphone is used.

When an accessory such as a microphoneless accessory 14D is connected to device 12B, microphone functions associated with device 12B will not be used. However, button presses made using a button such as button 176 in a microphoneless accessory such as accessory 14D may be processed. Moreover, if voltage detector circuitry such as voltage detector 216 of FIG. 15 is used in device 12B, device 12B may be able to directly detect actuation of various resistively encoded buttons on the microphoneless accessory. If device 12B does not have voltage detector circuitry, but only has tone detection circuitry, device 12B will not be able to directly detect actuation of resistively encoded buttons in a microphoneless accessory, but can detect ultrasonic tones such as ultrasonic tones generated in response to user input.

When an accessory such as accessory 14D that does not have a microphone is connected to an electronic device such as electronic device 12C, device 12C will be able to drive audio signals onto speakers in accessory 14D, but will be unable to receive incoming microphone signals. Momentary shorts between a "microphone" line and a ground line that result from actuation of buttons such as button 176 (FIG. 11) in an accessory 14D without a microphone may be detected by device 12C using a comparator such as comparator 186 of FIG. 12. As in scenarios in which accessory 14D contains a microphone, when accessory 14D does not include a microphone, actuation of resistively encoded buttons in accessory 14D may be detected by directly detecting resistance changes between the microphone and ground lines in accessory 14D using a voltage detector such as voltage detector 216 of FIG. 15 or may be detected by receiving and processing ultrasonic tones that accessory 14D transmits to device 12C in response to button actuation events.

As these various scenarios illustrate, the use of standard audio connectors such as connectors 46 of FIG. 4 may allow a variety of different types of accessories to be connected to different electronic devices. When a device is connected to an accessory that supports fewer features that the device supports, certain features may not be available to the user. Similarly, when an accessory is connected to a device that supports fewer features than the accessory supports, all accessory features may not be available to the user. When, however, devices and accessories have comparable feature support, the functions of the devices and accessories may be more fully utilized. An advantage of this type of arrangement is that devices such as device 12C that have numerous features may be used with a wide variety of accessories, even if those accessories do not fully support the features of device 12C. In a similar fashion, an accessory such as accessory 14D that supports numerous features may be used with a wide variety of electronic devices, even if those electronic devices do not fully support the features of accessory 14D.

Figure 24:
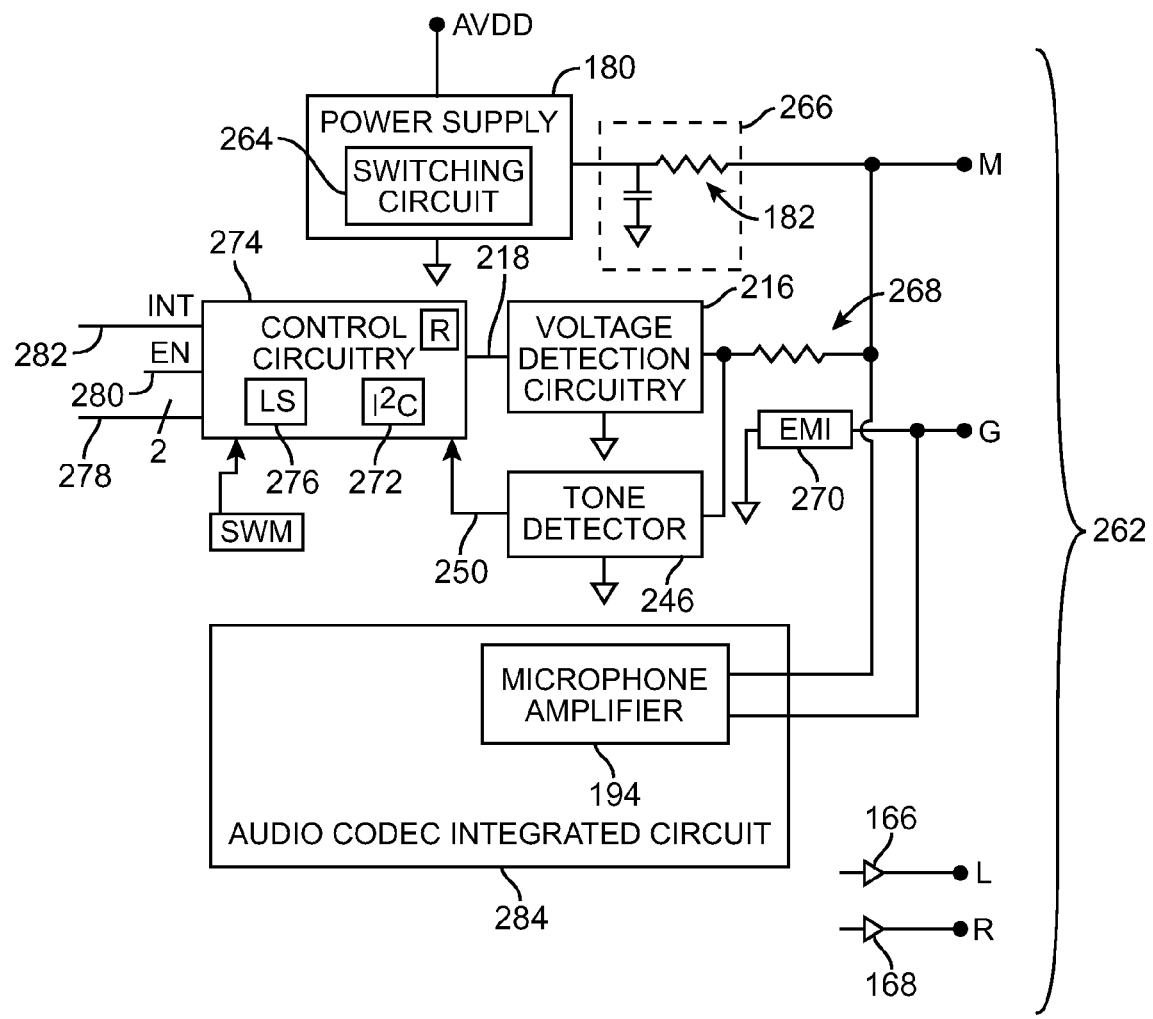
FIG. 24 is a circuit diagram of illustrative circuitry that may be used in an electronic device to interface with an accessory such as a headset that includes tone-based encoder circuitry for encoding user input in accordance with an embodiment of the present invention.

FIG. 24 is a circuit diagram of illustrative circuitry that may be used in an electronic device 12 that supports features such as tone mode detection. As shown in FIG. 24, circuitry 262 may include power supply circuitry 180. Power supply 180 may be a DC power supply that uses switching circuit 264 to supply an adjustable DC power supply voltage on its output. Filter 266 may use resistor 182 to supply the output voltage from power supply 180 to node M, where it may be used as a microphone contact bias voltage for biasing microphone line 94A in accessory 14. With one suitable arrangement, power supply 180 may be adjusted to provide voltages of 0 volts (ground), 2.0 volts, or 2.7 volts on terminal M or may be place in an open circuit configuration in which terminal M floats. A raw power supply voltage AVDD of more than 2.7 volts or other suitable voltage level may be supplied to the AVDD terminal of FIG. 24. If desired, power supplies with more adjustable output voltage levels or fewer adjustable output voltage levels may be used.

Incoming microphone signals from accessory 14 may be amplified using microphone amplifier 194. As shown in FIG. 24, microphone amplifier 194 may, for example, be implemented as part of a larger integrated circuit such as an audio codec 284. Resistor 268, which may be, for example, a 10 kilo-ohm resistor, may be used in optimizing current protection in circuitry 262. Filter 266, and, in particular, the capacitor in filter 266, may be used to remove high frequency noise from microphone terminal M. Resistor 182 may form a load for the microphone circuit when the microphone of accessory 14 is in use.

Voltage detection circuitry 216 may be used to measure the voltage across terminals M and G. Audio driver circuitry 166 and 168 may be used to drive audio signal onto the speakers in accessory 14.

An electromagnetic interference (EMI) filter such a filter 270 may be used to help make circuitry 262 immune to the undesired effects of electromagnetic interference.

Tone detector 246 may receive ultrasonic tones from microphone line M and may provide corresponding digital output on output line 250 that indicates what type of tones have been received. Control circuitry 274 may help to process the tone signal data from line 250.

Control circuitry 274 may include a level shifter such as level shifter 276 that serves as an interface between the relatively higher voltages that may be used in circuitry 262 and the relatively lower voltages that may be used elsewhere in device 12. Communications circuitry in control circuitry 274 such as I$^2$C communications circuitry 272 may be used to help circuitry 274 communicate with other circuitry on device 12. Circuitry 272 may be used to send and receive digital data over bus 278, which may be, for example, a two-wire I$^2$C bus. Circuitry 274 may have an enable input 280 that receives an enable signal EN. The enable signal EN may be deasserted when, for example, an application that is running within device 12 desires to disable accessory functions to save power. Interrupt line 282 may be asserted when control circuitry 274 generates an interrupt signal INT. Processing circuitry such as processing circuitry 128 of FIG. 7 may periodically examine the state of interrupt line 282. When the interrupt is asserted, processing circuitry 128 may examine the states of registers within control circuitry 274 to determine what type of activity in circuitry 262 has resulted in the assertion of the interrupt. This activity might be, for example, detection of an incoming ultrasonic tone, etc.

Figure 25:
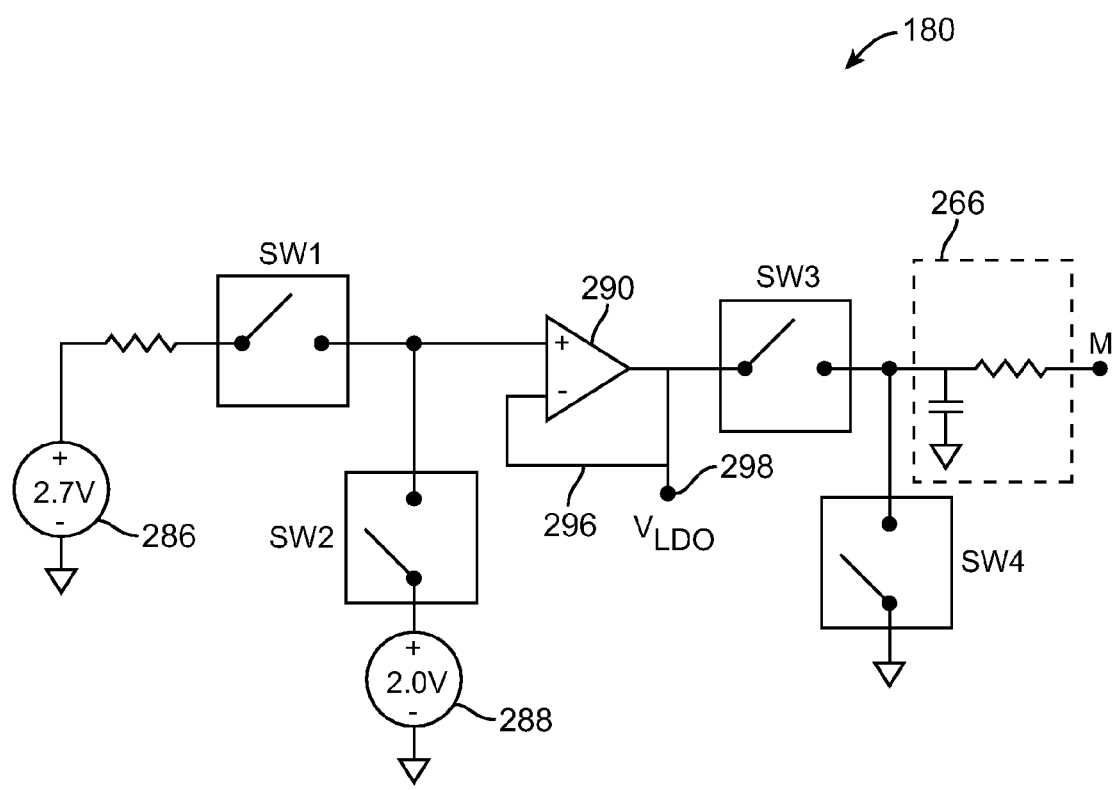
FIG. 25 is a circuit diagram of an illustrative adjustable power supply circuit that may be used to produce a controllable bias for a microphone line or other conductor associated with an accessory such as a headset in accordance with an embodiment of the present invention.

Illustrative power supply circuitry 180 that may be used in circuitry 262 is shown in FIG. 25. As shown in FIG. 25, power supply circuit 180 may have fixed power supply 286 and fixed power supply 288. Switch SW1 may be closed when it is desired to route the output voltage from supply 286 to output node M. Switch SW2 may be closed when it is desired to route the output voltage from supply 288 to output M. Driver 290 and feedback path 296 may be used to regulate the output voltage $V_{LDO}$ on node 298. The voltage on the "+" input of device 290 serves as an adjustable reference voltage. In the example of FIG. 25, $V_{LDO}$ will be 2.7 volts when SW1 is closed and SW2 is open and will be 2.0 volts when SW1 is open and SW2 is closed. Switch SW3 may be closed and switch SW4 may be opened when it is desired to route the selected output $V_{LDO}$ to microphone node M. When it is desired to ground terminal M, switch SW4 may be closed and switch SW3 may be opened. Terminal M may be placed in a floating condition in which terminal M is disconnected from the ground and power supply output by opening both switch SW3 and switch SW4.

Figure 26:
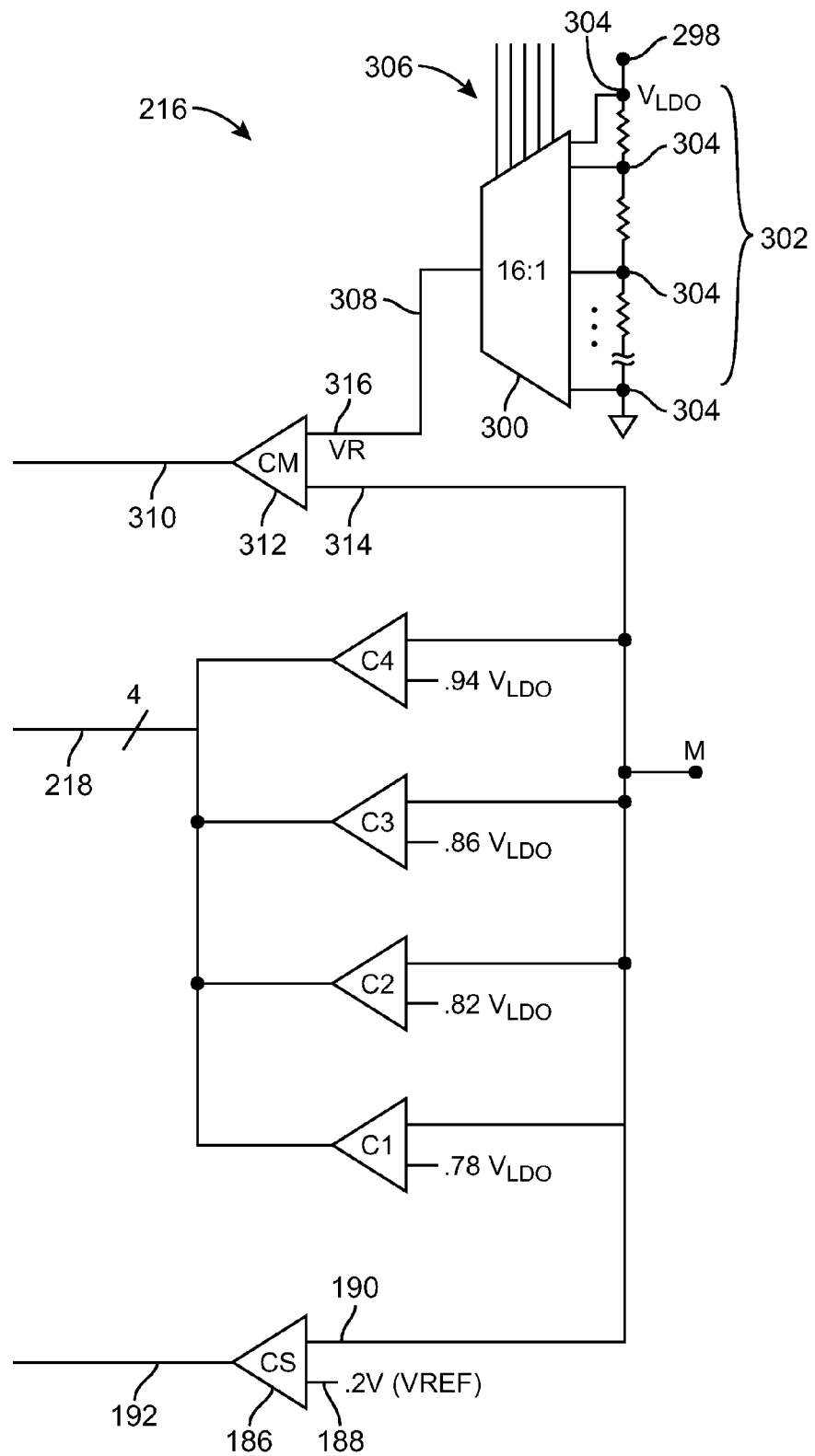
FIG. 26 is a circuit diagram of an illustrative circuit that may be used for monitoring the voltage of a signal from an accessory such as a headset on a conductive path such as a microphone line in accordance with an embodiment of the present invention.

Illustrative voltage detection circuitry 216 that may be used in circuitry 262 of FIG. 24 is shown in FIG. 26. Comparator 186 may receive the voltage on the M terminal on input 190 and may receive a reference voltage VREF (e.g., 0.2 volts or other suitable value close to 0 volts) on input 188. Comparator 186 may compare the voltage levels on inputs 188 and 190 and may assert a corresponding output signal on line 192 whenever the voltage on microphone line M falls below VREF, indicating that a user has depressed a shorting button such as button 176 (e.g., in FIG. 14).

Comparator circuits C1, C2, C3, and C4 may be used to decode resistively encoded button presses when device 12 and accessory 14 are operated in a resistance detection mode. Each comparator may receive a different reference voltage. These reference voltages may be obtained by dividing voltage $V_{LDO}$ using a voltage divider (e.g., a voltage divider formed from a resistor tree). The four outputs of comparators C1, C2, C3, and C4 collectively form a four-bit digital code that is indicative of the resistance in accessory 14 between microphone line 92A and ground line 92B. When, for example, a first button is pressed, only the output of C1 may be asserted (e.g., taken to a logic high value), whereas the outputs of C2, C3, and C4 remain low. When, however, a second button is pressed and the resistance between line 92A and 92B changes, the voltage on microphone line M will change in response. This may, as an example, cause the outputs of C1, C2, and C3 to go high, while output C4 remains low. The number of voltage detection comparators such as comparators C1, C2, C3, and C4 that are provided in voltage detection circuitry 216 may be scaled to accommodate a desired number of resistively encoded buttons in accessory 14. When there are numerous buttons in accessory 14, there should also be numerous comparators in circuit 216. When there are relatively few buttons in accessory 14, fewer comparators are needed in circuit 216 to discriminate between different button actuation events.

Comparator 312 may receive the microphone line voltage from terminal M on input 314 and an adjustable reference voltage VR on input 316. The magnitude of voltage VR may be controlled by controlling the digital control signals on control lines 306. These control signals may be supplied to switch 300 by control circuitry 274. The inputs to switch 300 may be obtained from a voltage divider such a voltage divider 302. Each node 304 of the resistor tree in voltage divider 302 establishes a separate reference voltage derived from voltage $V_{LDO}$ on node 298. In response to the control signals received on lines 306, switch 300 routes a selected one of these voltages to output 308 for use as the reference voltage VR on input 316. Comparator 312 compares the microphone voltage on terminal M to the selected value of the reference voltage and produces a corresponding output 310 that is indicative of whether the microphone line M is at a higher or lower voltage than the selected reference voltage. By adjusting switch 300, control circuitry 274 (FIG. 24) can accurately measure the magnitude of the voltage on microphone line M, thereby obtaining information from accessory 14 on the state of the microphone in accessory 14. In the example of FIG. 26, switch 300 supports 16 different inputs. If desired, finer control may be provided by using a switch with a larger number of inputs. Switches with fewer inputs may also be used if desired.

As indicated schematically by registers R in control circuitry 274 of FIG. 24, one way in which circuitry 262 may interface with other processing circuitry on device 12 is through the periodic adjustment of register values. When, for example, a particular ultrasonic tone is detected, control circuitry 274 may adjust the contents of a corresponding register in control circuitry 274 and may, if desired, assert the interrupt line 282 to inform processing circuitry on device 12 of the need to inspect the new contents of registers R. Any suitable number of registers may be used in control circuitry 274 (e.g., one, two, more than two, tens of registers, more than tens of registers, etc.).

Figure 27:
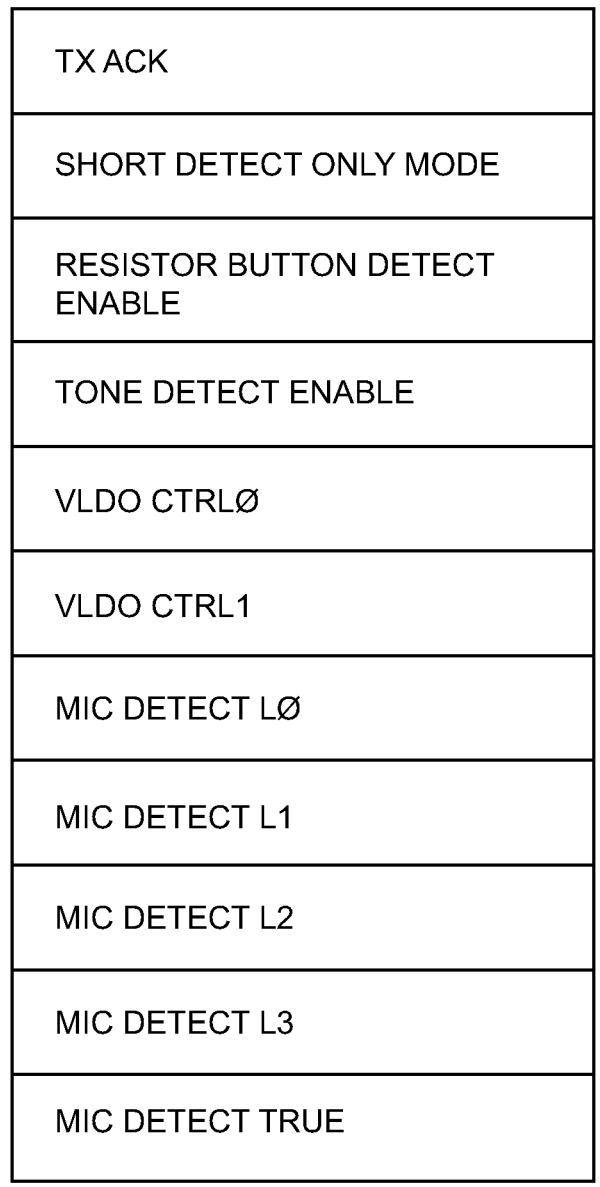
FIG. 27 is a table showing illustrative registers that may be used in an electronic device to store information associated with interactions between the electronic device and an accessory such as a headset in accordance with an embodiment of the present invention.

Illustrative registers that may be used in registers R of control circuitry 274 are shown in FIG. 27. As indicated by the text in the register boxes of FIG. 27, a variety of status conditions may be represented by the state of register bits. A TX ACK bit may be set high, for example, when it is desired to set a timer for enabling detection of an incoming ultrasonic acknowledgement tone (e.g., a tone of a particular length such as 6 ms). The "short detect only mode" bit may be set high to place device 12 in a low power standby mode of operation (e.g., a mode in which only detector 186 is being used and in which only button presses from shorting buttons such as button 176 of FIG. 11 are recognized). The "resistor button detect enable" bit may be set high when it is desired to use the resistance decoding functions of comparators C1, C2, C3, and C4 of FIG. 26 to support direct detection of user actuation of resistively encoded buttons (e.g., by analyzing the resistance bridging lines 94A and 94B in accessory 14). The $V_{LDO}$ CTRL0 and $V_{LDO}$ CTRL1 bits may be used to control the magnitude of $V_{LDO}$ by controlling the states of switches SW1, SW2, SW3, and SW4 of circuit 180, as described in connection with FIG. 25. The MIC DETECT bits may represent the values of the control signals applied to the four input lines 306 of switch 300 in voltage detector 26 of FIG. 26. The "mic detect true" bit may be set high when control circuitry 274 has detected the presence of a microphone in accessory 14 during an initial accessory discovery process.

Figure 28:
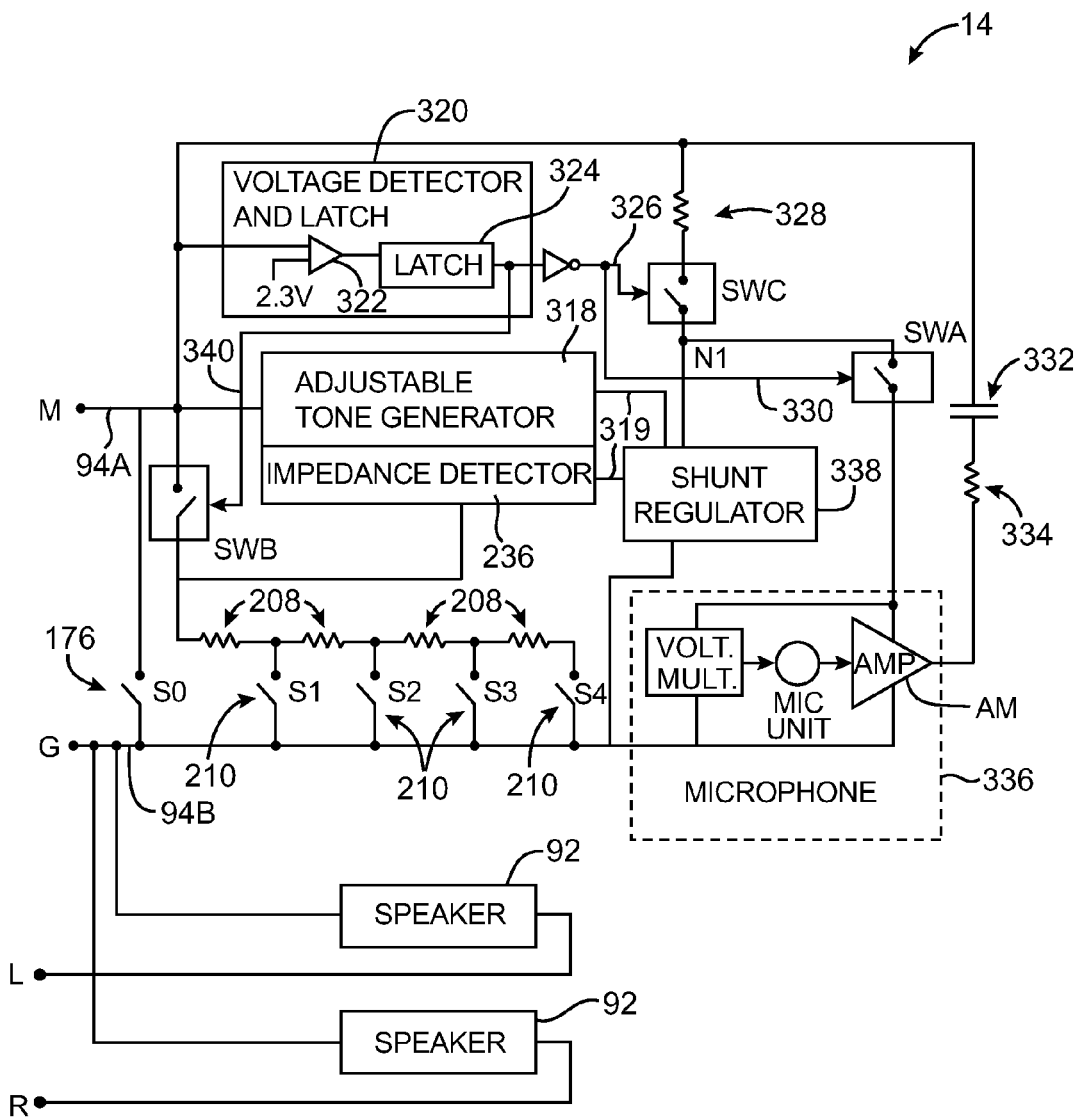
FIG. 28 is a circuit diagram of illustrative circuitry that may be used in an accessory such as a headset to process user input and to supply corresponding tone-encoded signals to a corresponding electronic device in accordance with an embodiment of the present invention.

An illustrative accessory 14 that may be used to support tone mode operations and resistance detection mode operations in conjunction with circuitry 262 of FIG. 24 is shown in FIG. 28. As shown in FIG. 28, accessory 14 may have speakers 92 that are driven by audio output circuits such as audio drivers 166 and 168. Buttons may be associated with switches S0, S1, S2, S3, and S4. Switch S0 may be used to momentarily short microphone line M to ground line G and may be used when device 12 is in "short detect only mode" or when a device that only supports short detect button decoding operations is used. If desired, switch S0 may be omitted. In configurations in which switch S0 is omitted, button press events (e.g., events in which switch S0 is closed to short the M and G terminals together) are avoided, so that audio signal transmission between accessory 14 is not interrupted by button actuation activity.

Switches S1, S2, S3, and S4 may be resistively encoded using resistors 208. The resistive network made up of resistors 208 may be configured using any suitable topology, as described in connection with FIGS. 14 and 16. The arrangement of FIG. 28 is merely illustrative. Impedance detector 236 may be used to detect which of switches S1, S2, S3, and S4 has been actuated. In resistance detection mode, device 12 may measure the voltage drop between microphone line M and ground line G, thereby directly measuring the resistance of the switches. This allows device 12 to determine which of switches S1, S2, S3, and S4 has been actuated without using impedance detector 236. In tone mode, impedance detector 236 may provide information on which switch has been actuated to adjustable tone generator 318, which, in turn, may transmit appropriate tones to device 12 for detection by tone detector 246 (FIG. 24). The tones may be transmitted over the microphone and ground lines. The tones may be ultrasonic tones that fall out of the range of human hearing and are therefore not disruptive to user activities such as telephone call activities.

Voltage detector and latch circuitry 320 may respond to various bias voltages that are applied to microphone line M by device 12. This allows device 12 to control the operation of accessory 14 via path 16. The bias voltages may be generated by power supply circuitry 180 (FIG. 25) in response to control signals from control circuitry 274 (FIG. 24). A bias voltage on the microphone line may help to power a microphone in accessory 14. Time-dependent changes in the bias voltage may be used as a way to control accessory 14 and may therefore be considered to form a type of data transfer between device 12 and accessory 14. At the same time that a bias voltage is being supplied to accessory 14 by device 12 using the microphone and ground lines, device 12 may be monitoring microphone signals on the microphone and ground lines that result from capturing the user's voice or other sound at accessory 14.

Shunt regulator 338 may be used with resistor 328 to regulate the voltage on node N1. Shunt regulator 338 may operate as a Zener diode, pinning the voltage on node N1 at a desired value over a wide range of operating currents. This regulated voltage may be used to power microphone 336 through switch SWA when switches SWA and SWC are closed. As indicated by paths 319, shunt regulator 338 may be used to power adjustable tone generator 318 and impedance detector 236. This prevents noise in the form of fluctuating currents in adjustable tone generator 318 and impedance detector 236 from being added onto microphone line M through resistor 328 and thereby prevents audible noise from being added to the microphone signal. Resistor 334 sets the magnitude (gain) of the microphone signal that is coupled onto node M from microphone 336. In the arrangement shown in FIG. 28, microphone 336 is being implemented using a MEMS module. Capacitor 332 is a DC blocking capacitor that allows alternating current (AC) signals from microphone 336 to pass to microphone terminal M, while preventing the DC bias voltage on node M from adversely affecting the bias of amplifier AM in the MEMS module of microphone 336. The MEMS module may include a microphone unit and a voltage multiplier that work in conjunction with amplifier AM to provide microphone output signals in response to received sound from a user. If desired, other types of microphones may be used such as electret microphones (see, e.g., the arrangement of FIG. 30).

As shown in FIG. 28, circuitry 320 may include a comparator 322. When the voltage on line M exceeds a reference voltage (e.g., a reference voltage obtained from a bandgap voltage reference in accessory 14), the output of comparator 322 goes high and sets the output of latch 324 high. The output of latch 324 may be conveyed to the control input of switch SWB over control line 340. An inverted version of the latch output may be conveyed to the control input of switch SWC via control line 326 and may be conveyed to the control input of switch SWA via control line 330. When it is desired to operate in a resistance detection mode, switch SWB may be closed, thereby connecting the network of resistors 208 and switches 210 between terminals M and G. In this situation, switches SWA and SWC may be open to disable microphone 336. When it is desired to operate in a tone detection mode, switch SWB may be open and switches SWA and SWC may be closed, thereby disconnecting the resistively encoded switches from terminals M and G and biasing microphone 336 for operation.

Figure 30:
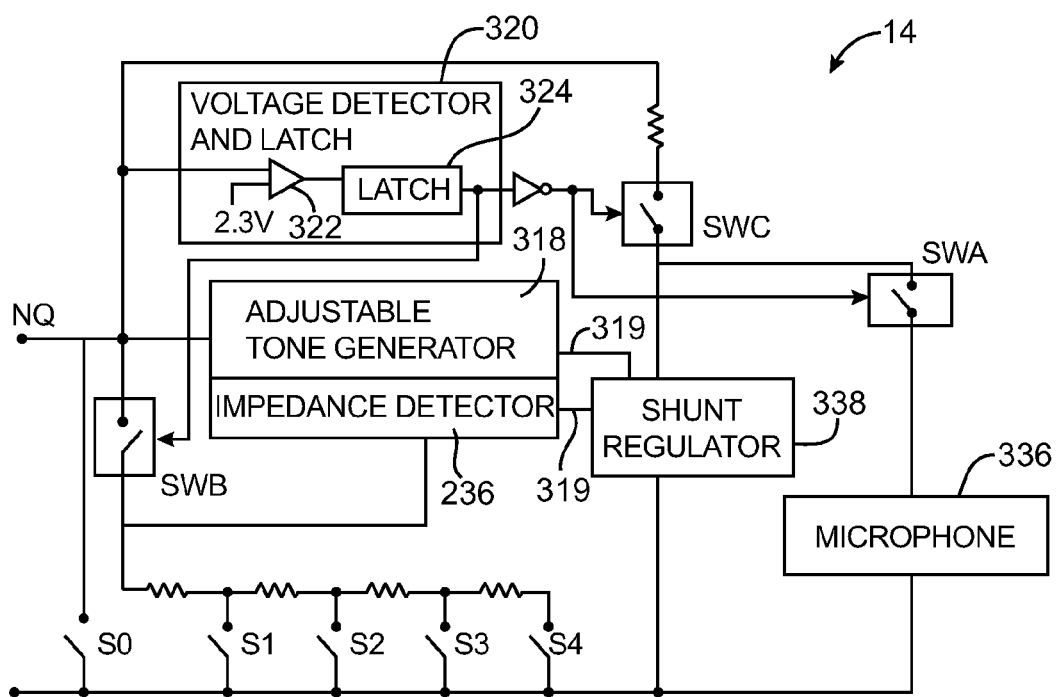
FIG. 30 is a circuit diagram of illustrative circuitry that may be used in an accessory such as a headset to process user input and to supply corresponding tone-encoded signals to a corresponding electronic device in accordance with an embodiment of the present invention.

In FIG. 30, an illustrative accessory circuit that is based on an electret microphone rather than a MEMS microphone is shown.

Figure 31:
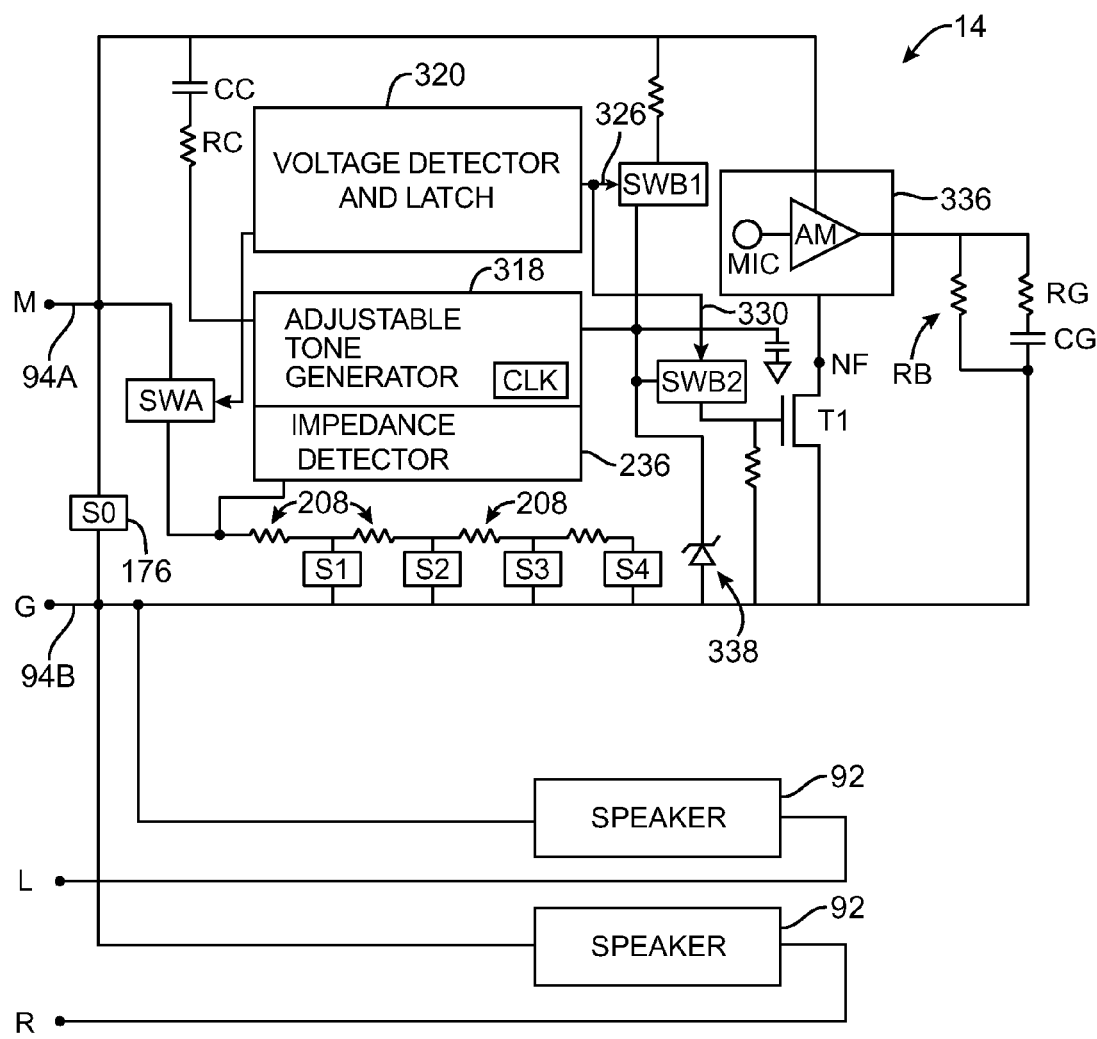
FIG. 31 is another circuit diagram of illustrative circuitry that may be used in an accessory such as a headset to process user input and to supply corresponding tone-encoded signals to a corresponding electronic device in accordance with an embodiment of the present invention.

FIG. 31 shows another illustrative arrangement that may be used for the circuitry of accessory 14. In the circuitry of FIG. 31, resistor RC and capacitor CC may serve as a tone coupling circuit. This tone coupling circuit helps properly attenuate tone signals transmitted from tone generator 318 to node M. The tone coupling circuit also serves as a high pass filter that allows ultrasonic tones from tone generator 318 to be merged onto microphone line M, which also carries regular audio signals (e.g., signals from roughly 20 Hz to 20 kHz in frequency) from microphone 336. Resistor RB sets the DC bias for microphone line M. Resistor RG and capacitor CG set the AC gain for amplifier AM in microphone module 336 (e.g., a MEMS module). Amplifier AM may operate in constant current mode.

Voltage detector and latch 320 may activate at a suitable threshold voltage. When, for example, the voltage on microphone line M is 2.7 volts (i.e., greater than a threshold of 2.3 volts), voltage detector and latch 320 may generate control signals that turn on switches SBW1 and SWB2 and that turn off switch SWA. When the voltage on microphone line M falls below this level, switches SWB1 and SWB2 may be turned off and switch SWA may be turned on. When switches SWB1 and SWB2 are turned off in this way, transistor T1 is turned off. This lets node NF float and turns off microphone 336.

As with the arrangement of FIG. 28, the arrangements of FIGS. 30 and 31 may, if desired, be configured so that disruptions to the microphone signals on the microphone line are avoided. This may be accomplished by omitting or avoiding the use of switches such as switch S0 that short the microphone and ground lines together when pressed. Although such switches may be helpful in controlling legacy devices, in situations in which the microphone and ground lines are in use to carry audio signals such as voice signals captured from a microphone during a telephone call, the use of such momentary shorting switches may cause pops, clicks, and dead time. When switch S0 is omitted or not used, these disruptions to the microphone signals may be avoided.

Audio disruptions can also be avoided by the use of ultrasonic tones to convey button press information, because ultrasonic tones are not audible to humans and therefore do not create audible interference when carried over the microphone line. At the same time that ultrasonic button press information is being conveyed from the accessory to the electronic device over the microphone line and at the same time that the electronic device is supplying a DC bias for the microphone over the microphone line, the microphone line may be used to convey audio information from the accessory to the electronic device without interference.

FIG. 29 shows the behavior of switches SWA, SWB1, and SWB2 in circuits of the type shown in FIG. 31 in response to high and low latch output values. When an appropriate accessory is present, such as a headset with speakers and an active microphone, the accessory may be placed in tone mode by setting switch SWA off and by turning switches SWB1 and SWB1 on, as indicated in the first row of the table of FIG. 29. The second row of the FIG. 29 table indicates that the same type of accessory may be placed in a resistance detection mode in which only direct detection of the states of resistively encoded switches S1-S4 is being performed by device 12, by taking the latch state low. The same resistance detection mode may be invoked when, for example, the accessory connected to device 12 only has speakers and no microphone, as indicated in the third row of the table of FIG. 29. The fourth row in the FIG. 29 table indicates the states into which the switches SWA, SWB1, and SWB2 may be placed when it is desired to operate in tone mode to accommodate an accessory with speakers but without a microphone.

Any suitable technique may be used to communicate using ultrasonic tones. With one suitable arrangement, each button (e.g., each of the resistively encoded switches S1, S2, S3, and S4 in the FIG. 31 example) may be associated with a unique ultrasonic tone frequency. A calibration frequency and a button release frequency may also be used. During power-up, an acknowledgement tone may be transmitted. The acknowledgement tone, which may be provided in conjunction with a calibration tone, may be provided at any suitable frequency that may be produced by tone generator 318 (e.g., at a frequency different from that of the calibration frequency, at a frequency lower than that of the calibration frequency, at a frequency independent of any button press frequency, at a frequency different from the button release frequency, at a frequency that is the same as one of the button frequencies or the button release frequency, at a frequency that is used only for acknowledgements, using multiple acknowledgement frequencies in the form of a code such as a code formed of three 2 ms tones each of a different frequency, using other sequences of more than one tone frequency, using tone frequency sequences containing tones of different lengths, etc.).

Figure 32:
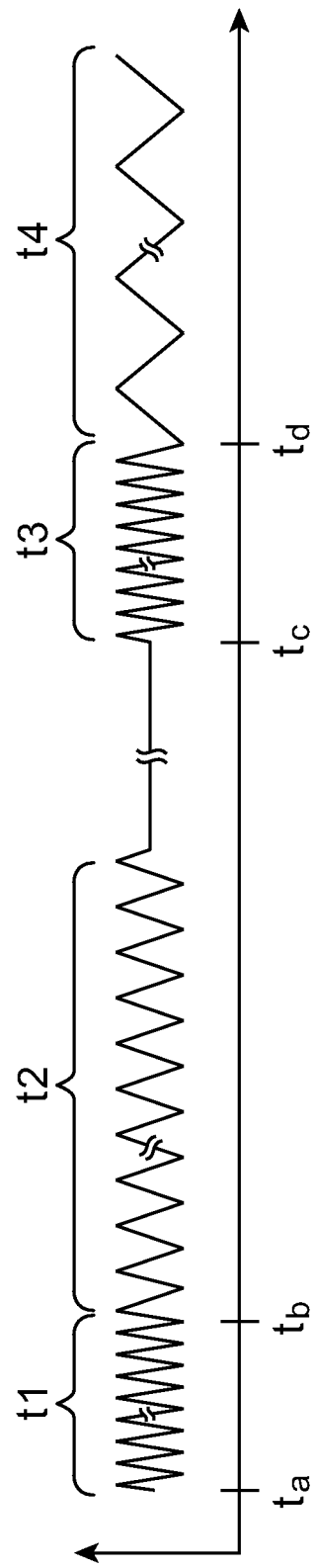
FIG. 32 is a graph showing illustrative tones that may be conveyed between an accessory such as a headset and an electronic device when the accessory and electronic device are communicating in accordance with an embodiment of the present invention.

Illustrative tones that may result from typical button activity are shown in FIG. 32. At time $t_a$, a user may depress a button. Tone generator 318 may transmit a calibration frequency at time $t_a$ for time period $t_1$ (e.g., for 1 ms). After the calibration frequency transmission is complete, tone generator 318 may transmit a tone associated with the button actuated by the user. This tone may be transmitted starting at time $t_b$ and may have a duration of $t_2$ (e.g., 2 ms). When the user releases the button at time $t_c$, another calibration tone may be transmitted for duration $t_3$ (e.g., 1 ms). This may be followed by an ultrasonic tone at time $t_d$ of duration $t_4$ that indicates that the button has been released. Tone generator 318 may generate these tones from a clock in accessory 14 (e.g., by dividing a 2 MHz local clock to obtain an appropriate ultrasonic frequency). Typical ultrasonic frequencies for the tones produced by tone generator 318 may be, for example above 20 kHz (to avoid interference with audio signals on the microphone line) and below about 1 MHz (to avoid noise issues and to ensure proper transmission of the signals along the wires of the accessory). Illustrative ranges for suitable tone frequencies include 25 kHz-1 MHz, 25-500 kHz, 50-500 kHz, and 75-300 kHz (as examples). Higher frequencies may be used for the ultrasonic tones if desired. Lower frequencies may be used when, for example, the presence of an audio tone on the microphone line is acceptable to the user.

The use of the clock in accessory 14 to generate the tones for tone generator is represented schematically by the clock CLK in tone generator 318 of FIG. 31. If desired, other arrangements may be used (e.g., by synchronizing the clocks of device 12 and accessory 14). An advantage of using unsynchronized clocks is that this may reduce design complexity and lower costs.

A table showing illustrative frequency assignments that may be used for the ultrasonic tones is presented in FIG. 33. If more buttons are used, unique ultrasonic tones may be assigned to those buttons if desired.

Figure 34:
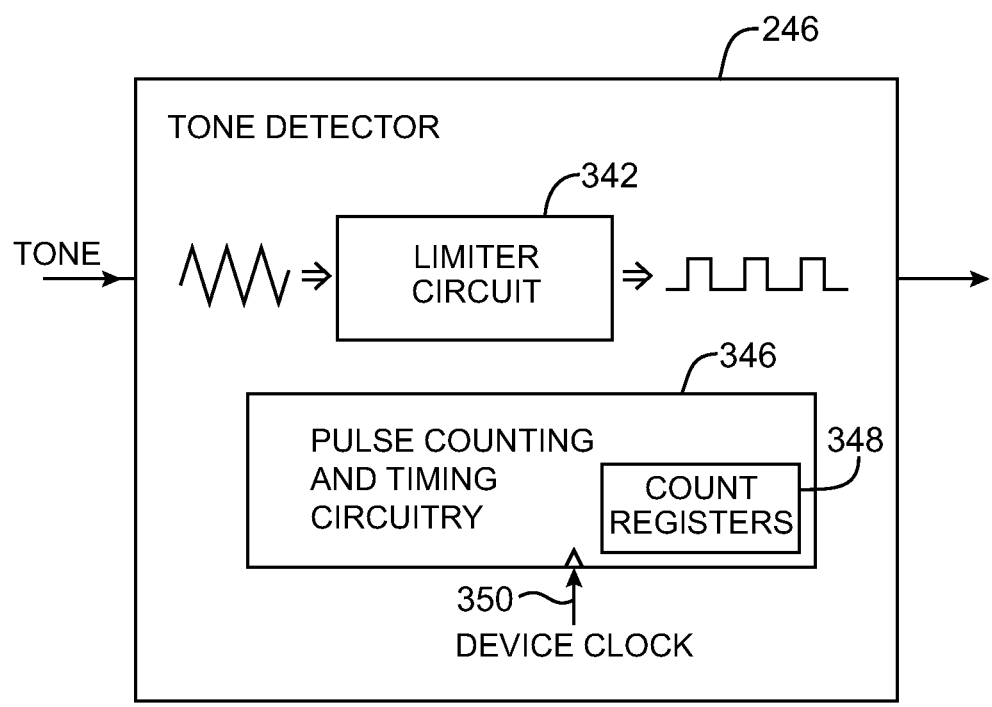
FIG. 34 is a circuit diagram of an illustrative tone detector that may be used in circuitry such as circuitry on an electronic device to process incoming tones from an accessory such as a headset in accordance with an embodiment of the present invention.

FIG. 34 shows illustrative tone detector circuitry such as tone detector 246 of FIG. 21 that may be used in processing received ultrasonic tones in device 12. As shown in FIG. 34, tone detector 246 may receive an oscillating signal such as a sawtooth or sinusoidal signal over path 16 (e.g., across microphone line M and ground G). This signal may be converted to a square wave signal using limiter circuit 342. Tone detector 246 may use pulse counting circuitry 346 to process the incoming tones. Counter circuitry 348 such as registers that maintain count values may be used by pulse counting circuitry 346 to analyze received tones. Pulse counting and timing circuitry 346 may by clocked using a device clock on input 350 that is local to device 12 and that runs asynchronously with respect to the clock CLK in accessory 14.

The use of the calibration tones transmitted by tone generation circuitry 318 and the pulse counting and timing circuitry 346 of tone detector 246 may allow ultrasonic tone communications to be used reliably, even in environments in which the clocks of device 12 and accessory 14 are asynchronous.

Figure 35:
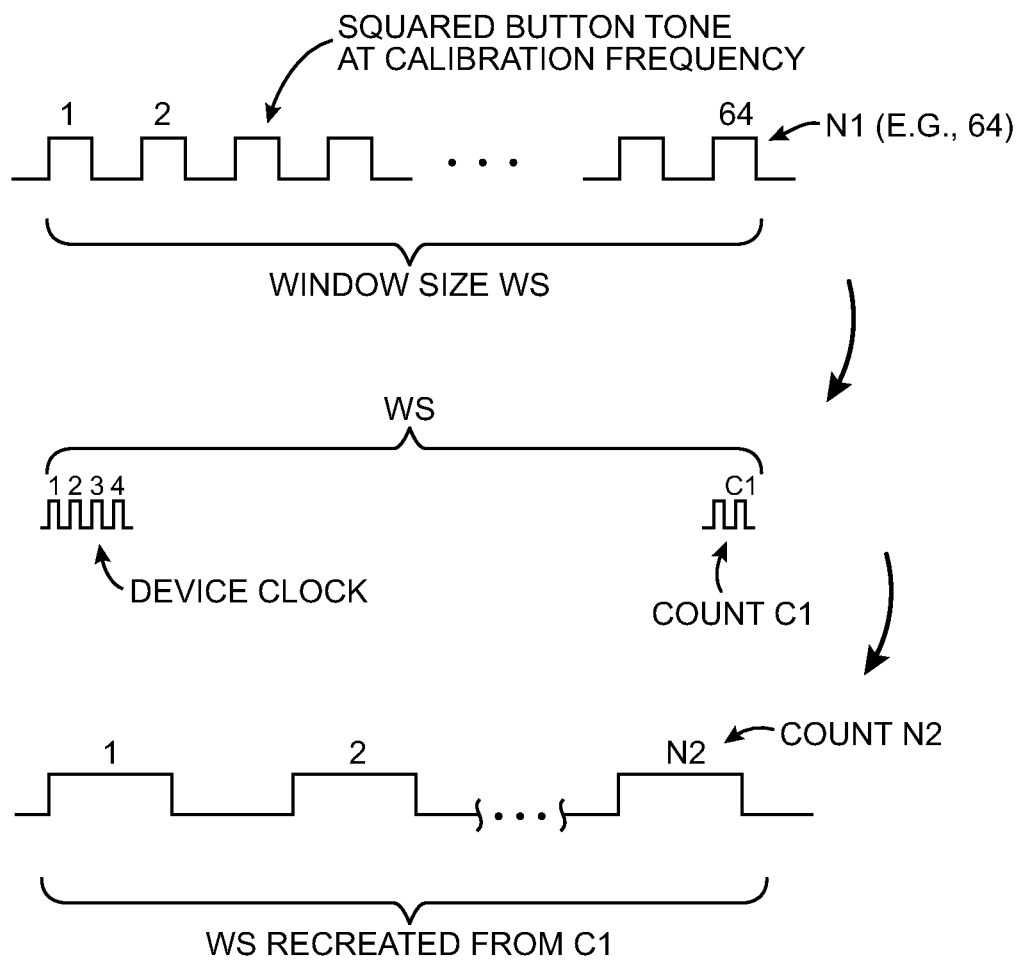
FIG. 35 is a diagram illustrating how tones may be processed by a tone generator of the type shown in FIG. 33 in accordance with an embodiment of the present invention.

An illustrative processing approach that may be used by tone detector 246 in analyzing incoming ultrasonic tones is shown in FIG. 35. As shown in the top portion of FIG. 35, tone detector may initially receive a button tone at the calibration frequency (i.e., a tone corresponding to time $t_a$ of FIG. 32). The pulses of the calibration tone can be counted to a count value of N1 (e.g., a predetermined value such as 64 in the FIG. 35 example). This first counting process establishes a window size WS. As shown in the middle portion of FIG. 35, this window size may be measured in the clock domain of device 12 by simultaneously counting using the device clock. The count value reached by the device clock in window size WS may be referred to as count C1. After count C1 has been established, the pulses of the button tone may be processed (i.e., the tone associated with the transmission of time $t_b$ of FIG. 32 or, in the case of a button release event, the transmissions associated with time td). As shown in the lower portion of FIG. 35, the button tone processing operation may involve counting the pulses of the unknown tone for a duration equal to time window WS. The length of time window WS can be determined by counting with the device clock to count value C1 (or counting down from C1 with the device clock). The resulting count N2 for the unknown pulse can then be compared to the calibration count N1. The ratio of N2 to N1 represents a calibrated version of the transmitted ultrasonic tone and can be compared to the entries in a table of known values such as the table of FIG. 33 to identify the button activity that has occurred in accessory 14.

Figure 36:
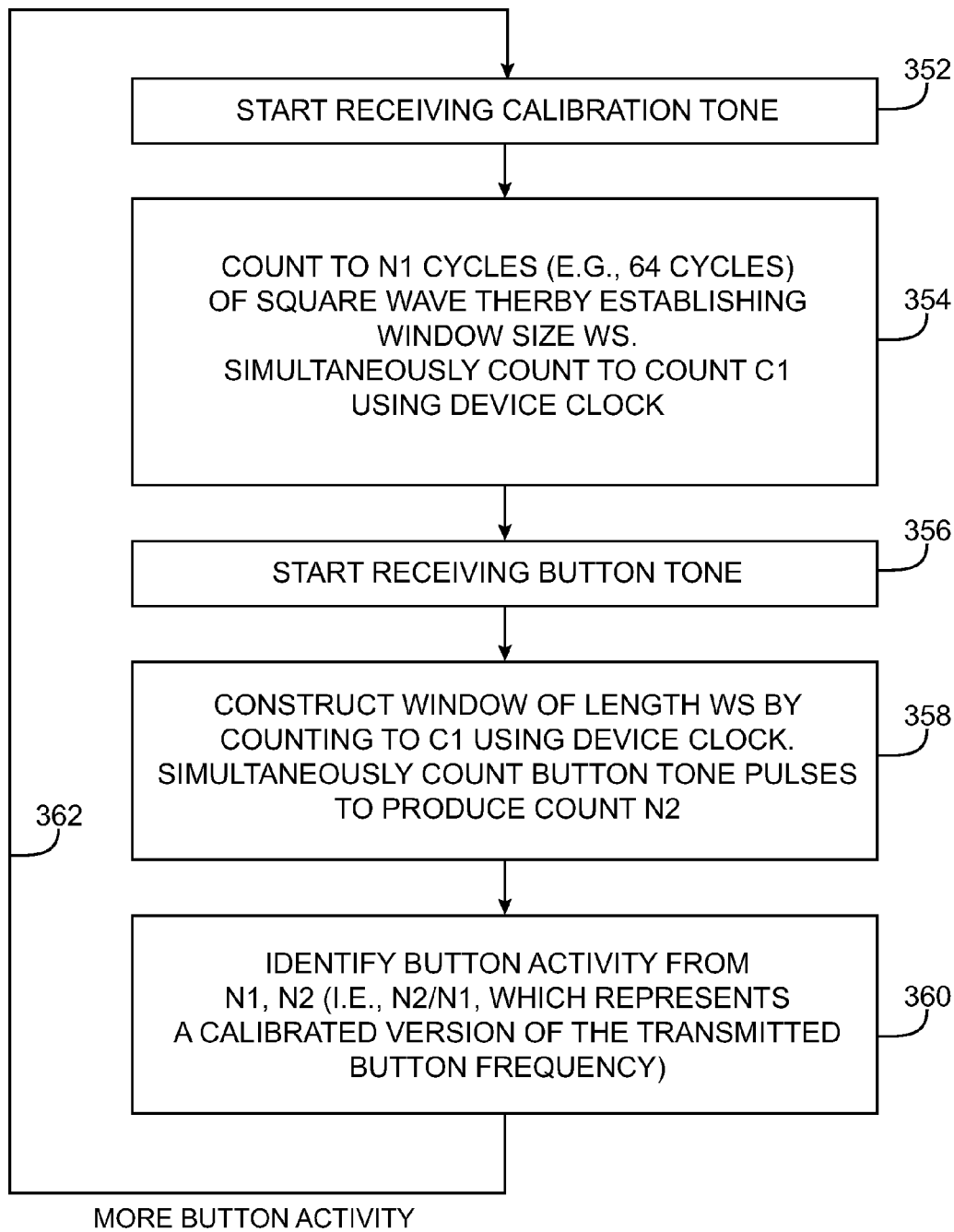
FIG. 36 is a flow chart of illustrative operations involved in handling tone-based communications between an accessory such as a headset and an electronic device in accordance with an embodiment of the present invention.

Illustrative steps involved in this type of tone detection procedure are shown in FIG. 36. At step 352, tone detector circuitry in device 12 such as tone detector 246 of FIG. 34 may begin receiving a calibration tone (e.g., at time $t_a$ of FIG. 32).

At step 354, counting circuitry 346 may count to N1 cycles (e.g., a known number of cycles such as 64 cycles). Timing circuits in circuitry 346 may be used to start the counting process within the middle portion of the $t_1$ duration of the calibration pulse. The counting process establishes time window WS. At the same time that counting circuitry 346 is counting to N1 pulses of the incoming tone, the device clock is being used to keep track of a count value C1 corresponding to the number of device clock pulses during window WS. The value of N1 and the value of C1 that is reached when counting the device clock pulses until the count N1 of the incoming tone pulses is reached may be stored in count registers 348.

At step 356, tone detector 246 may start receiving the button tone (i.e., the ultrasonic tone of time $t_b$ or time $t_d$ of FIG. 32). This may correspond to a button press or button release event (as examples).

At step 358, the time window WS may be reconstructed by counting to the value of C1 using the device clock. At the same time that the device clock is being used to recreate time window WS, tone detector 246 may use pulse counting circuitry 346 to count the number N2 of pulses in the incoming tone.

The values of N1 and N2 may be used to identify the button tone at step 360. In particular, tone detector 246 or other suitable processing circuitry may compute the value of N2/N1, which represents the calibrated version of the transmitted ultrasonic tone. The calibrated version of the transmitted tone may then be used in conjunction with a table of the type shown in FIG. 33 to identify the type of button activity that has been detected. Techniques such as this may also be used to detect tones that have been transmitted from device 12 to accessory 14 (e.g., in system such as those described in connection with FIG. 7 in which tones may be transmitted bidirectionally). As indicated schematically by line 362, the operations of steps 352, 354, 356, 358, and 360 may be repeated to process additional button actuation events.

As described in connection with FIG. 23, electronic devices and accessories of different configurations may be used together. In this type of environment, it may not be known in advance which capabilities are present in the electronic device and accessory. A discovery process may therefore be used to ascertain the capabilities of components in system 10. For example, device 12 may perform accessory identification operations to determine which type of accessory 14 is connected to device 12 and which circuitry in accessory 14 is available for use. Discovery operations may be performed, for example, whenever a new accessory is connected to device 12, upon launching applications that are running on device 12, when initiated by a user, or at any other suitable time.

Figure 37:
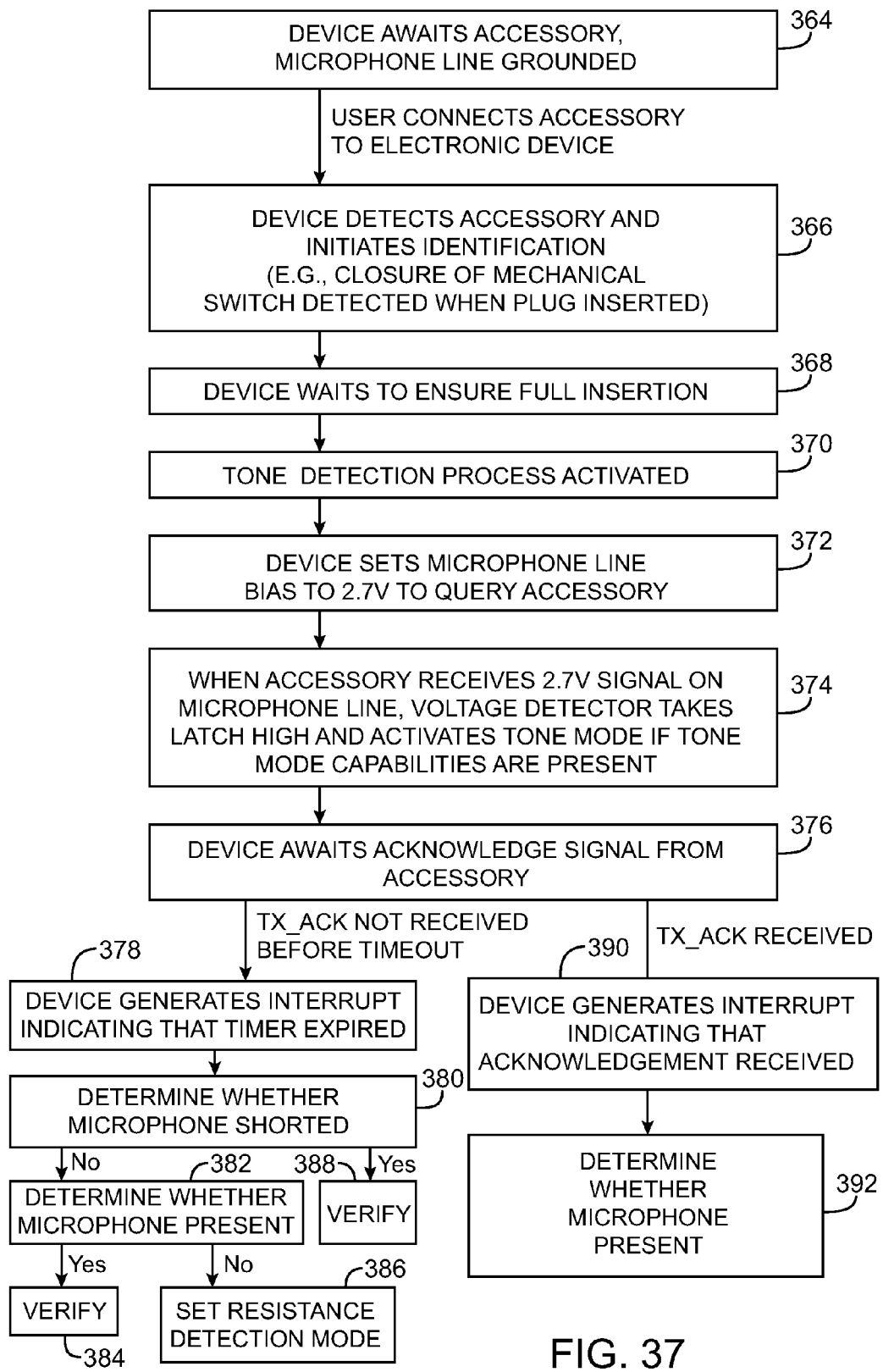
FIG. 37 is a flow chart of illustrative operations involved in determining what type of accessory is connected to an electronic device in accordance with an embodiment of the present invention.

Steps involved in an illustrative accessory identification process that may be used by electronic device 12 to ascertain the capabilities of an accessory that has been connected to the device are shown in FIG. 37.

At step 364, as device 12 awaits insertion of the audio plug of the accessory (e.g., a headset, adapter, or other accessory equipment), device 12 may ground microphone terminal M. For example, in power supply circuitry 180 of FIG. 25, device 12 may close switch SW4 to short the microphone terminal M to ground. Electronic device 12 may have a sensor such as a mechanical switch (e.g., mechanical switch SWM of FIG. 24) that is tripped when the audio plug of accessory 14 is inserted into the mating audio jack of electronic device 12. During step 364, device 12 may monitor the state of the mechanical switch. When the user inserts the plug of the accessory into device 12, the presence of the plug may be reflected by a change in the electrical state of the mechanical switch. This allows device 12 to detect the presence of the accessory (step 366). Once the insertion of the accessory plug has been detected, device 12 may initiate accessory identification operations.

At step 368, device 12 may, if desired, wait for a predetermined amount of time (e.g., 300 ms) to ensure that the user has fully inserted the accessory audio plug into the audio jack of device 12.

At step 370, device 12 may activate its tone detection capabilities (e.g., using tone detector 246).

At step 372, device 12 may use power supply 180 to adjust the bias voltage on microphone line M. Device 12 may, for example, set the output voltage of power supply 180 to a nominal value of 2.7 volts. The use of a 2.7 volt bias to bias microphone in accessories may be advantageous, because this bias voltage may be compatible with a relatively wide range of microphone types. Nevertheless, the 2.7 bias voltage that is generated in the illustrative operations of step 372 is merely an example. Other bias voltage levels may be used if desired.

The 2.7 volt DC bias voltage (or other suitable voltage) that is supplied by power supply circuit 180 of device 12 may serve as a control signal for accessory 14. Accessories such as accessory 14 of FIG. 31 may have voltage detector and latch circuitry 320 that is responsive to the amount of applied voltage on microphone contact M. As a result, accessory 14 may be directed to take various actions by applying particular DC bias voltages or sequences of DC bias voltages on line M.

With one suitable arrangement, voltage detector and latch circuitry 320 may place the circuitry of accessory 14 in tone mode at step 374 when a bias voltage is detected on line M that is greater than a particular threshold (e.g., a 2.3 volt threshold voltage). For example, voltage detector and latch circuitry 320 may respond to received voltages on line M that exceed the threshold voltage by opening switch SWA and closing switches SWB1 and SWB2. In accessories with tone mode and microphone capabilities, such as accessory 14 of FIG. 31, this will activate the microphone circuitry and will disconnect the resistively encoded switches from the microphone line so that button activity will be conveyed to device 12 as tones, rather than as changes in microphone line to ground line resistances.

To ensure that device 12 and accessory 14 work properly together, it may be desirable for accessory 14 to send confirmation information to device 12 in response to detection of the 2.7 volt DC bias from device 12. Confirmation information may be provided, for example, in the form of an acknowledgement signal. In arrangements of this type, device 12 may await an acknowledgement signal from accessory 14 at step 376.

Device 12 may maintain a local timer. The TX ACK bit in the registers of control circuitry 274 (FIG. 27) may be set high to set the local timer (e.g., to start an appropriate timeout period of 6 ms). The timer may be initialized after raising the output voltage from power supply 180 to 2.7 volts or other voltage that is expected to elicit an acknowledgement from accessory 14. If no acknowledgement is received from accessory 14 at tone detector 246 within the predetermined timeout period (e.g., 6 ms), device 12 may conclude that accessory 14 does not have properly operating tone-based acknowledgement capabilities, may set the registers of control circuitry 274 to reflect this status, and may generate a corresponding interrupt on line 282 (FIG. 24) to indicate that the timer has expired without receive of an acknowledgement from accessory 14 (step 378). Software running on device 12 (e.g., an application that may desire to use the buttons of an accessory) may query the registers of control circuitry 274 to determine why the interrupt was generated (i.e., to discover that the interrupt was generated because the timer expired without receiving an acknowledgement from the accessory indicating that tone capabilities were present).

At step 380, device 12 may use comparator 186 of voltage detection circuitry 216 (FIG. 26) to determine whether microphone line M and ground G are shorted together.

If contacts M and G are shorted together, device 12 may verify this condition at step 388. If a user inserts the audio plug of accessory 14 into the mating audio jack in device 12 slowly, the microphone and ground contacts M and G may be momentarily shorted due to inadvertent momentary contact between the contacts in the plug and metal portions of the jack. During step 388, comparator 186 may again be used to determine whether the microphone and ground lines are shorted or whether the short detected at step 380 was only momentary (e.g., due to a partial plug insertion).

If, at step 380, it was determined that the microphone contact M and ground G were not shorted together, switch 300 in voltage detection circuit 216 may be adjusted to set VR to an appropriate level (e.g., 2.5 volts) to detect whether a microphone is present in the accessory. At step 382, voltage detection circuit 216 may be used to determine whether there is a microphone present in the accessory. If there is no microphone in the accessory (e.g., because the user has inserted an extension cable into the jack), the voltage on microphone terminal M will remain near 2.7 volts (i.e., greater than 2.5 volts). If, however, there is a microphone present in the accessory, current drawn through the microphone will pull the voltage on terminal M below 2.5 volts. This reduced voltage will be detected by comparator 312 (FIG. 26), confirming the presence of the microphone.

If it is determined at step 382 that a microphone is present, device 12 can conclude that the accessory has a microphone and no tone mode capabilities. For example, device 12 may conclude that the accessory is a headset with a shorting button 176 and a microphone 174 of the type shown in FIG. 11. This may be verified during the operations of step 384. For example, control circuitry 274 use power supply 180 to set its output voltage to 0 volts and, subsequently, to 2.0 volts (as an example). When this procedure is followed, accessories such as the tone-mode enabled accessory 14 of FIG. 31 will not enter tone mode, because the microphone line bias voltage (e.g., 2.0 volts) will not rise above the threshold associated with voltage detector and latch 320 (e.g., 2.3 volts). The accessory will therefore not be placed in tone mode and the microphone line will not be pulled low. In this situation, the "microphone detect true" bit in the register circuitry of FIG. 27 will not be set. On the other hand, in accessories such as headsets of the type shown in FIG. 11, raising the voltage to 2.0 volts will result in a measured microphone line voltage of about 2.0 volts and will cause the "microphone detect true" bit to be set by control circuitry 274 (FIG. 24). If device 12 reaches step 384 and verification is successful, device 12 can conclude that accessory 14 is of the type shown in FIG. 11.

If it is determined at step 382 that no microphone is present in accessory 14, device 12 may direct power supply 180 to bias the microphone line M in accessory 14 at 2.7 volts (step 386). Accessory 14, which may be a headset with resistively encoded buttons of the type shown in FIG. 14, may be used to control device 12.

If it is determined at step 380 that the microphone line is shorted, verification operations may be performed at step 388. For example, the state of output 192 of comparator 186 in voltage detection circuitry 216 may be checked to ensure that the voltage on line 190 is below VREF (i.e., below 0.2 volts). If verification operations at step 388 are successful, device 12 may conclude that accessory 14 is a headset of the type shown in FIG. 9 having a plug such as plug 36 of FIG. 4 with a sleeve 64 that is shorting regions 78 and 80 of jack 38 in device 12.

If, at step 376, an acknowledgement tone signal is successfully detected within the acknowledgement time window (e.g. 6 ms), processing may proceed to step 390. During the operations of step 390, device 12 may set a register in control circuitry 274 to reflect that the acknowledgement signal has been received from accessory 14 and may generate an interrupt. The processing circuitry of device 12 may, in response to the interrupt, conclude from the contents of the register circuitry that confirmation information from accessory 14 has been successfully received (i.e., because the tone generator 318 of accessory 14 transmitted an acknowledgement tone to confirm the presence of tone mode capabilities in accessory 14 in response to the operations of step 374).

At step 392, device 12 can determine whether a microphone is present in accessory 14. Voltage detection circuitry 216 may be used to evaluate the voltage on microphone terminal M. If a microphone is present, the voltage on terminal M will be relatively low due to the current drawn by the microphone. In this situation, device 12 may conclude that accessory 14 is of the tone-mode-capable type shown in FIG. 31 and has a microphone. If no microphone is present, the voltage on terminal M will be relatively high and device 12 can conclude that accessory 14 is of the type shown in FIG. 31, but without a microphone present.

As this example demonstrates, the various DC voltages produced by power supply 180 in device 12 can serve as control signals for accessory 14. Accessory 14 can detect these DC voltages and can respond. In "smart" accessories that support tone-mode functions, tone generation circuitry may be used to send confirmatory information to device 12 (e.g., in the form of an ultrasonic acknowledgement tone). Voltage detection circuitry in device 12 may then be used to determine whether the accessory has a microphone. In accessories that do not support advanced tone-mode functions, device 12 can use tone detector 246, power supply circuitry 180, and voltage detector circuitry 216 to analyze the accessory and determine its capabilities.

Once the discovery process is complete, an application such as a media playback application, cellular telephone application, operating system function, or other suitable software implemented on device 12 can take appropriate action. For example, if it is determined that no tone mode capabilities are present, device 12 can operate in resistance detection mode (if resistively encoded buttons are present) or can await button presses from a shorting button such as button 176. If it is determined that no microphone is present, certain functions may be blocked (e.g., functions requiring the user's voice). Other functions may not be blocked (e.g., functions associated with media playback operations). If desired, applications in device 12 may change the operating mode of device 12. For example, an application running on device 12 might place device 12 in a resistance detection mode when microphone functions are not needed, thereby potentially saving power, even if device 12 has tone mode capabilities. During resistance detection mode, button presses create changes in the impedance between microphone line M and ground G that could be disruptive if a microphone were in active use. The resistance detection mode is therefore generally preferred only when the microphone is not being used. In situations in which the microphone is being used or in which tone mode operations consume less power, tone mode operation may be preferred.

Any suitable applications may be implemented on device 12. For example, device 12 may run software that handles functions associated with wired and wireless communications, games, productivity, finance, entertainment, media, and other functions. Illustrative applications that may be implemented on processing circuitry 128 of device 12 and that may use the functionality of accessory 14 in system 10 include media player applications, radio applications, voice memo applications (e.g., applications that include recording functionality for voice or other sounds), voice or other sound recording playback applications, and exercise applications (e.g., applications that perform fitness-related functions such as keeping track of fitness information, playing media in a way that is suitable when a user is jogging or is working out at a fitness facility, etc.). These applications may be implemented using processing circuitry 128 of FIG. 7 (as an example).

During normal operation of device 12 and accessory 14, user input such as button press activity information may be conveyed from accessory 14 to device 12 in real time. Processing circuitry 128 may analyze the user input and take appropriate actions. The actions that are taken by device 12 in response to particular user input generally depend on which software is operating on device 12. For example, device 12 may always or nearly always run an operating system, so user input related to operating system control functions may be processed continuously or nearly continuously. Other user input may result in different actions, depending on context. For example, selection of a "+" button may result in a track skip operation if a user is interacting with a media playback application in a particular mode of operation, whereas selection of the same "+" button may result in an increase in volume for the audio being driven into accessory 14 when the user is interacting with a cellular telephone application.

To simplify operations, it may be desirable to limit the range of allowable button presses that can be made by a user. In this type of arrangement, multiple button clicks within a short period of time or user button activity involving simultaneous selection of two buttons may be ignored. With other suitable arrangements, more complex button activity may be allowed (e.g., multiple button clicks, selection of multiple buttons, etc.).

If desired, multiple button presses may be handled as follows (as an example). Initially, device 12 can note which button was pressed upon detection of a first button press from the user. If a second button press is detected before a button release tone is received, the second button press may be ignored. On any button release when a button is active, device 12 may assume that a release of the pressed button was intended.

Collections of one or more button presses may sometimes be referred to as multi-button commands or user gestures. FIG. 38 presents a table of illustrative user commands that may be associated with the user input interface on accessory 14. In the examples of FIG. 38, the user interface has been assumed to include three buttons: a "+" button, a center button, and a "−" button, as described in connection with FIG. 5. This is, however, merely illustrative. Any suitable number of buttons may be used on accessory 14 to gather user input if desired.

As shown in the table of FIG. 38, user gestures may involve selection of particular buttons and timing information. When selecting buttons, a user may select a single button, two buttons, or more than two buttons. With respect to timing, a user has several options. For example, a user may press and immediately release a button (sometimes referred to as a "click"). The user may also press and hold the button for an extended period of time (e.g., for a fraction of a second or more than a second). Another possibility relates to multiple selections of the same button. In this type of situation, the user might, for example, press and release the same button twice in rapid selection (sometimes referred to as a "double click"). Triple clicks or even more complex clicking patterns may also be recognized (e.g., to select a previous track). Moreover, combinations of single button presses, multiple button presses, single and double clicks, and hold events may be used as user gestures if desired. As just one example, a double-click and hold command may be recognized as a unique user gesture by device 12 in a voice recording application, as indicated by the last column of the table of FIG. 38.

The table of FIG. 38 lists several illustrative applications that may be implemented on electronic device 12 such as a media player application, a radio application, a voice memo record application, a voice memo playback application, and an exercise application. These are merely illustrative applications that may be implemented on device 12. In general, any suitable applications may be run on the hardware of device 12 such as business productivity applications, games, communications applications, entertainment applications, etc. The user gestures that are shown in FIG. 38 are also merely illustrative. For example, other combinations of user inputs may be made using buttons in accessory 14. If desired, user commands may be formed partly using button actuation events and partly using other user input (e.g., sound). For example, a user may supply a voice command while performing a click and hold operation. User input based solely on voice commands or other non-button input may also be provided.

As each user command is entered (e.g., using a user gesture composed of button actuation events), a specific corresponding set of ultrasonic tone signals is transmitted to electronic device 12 over the audio jack. Clicks may be represented by distinct ultrasonic tones, depending on which button was pressed. Holds may be represented by repeated transmission of button-specific ultrasonic tones or by special "hold" tones. Still other arrangements may be used in which, for example, a double click is represented by a particular tone and a triple click is represented by another tone. Different commands may be represented by tones of different corresponding frequencies or commands may be represented using codes made up of multiple tones of different frequencies, different tone patterns, different tone durations, etc.

Schemes such as these in which different complex user gestures are converted into particular tones or tone-based codes are generally more burdensome on the processing circuitry of accessory 14 than schemes in which each button press results in corresponding unique ultrasonic tones. For this reason, it may be desirable to use an arrangement in which each button press that is detected (e.g., by an impedance detector) results in the production of a corresponding ultrasonic tone by the ultrasonic tone generator. However, schemes in which more button and other user input processing is performed at accessory 14 before transmitting instructions to device 12 as ultrasonic tone information may be used if desired.

Although unique user inputs typically result in unique instructions for device 12, identical commands can result in different actions. This is because the actions taken by electronic device 12 typically depend on context, as illustrated by FIG. 38. If, for example, a user is operating a media player application, a click of the center button will pause media playback, whereas a click of the center button will mute radio playback if a radio application is active. The ultrasonic tones that are sent to the electronic device in response to user input on the accessory form specific instructions for the electronic device. When the electronic device receives these instructions over the audio jack, the action taken by the electronic device typically depends on which software applications are operating on the device.

Additional user gestures that may be used in system 10 are shown in FIG. 39. As shown in FIG. 39, volume up and down operations and a play/pause operations may be controlled using button clicks. Additional functions may be controlled using gestures such as a click and hold gesture, a double-click gesture, a gesture formed by making a click followed by a click and hold, or a triple click gesture. The functions that are controlled in this way may be, for example, media playback functions such as music playback functions, playlist navigation functions, etc.

When a headset that has a single button and a microphone or a single button but no microphone is used, electronic device 12 may recognize center button presses and can distinguish between click, click & hold, double click, click+ click & hold, and triple click gestures.

When a headset that has three buttons and a microphone or a headset with three buttons and no microphone is used, electronic device 12 may recognize button presses from the volume up (V+), center, and volume down (V−) buttons, may distinguish between click, click & hold, double click, click+ click & hold, and triple click gestures, and may recognize and ignore multiple simultaneous button presses.

If desired, distinguishable audio feedback for different button presses may be generated by electronic device 12 and played for the user.

During media playback, an accessory with three buttons may allow the user to increase the playback volume. Clicking once on the V+button may increment the volume one step and a press and hold of the V+button may cause the playback volume to ramp up. The user may reduce the playback volume by clicking once on the V− button to decrement the volume one step. The user may press and hold the V− button to cause the volume to ramp down.

Play and pause operations may be performed using the center button. Clicking once on the center button will cause the media playback to pause if media was playing and resume if media playback was paused.

Media playback may also be advanced. In particular, double-clicking on the center button on accessory 14 will produce a "next" command to advance media playback to a next song, chapter, or photo.

Playlists may be navigated using user gestures. For example, a click & hold gesture using the center button will advance a user to the next playlist. If there is only one playlist present, a click & hold of the center button will not result in any action being taken. If a click & hold gesture is made while on the last of a list of playlists, electronic device 12 will advance to the first playlist in the list.

Figure 40:
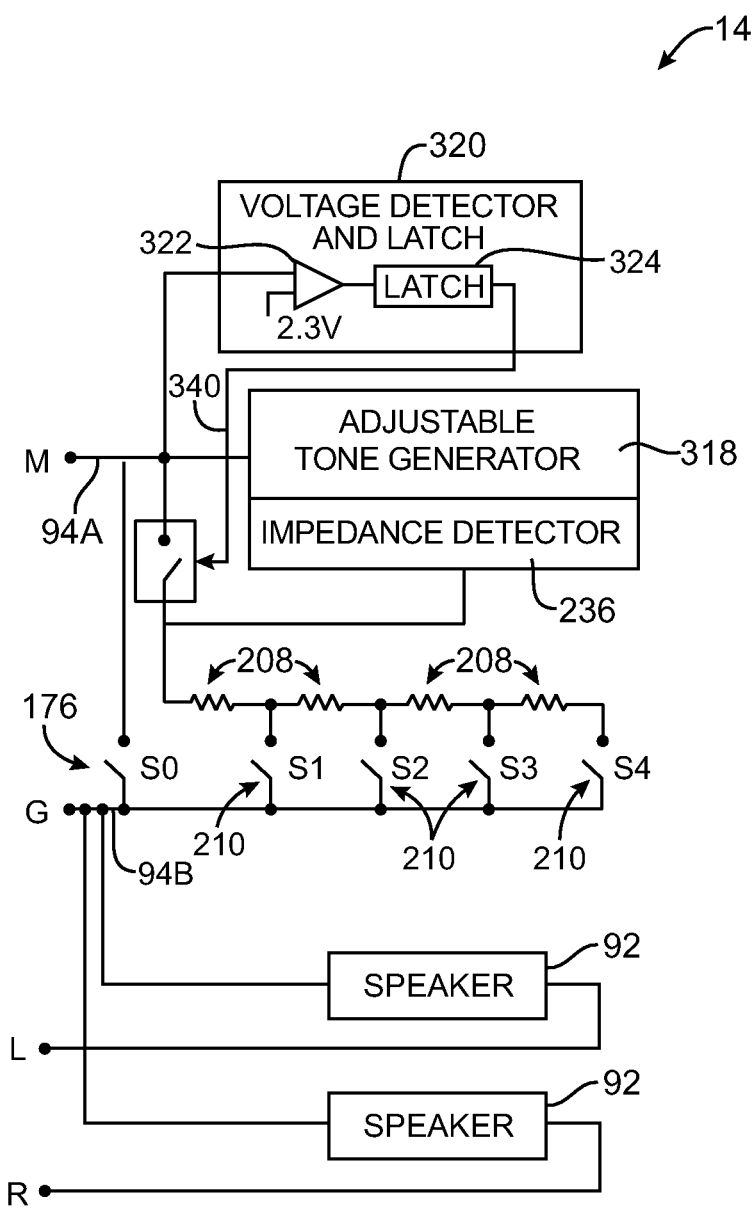
FIG. 40 is a circuit diagram of illustrative circuitry that may be used in an accessory such as a headset without a microphone to process user input and to supply corresponding tone-encoded signals to a corresponding electronic device in accordance with an embodiment of the present invention.

FIG. 40 shows illustrative circuitry that may be used in an accessory such as accessory 14 when the microphone is omitted. Accessories of the type shown in FIG. 41 may be used with electronic devices that do not have cellular telephone capabilities or other functions that use microphone signals or may be used in a reduced-functionality mode with a cellular telephone or other such device that contains microphone signal processing circuitry.

Figure 41:
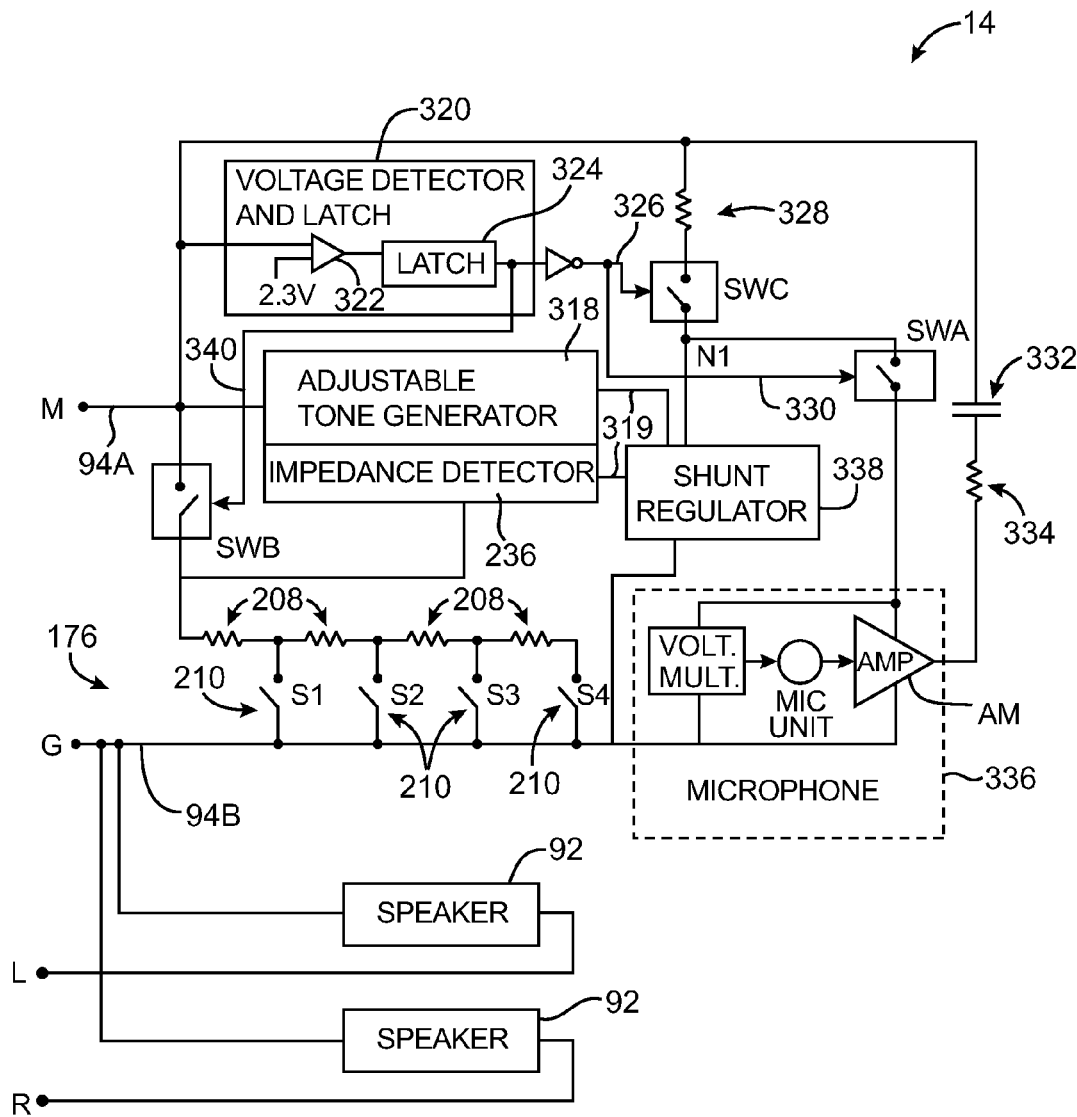
FIG. 41 is a circuit diagram of illustrative circuitry without microphone line shorting buttons that may be used in an accessory such as a headset to process user input and to supply corresponding tone-encoded signals to a corresponding electronic device in accordance with an embodiment of the present invention.

If desired, potential interference with microphone signals can be avoided using an accessory of the type shown in FIG. 41. In this type of arrangement, the momentary shorting button S0 that might otherwise be connected between the microphone and ground lines has been omitted. As a result, button press events do not result in shorts between the microphone and ground lines. The microphone line is therefore not disrupted, even if buttons are pressed repeatedly while the microphone line is in use to control the electronic device. Moreover, ultrasonic signals may be supplied by tone generator 318, so that button press data is transmitted using frequencies out of the normal range of human hearing. This makes button data transmission operations inaudible to users of accessory 14, even though the tone data is transmitted over the microphone line.

The foregoing is merely illustrative of the principles of this invention and various modifications can be made by those skilled in the art without departing from the scope and spirit of the invention.

What is claimed is:

1. An electronic device that communicates with an accessory over a wired communications path, wherein the accessory generates ultrasonic tones, the electronic device comprising:
   an audio jack having contacts that are electrically connected to respective lines in the wired communications path, wherein the lines include a microphone line and at least one speaker line; and
   an ultrasonic tone detector that detects the ultrasonic tones from the accessory over the microphone line and the audio jack, wherein the ultrasonic tones are at frequencies above an audible hearing range.

2. The electronic device defined in claim 1 further comprising voltage detection circuitry that measures voltages on the microphone line.

3. The electronic device defined in claim 1, wherein the contacts of the audio jack comprise:
   a tip contact;
   at least one ring contact; and
   a sleeve contact.

4. The electronic device defined in claim 3, wherein the microphone line is electrically connected to the sleeve contact of the audio jack.

5. An electronic device that communicates with an accessory over a wired communications path, comprising:
   an audio jack having contacts that are electrically connected to respective lines in the wired communications path, wherein the lines include a microphone line and at least one speaker line;
   an ultrasonic tone detector that detects incoming ultrasonic tones from the accessory over the microphone line and the audio jack, wherein the incoming ultrasonic tones are at frequencies above an audible hearing range;
   voltage detection circuitry that measures voltages on the microphone line; and
   control circuitry that generates control signals, wherein the voltage detection circuitry comprises:
      an adjustable switch that has a plurality of inputs each of which receives a different reference voltage and that has an output, wherein the adjustable switch has at least one control input that receives the control signals and wherein the control signals adjust the adjustable switch; and
      a comparator having a first input connected to the microphone line and having a second input connected to the output of the adjustable switch.

6. The electronic device defined in claim 5 further comprising adjustable power supply circuitry that supplies a bias voltage to the microphone line, wherein the control circuitry controls the adjustable switch while the microphone line receives the supplied bias voltage to determine what type of accessory is connected to the electronic device.

7. The electronic device defined in claim 5 wherein the accessory comprises at least one speaker and wherein the electronic device comprises audio amplifier circuitry that drives audio signals onto the speaker over the speaker line.

\* \* \* \* \*